United States Patent

Mukouchi et al.

[11] Patent Number: 6,104,403
[45] Date of Patent: Aug. 15, 2000

[54] APPARATUS AND METHOD FOR CREATING THREE-DIMENSIONAL OBJECT MODEL, AND COMPUTER READABLE RECORD MEDIUM HAVING THREE-DIMENSIONAL OBJECT MODEL CREATION PROGRAM RECORDED THEREON

[75] Inventors: Masaki Mukouchi; Hideki Takahashi; Yoshihiro Nakagaki; Nobuaki Sakamoto, all of Inagi, Japan

[73] Assignee: Fujitsu Personal Computer Systems Limited, Tokyo, Japan

[21] Appl. No.: 09/060,830

[22] Filed: Apr. 16, 1998

[30] Foreign Application Priority Data

Nov. 10, 1997 [JP] Japan .................. 9-306715

[51] Int. Cl.[7] .................................................. G06T 17/00
[52] U.S. Cl. .......................................... 345/419; 345/418
[58] Field of Search ................................. 345/418, 419, 345/420, 421, 422, 423, 424

[56] References Cited

U.S. PATENT DOCUMENTS

| | | | |
|---|---|---|---|
| 5,940,079 | 8/1999 | Morino et al. | 345/419 |
| 5,943,057 | 8/1999 | Othba | 345/419 |
| 5,949,433 | 9/1999 | Klotz | 345/419 |
| 5,956,038 | 9/1999 | Rekimoto | 345/419 |
| 5,974,423 | 10/1999 | Margolin | 345/419 |

FOREIGN PATENT DOCUMENTS 7-175944  7/1995  Japan .

*Primary Examiner*—Phu K. Nguyen
*Assistant Examiner*—Cliff N. Vo
*Attorney, Agent, or Firm*—Staas & Halsey

[57] ABSTRACT

A part model creation unit creates part models necessary for the assembly of a three-dimensional object model, in the form of three-dimensional part models having junction reference data for joining to other part models, and stores them in a part storage unit. An assembly processing unit selects at least two part models from the part storage unit for the arrangement in a work coordinate space and joins the part models together on the basis of the junction reference point data to thereby assemble a three-dimensional object model.

34 Claims, 52 Drawing Sheets

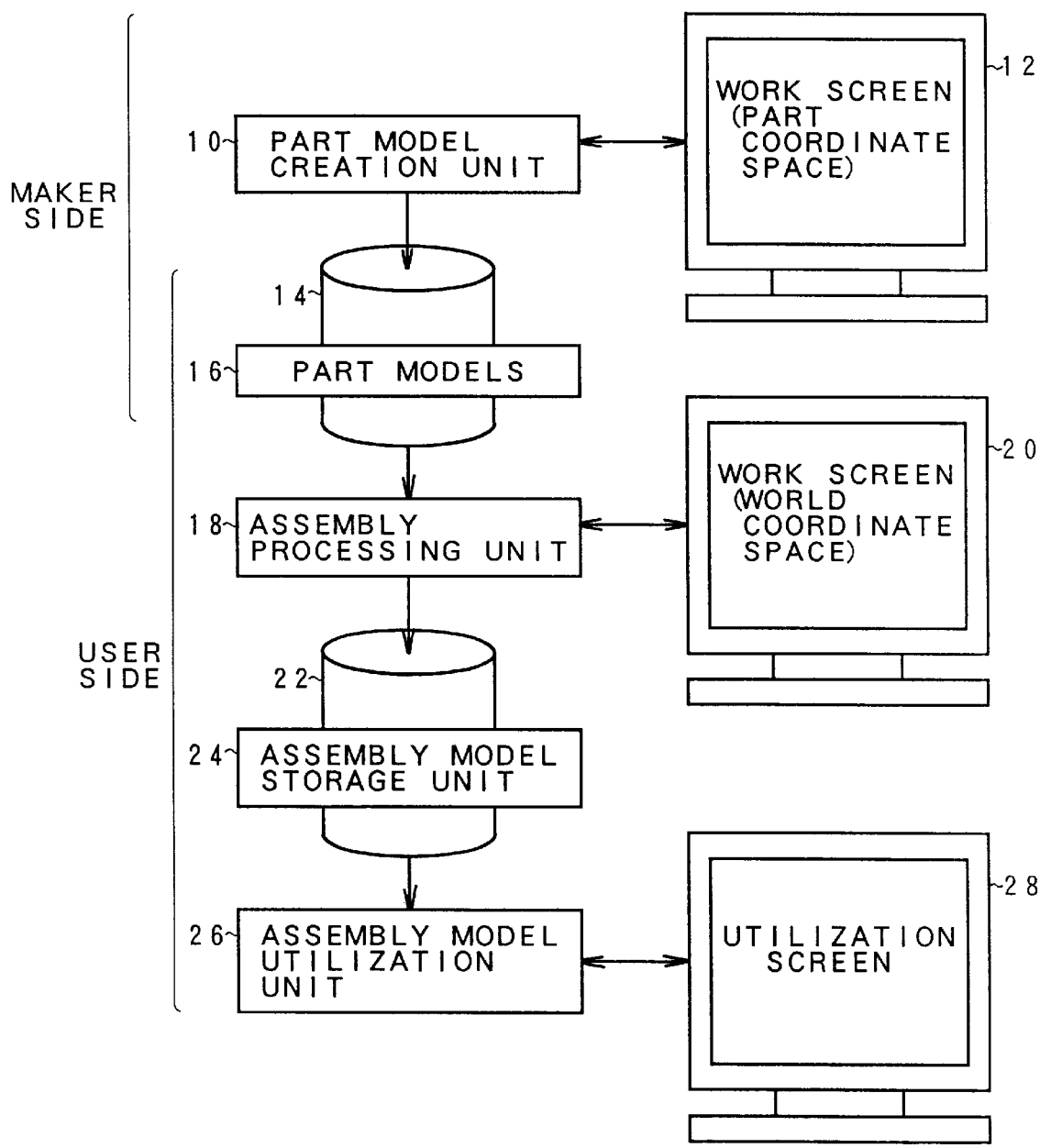

F I G. 5
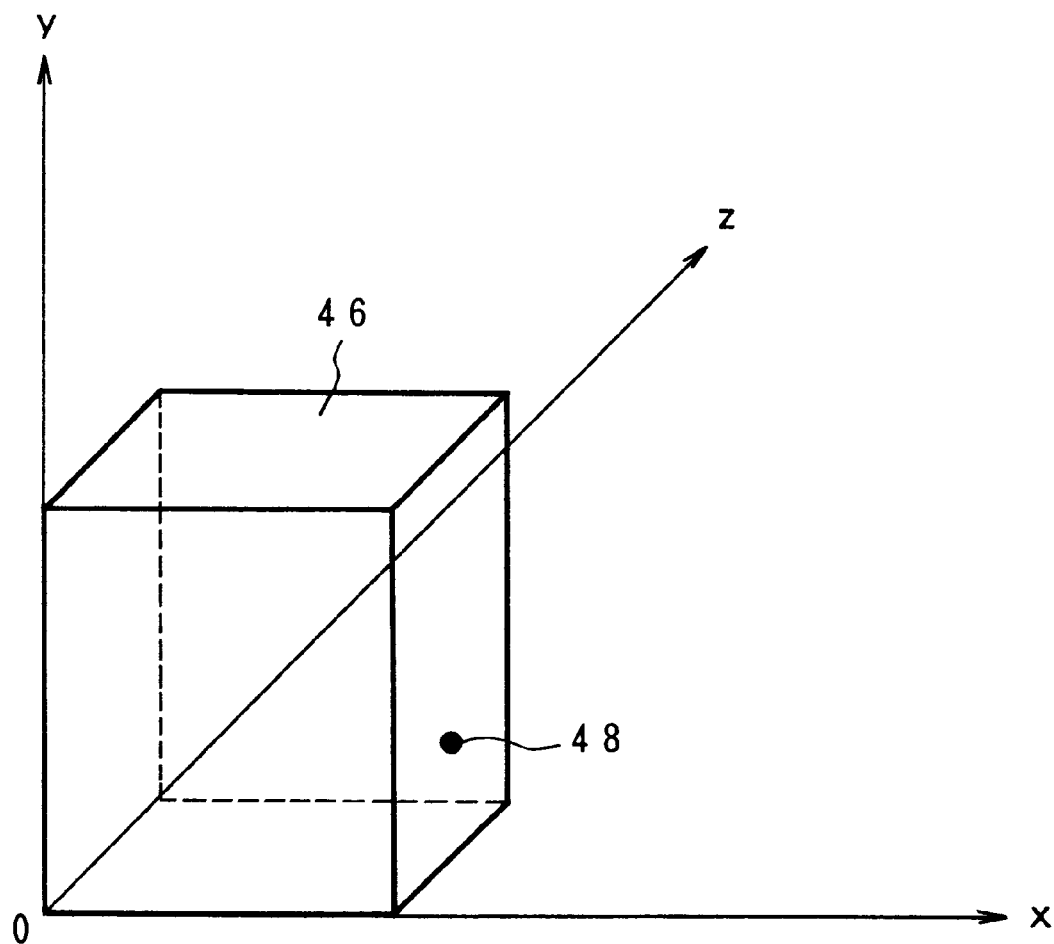

F I G. 7
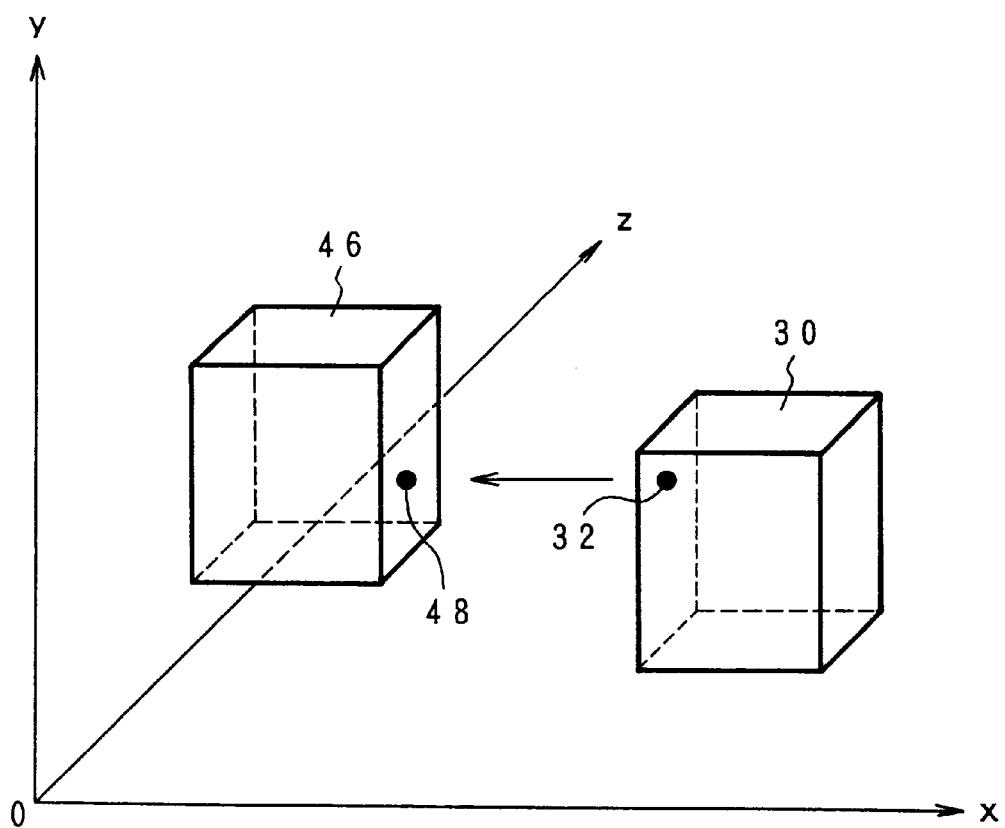

F I G. 9
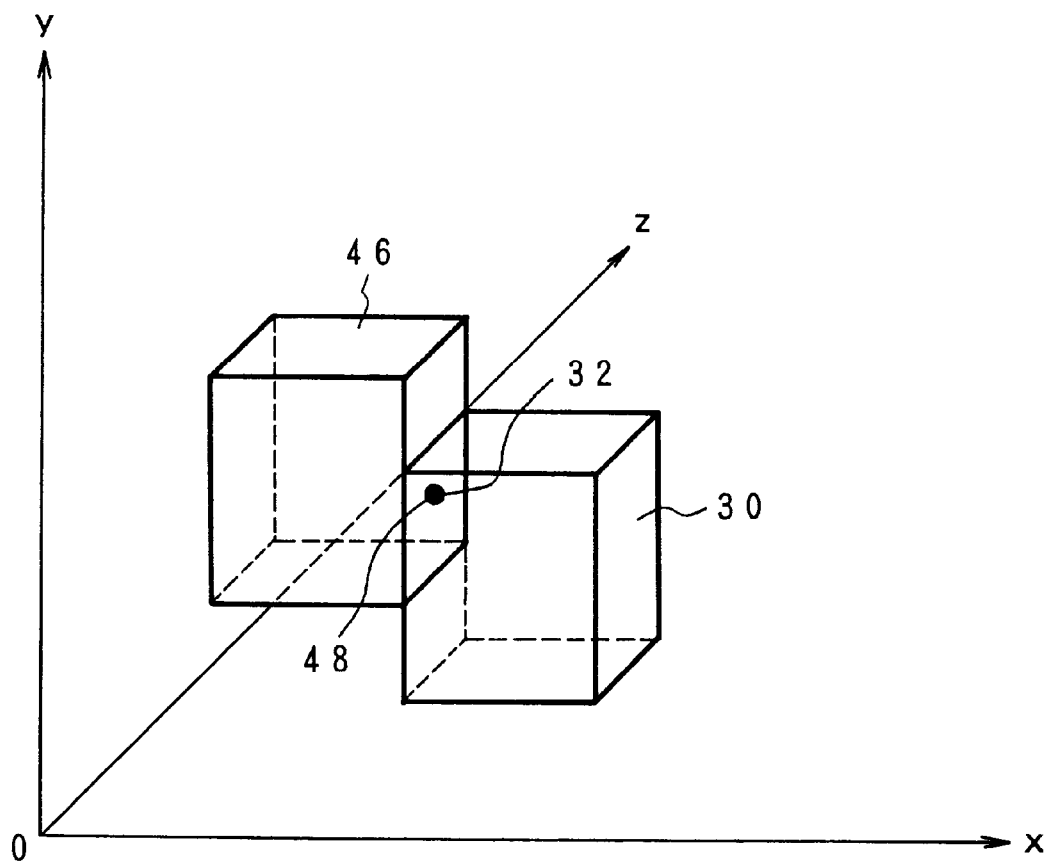

F I G. 1 4
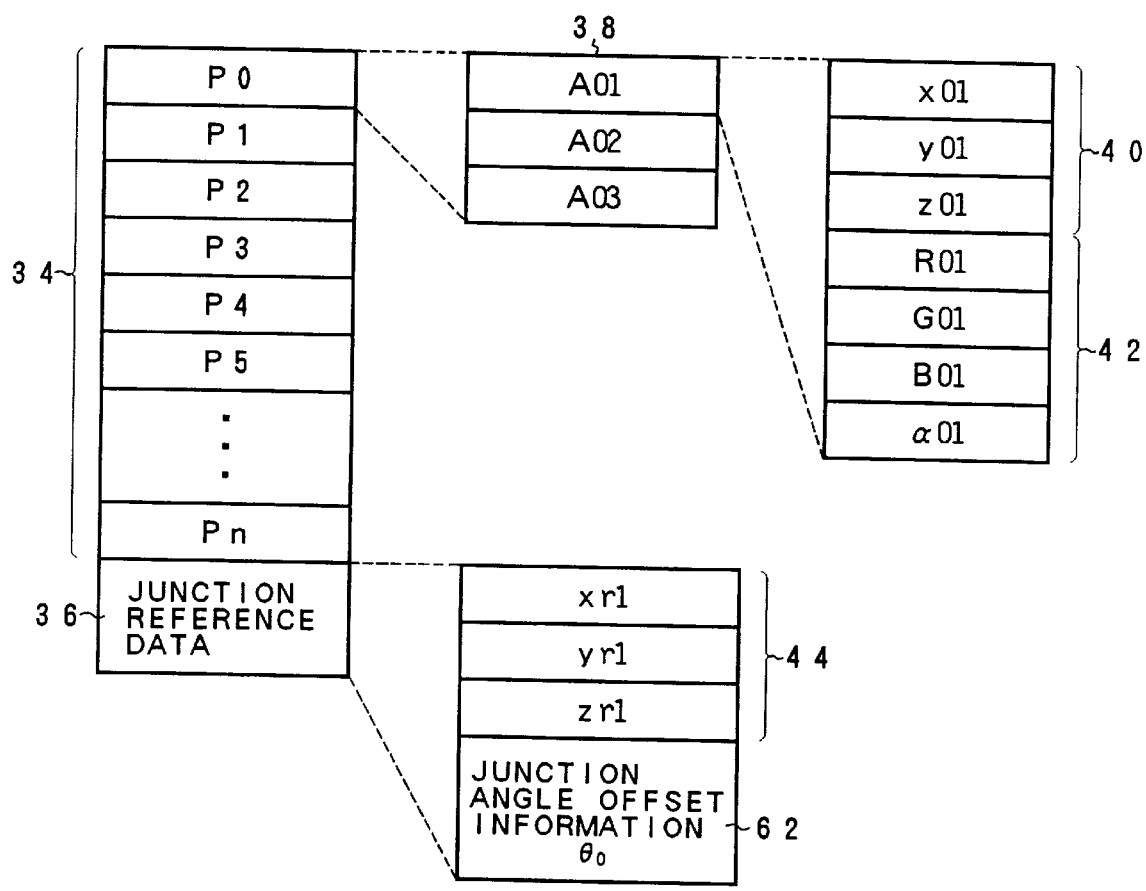

F I G. 17
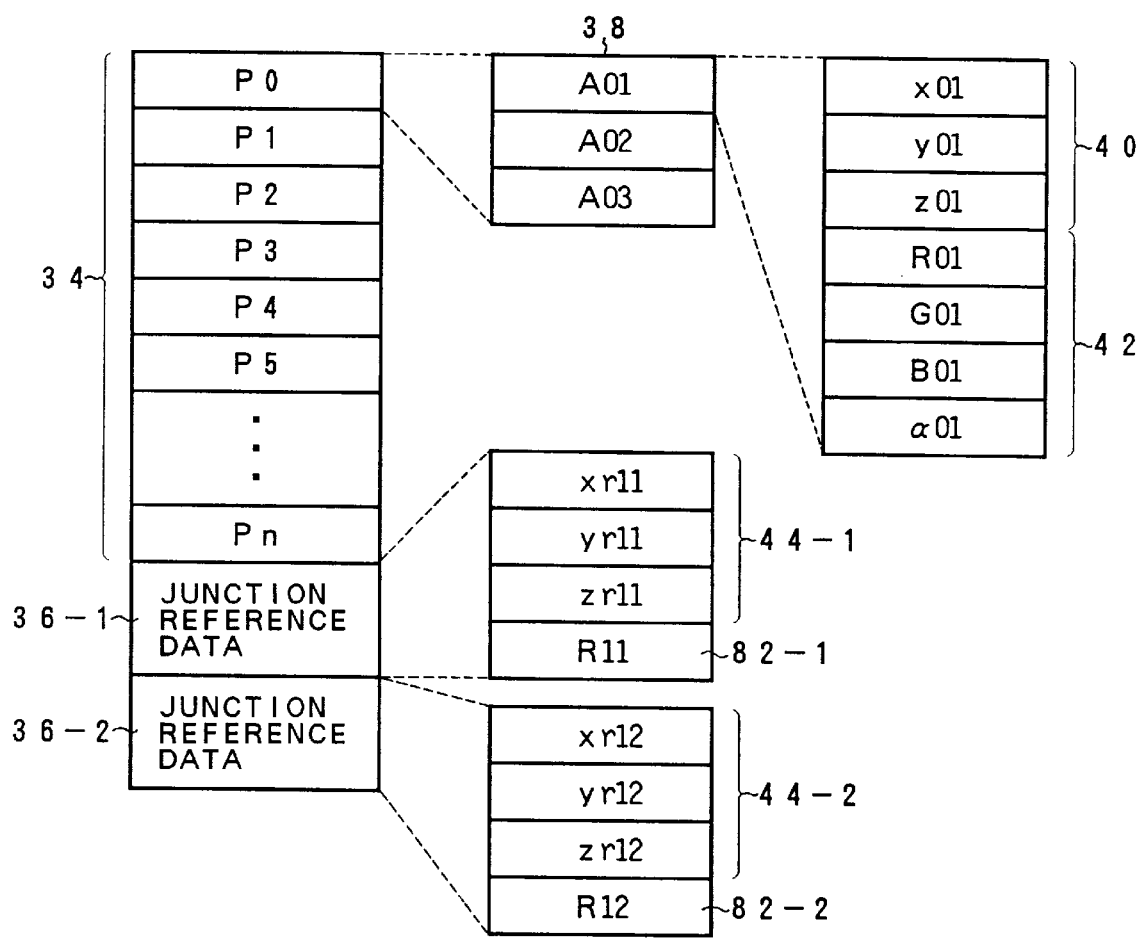

F I G. 2 5
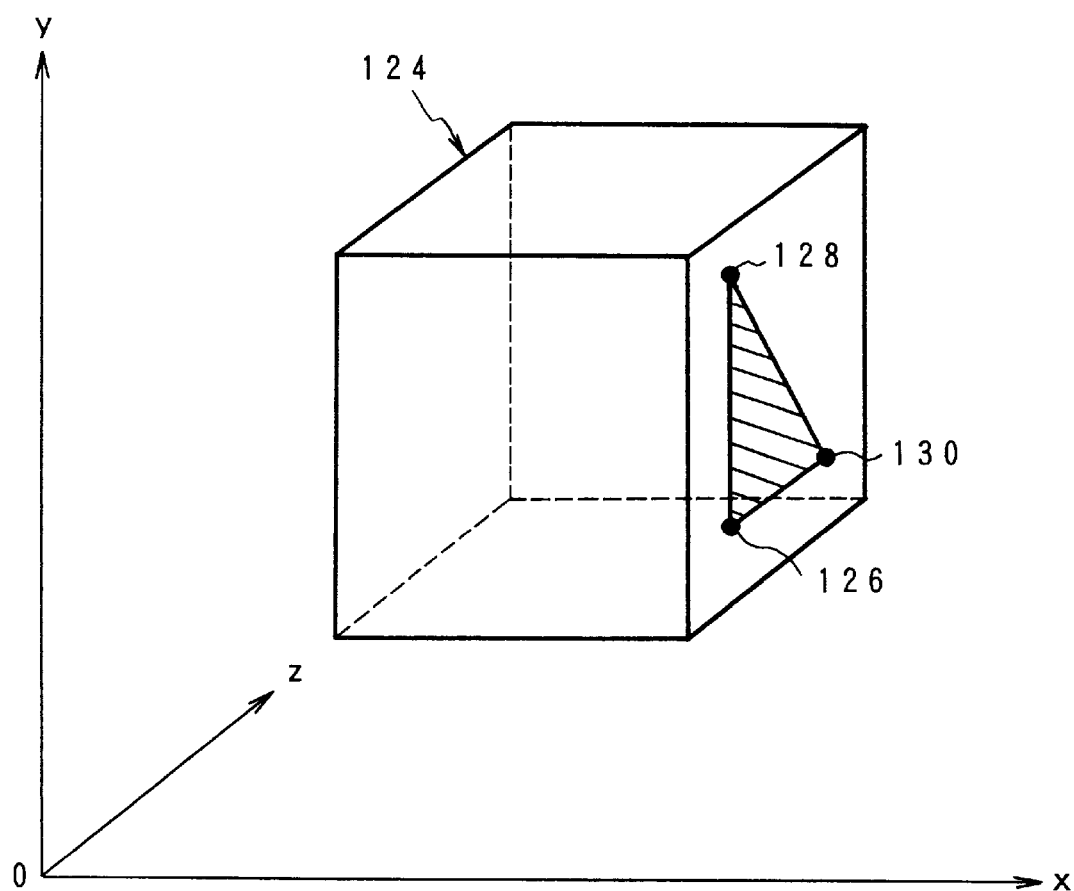

F I G. 29
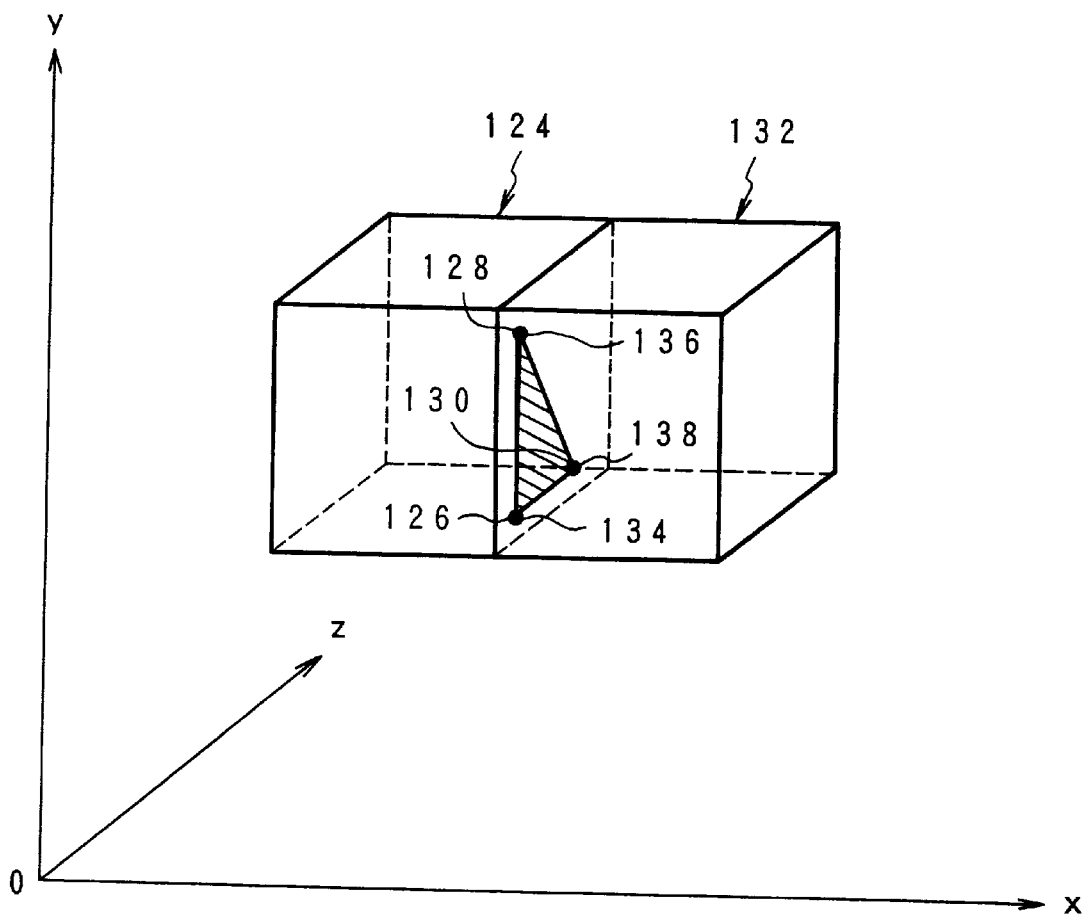

F I G. 3 0
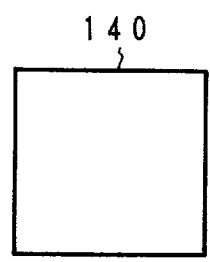
140
MODEL ID=1
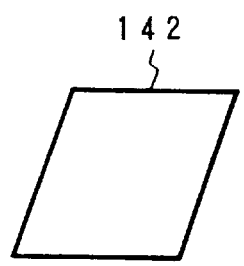
142
MODEL ID=2
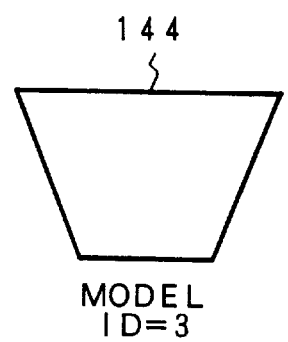
144
MODEL ID=3
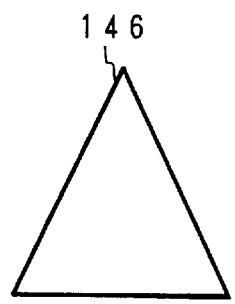
146
MODEL ID=4
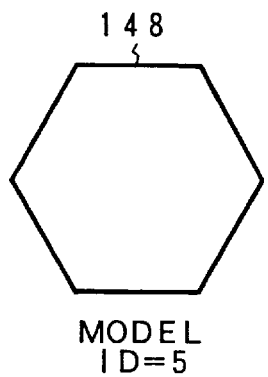
148
MODEL ID=5
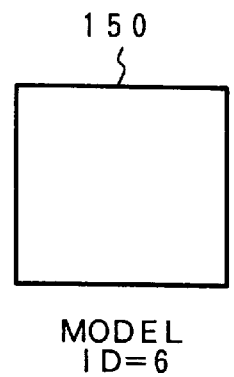
150
MODEL ID=6

MANAGEMENT TABLE

ID1=ID3
ID2=ID5
ID4=ID6
· · · · ·
· · · · · · · · · · ·
· ·
· · · · · · · · · · ·
· · · · · · ·
· · · · ·

F I G. 3 2
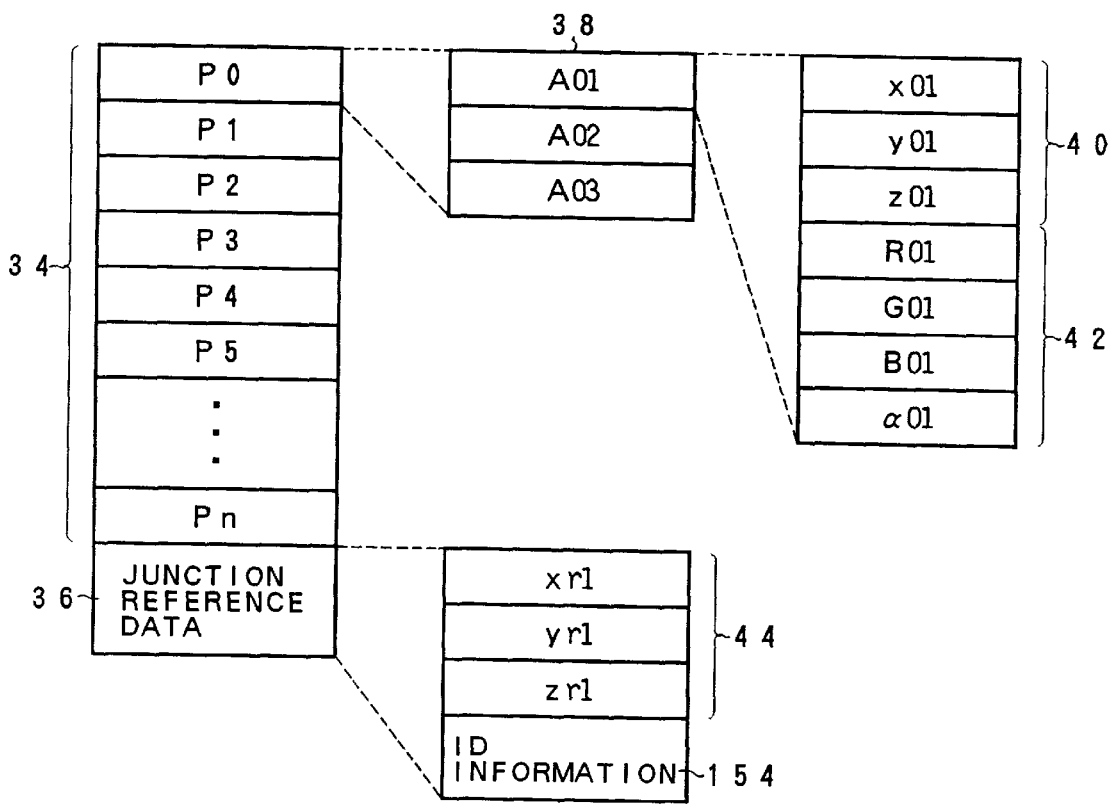

F I G. 3 8
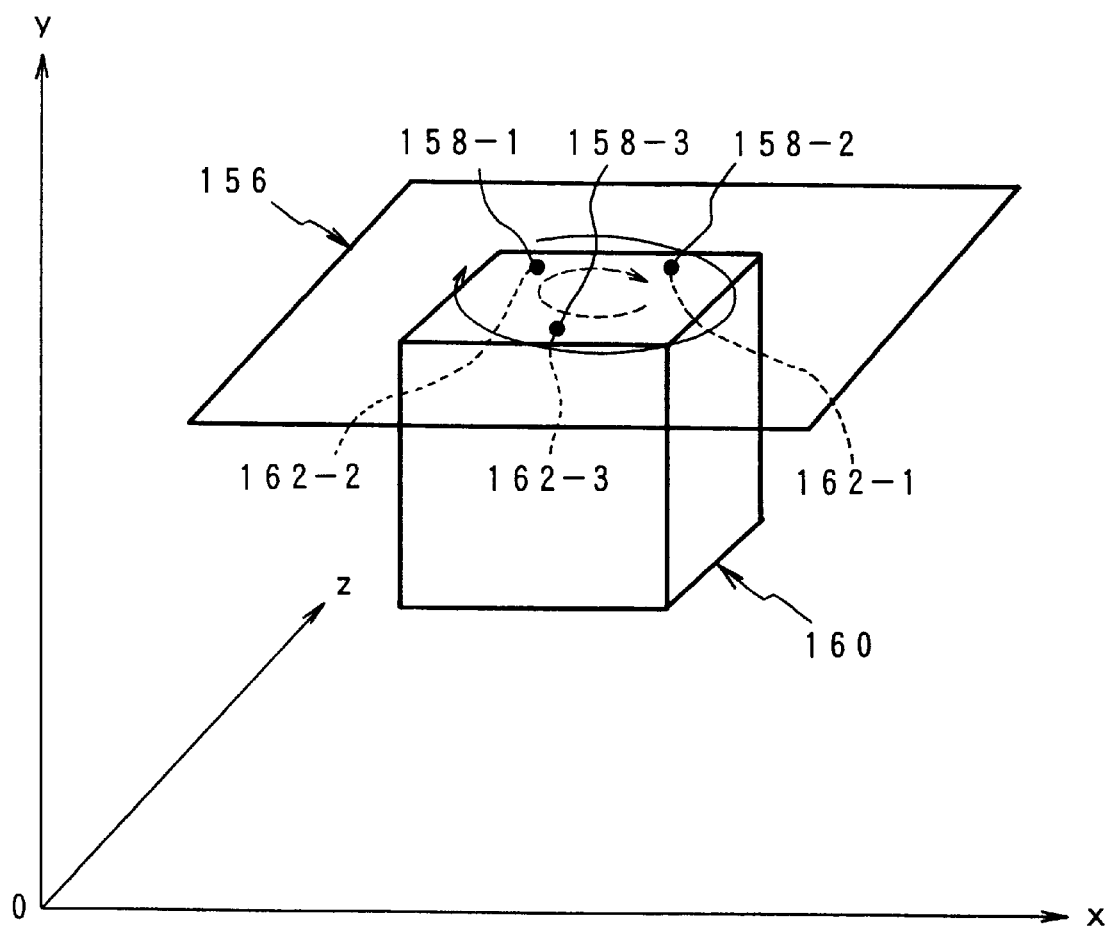

F I G. 4 2
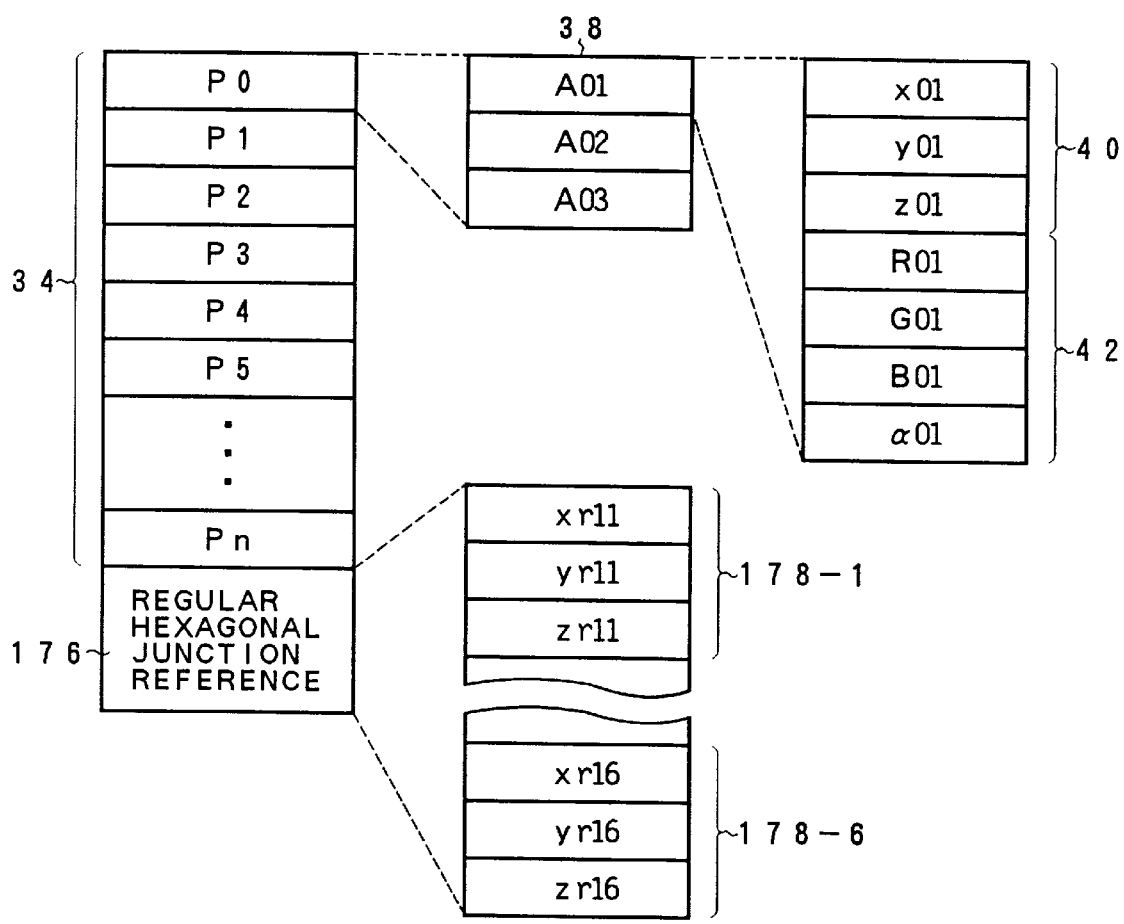

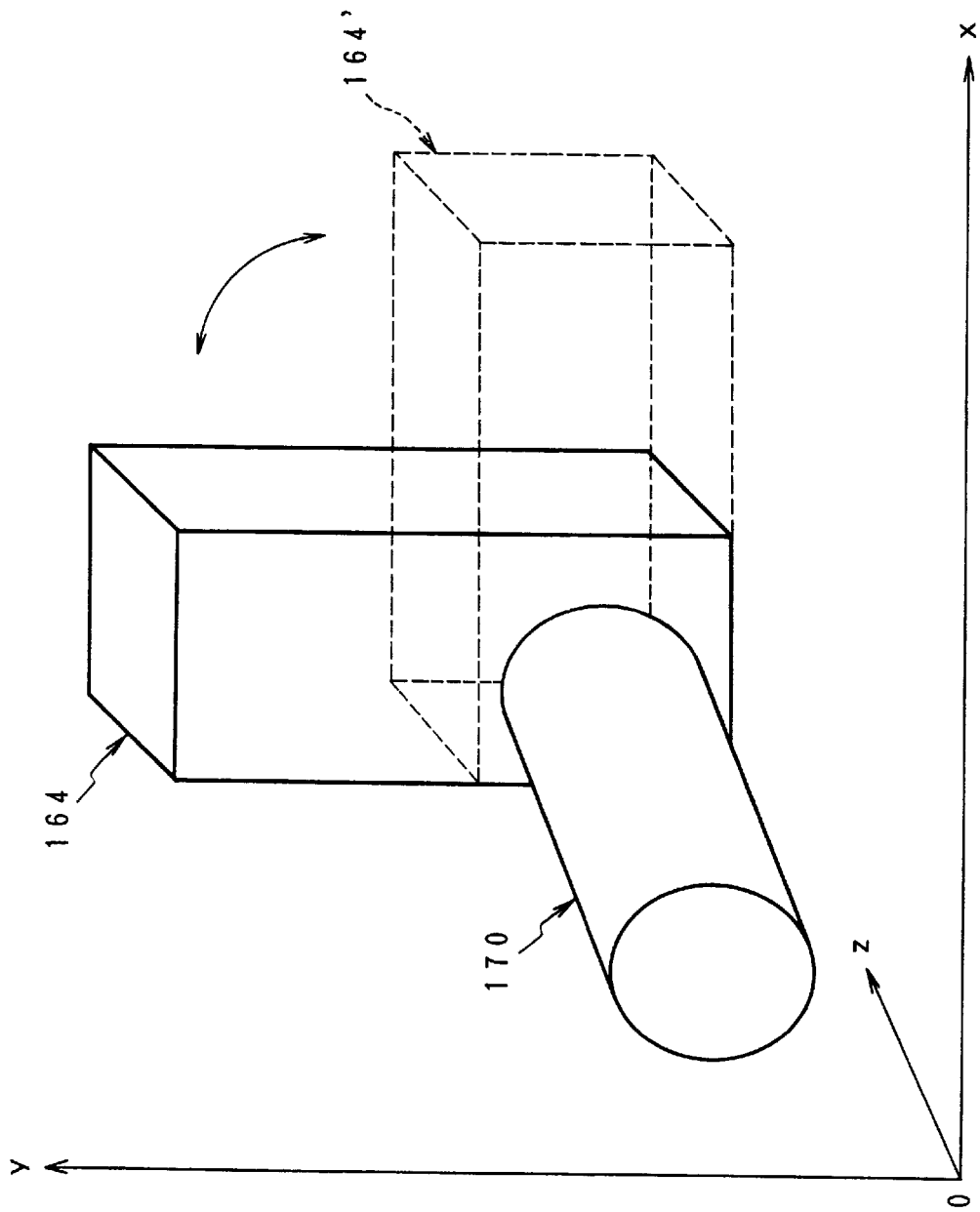

F I G. 4 4
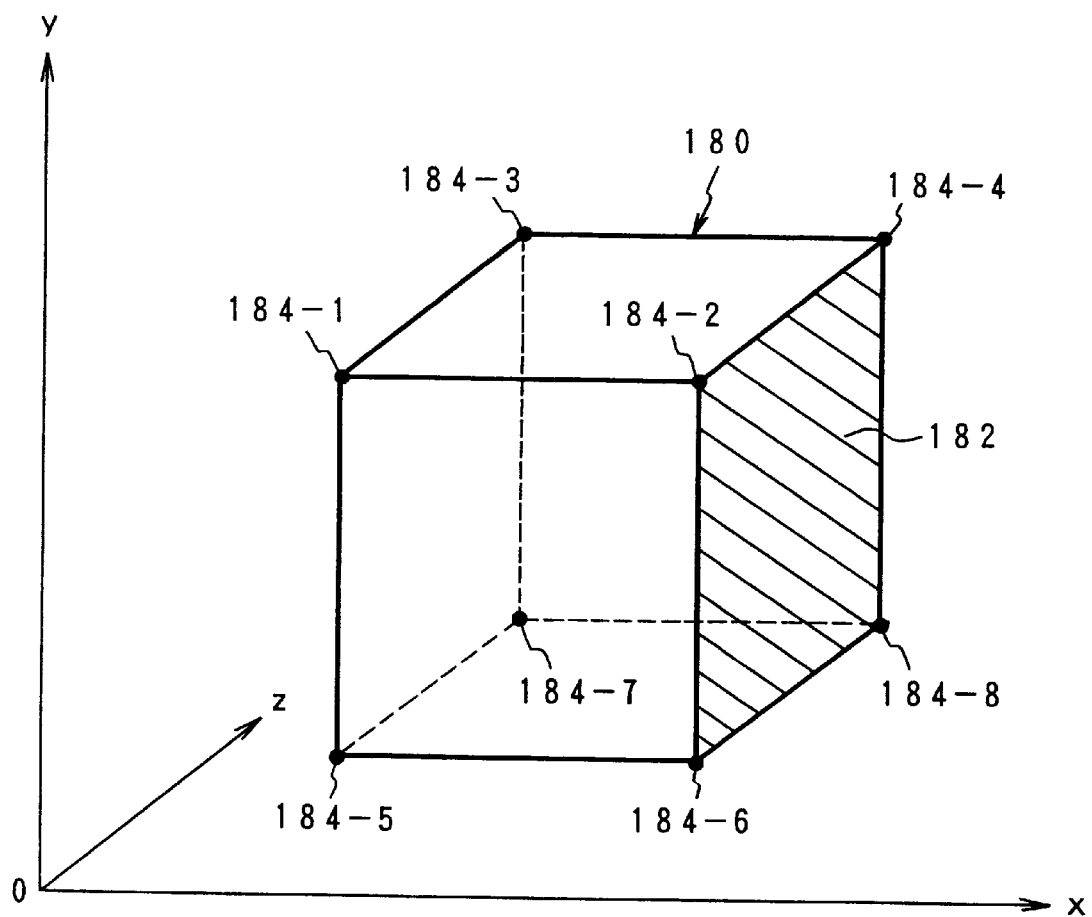

F I G. 4 5
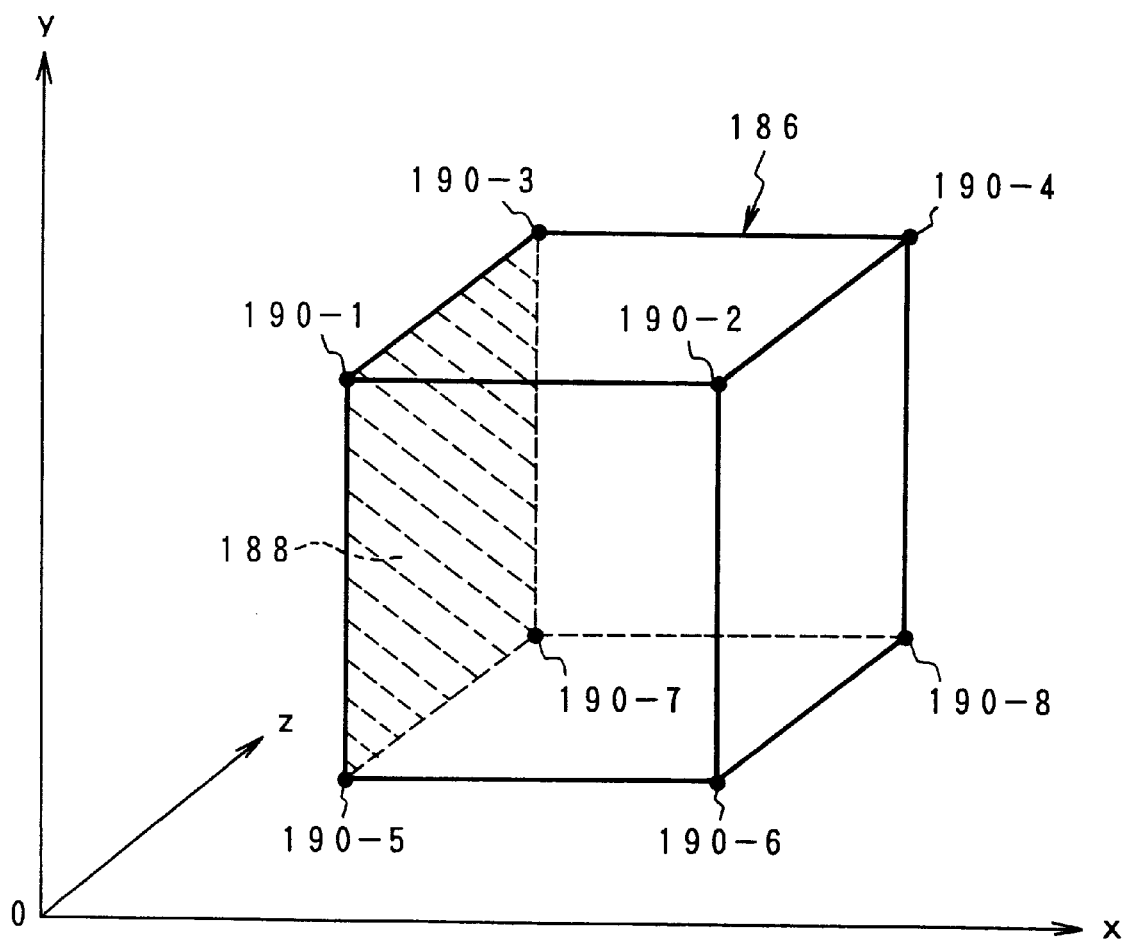

F I G. 4 7
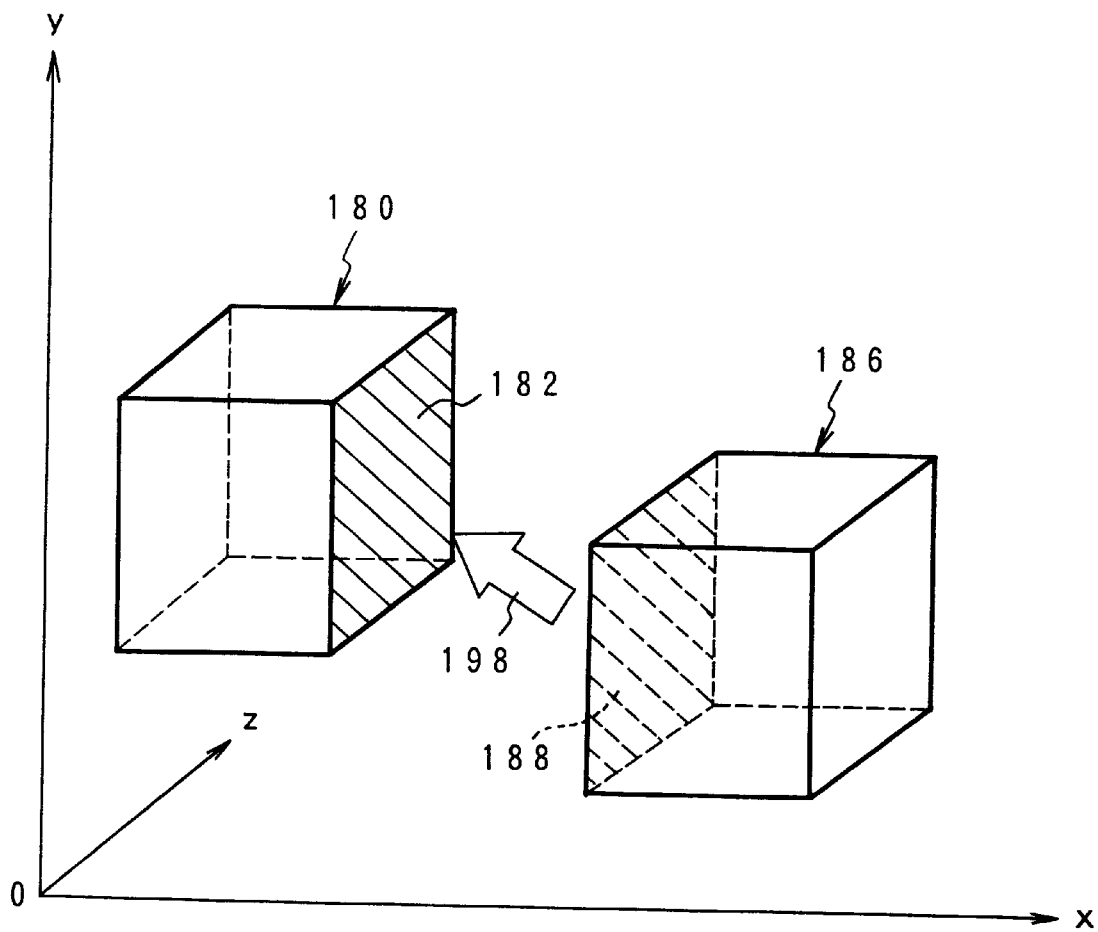

FIG. 50
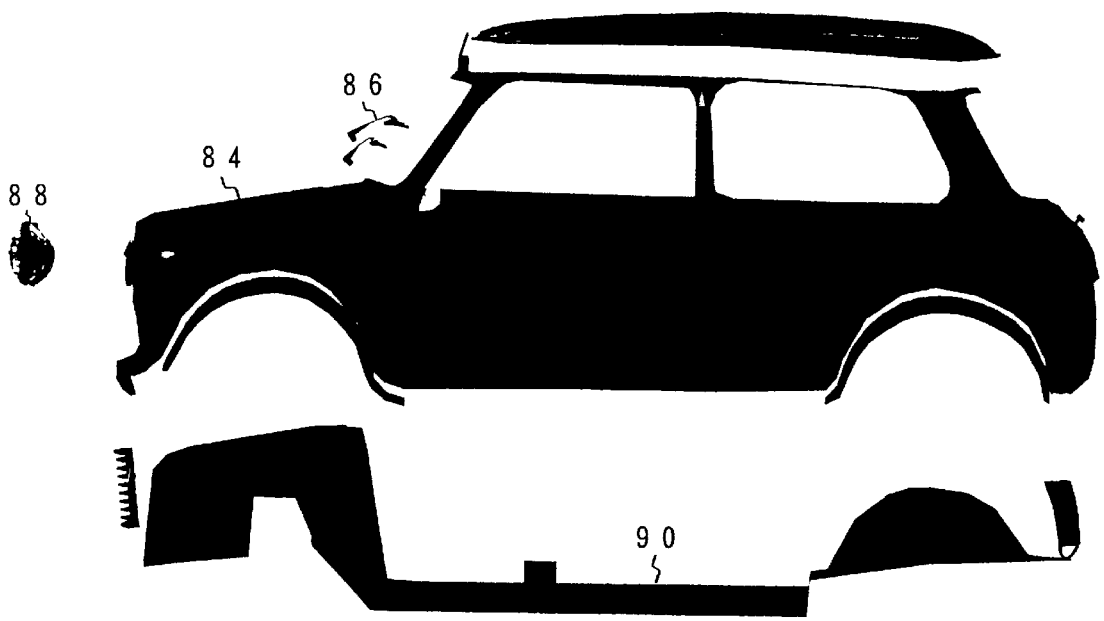
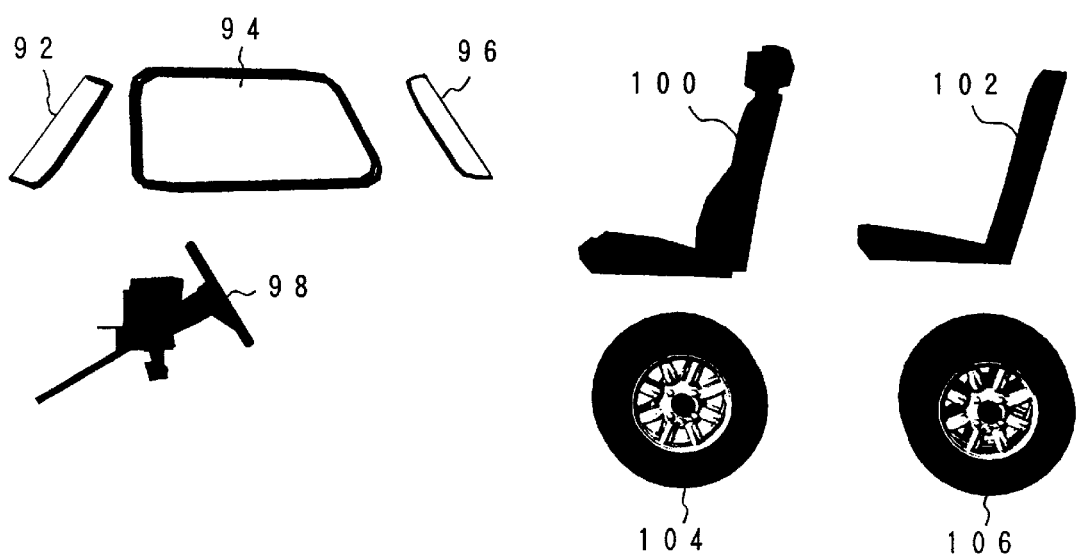

APPARATUS AND METHOD FOR CREATING THREE-DIMENSIONAL OBJECT MODEL, AND COMPUTER READABLE RECORD MEDIUM HAVING THREE-DIMENSIONAL OBJECT MODEL CREATION PROGRAM RECORDED THEREON

BACKGROUND OF THE INVENTION

1. Field of the Invention

The present invention relates generally to a three-dimensional object model creation apparatus and method for creating three-dimensional object models by means of computer graphics (CG), as well as to a computer readable record medium having a three-dimensional object model creation program recorded thereon. The invention relates more particularly to a three-dimensional object model creation apparatus and method for creating the three-dimensional object models through the assembly of part models, as well as to a computer readable record medium on which is recorded a three-dimensional object model creation program.

2. Description of the Related Art

With the increasing use of multimedia computer systems in recent years, three-dimensional computer graphics using e.g., polygons are prevailing, so that a demand is also increasing for systems ensuring easy creation of three-dimensional models having high quality without any need for profound knowledge and experience of the computer graphics. Known as such a conventional method ensuring easy creation of the three-dimensional object models is for instance Method of Arranging Three-dimensional Object Models disclosed in Japanese Patent Laid-open Pub. No. Hei 7-175944. In this three-dimensional object model arrangement method, a three-dimensional object model to be created is first displayed in two-dimensional views consisting of side elevation, front elevation, top plan view, etc. Then, the operator designates reference points common to the two-dimensional views and designates positions of the thus designated reference points in a three-dimensional space through the input of coordinate values or the positioning of a cursor on the screen. This allows sequential displays of the two-dimensional side elevation, front elevation and top plan view in conformity with the reference points designated by the three-dimensional space, after which transverse, depth direction and upward sweeps are respectively effected to model them into three solid figures, which in turn are subjected to AND processing to create a three-dimensional object model. In cases where another part model is assembled to the thus created three-dimensional object model, the part model is displayed in two-dimensional views consisting of side elevation, front elevation, top plan view, etc., and then the operator designates on the two-dimensional views reference points common to the views. The operator further detects by visual observation the positions of the designated reference points to be assembled to the model in the three-dimensional space and designates them. This will allow sequential displays of the side elevation, front elevation and top plan view of the assembling part in conformity with the reference points designated by the three-dimensional space, after which transverse, depth direction and upper sweeps are respectively effected to model them into three solid figures, which in turn are subjected to AND processing to create a three-dimensional part model for assembling.

In such conventional three-dimensional object model creation processing, however, the three-dimensional object model is assembled through the repetition of the simultaneous operations of the creation and assembling of the three-dimensional part models, in which creating operation the sweeps are effected with the two-dimensional views displayed in the three-dimensional coordinate space to create solid figures to be subjected to the AND processing, with the result that an increased number of parts are required with the extremely elongated time for the creation of a three-dimensional object model. In addition, assembling positions of the part model are designated by the operator as reference point three-dimensional coordinate values through the visual observation of the assembling positions on the three-dimensional object model in the process of assembly, so that the positional offset error is relatively large making it difficult to provide the accurate assembly of the three-dimensional object model. For this reason, the operator must perform additional adjustment for the positional offset of the assembling parts after the assembling, resulting in further increased labor hours.

SUMMARY OF THE INVENTION

According to the present invention, there are provided a three-dimensional object model creation apparatus and method ensuring a simple and accurate creation of a three-dimensional object model through the assembly of the part models, as well as a computer readable record medium on which is recorded a three-dimensional object model creation program.

A three-dimensional object model creation apparatus of the present invention comprises a part model creation unit for creating a three-dimensional part model having junction reference data for the junction with other part models; a part storage unit in which are stored a plurality of the part models necessary for the assembly of a three-dimensional object model; and an assembly processing unit for selecting at least two part models from the part storage unit for the arrangement in a work coordinate space to junction the part models on the basis of the junction reference data, to thereby assemble the three-dimensional object model. In this manner, the three dimensional object model creation apparatus prepares part models in advance and completes a final model through the assembling of the part models on a screen so that the creation of the parts and the assembly of the parts are purely separated from each other, resulting in a reduction of operator's burden of work and in shortened work time. Moreover, the thus prepared part models are each provided with junction reference data in addition to the three-dimensional geometric data so that associated parts are joined together in such a manner that respective junction reference points designated by the junction reference data register with each other, whereby essentially the operator has only to select the parts and arrange them in the work space in order to effect accurate assembly of the part models.

The part model creation unit essentially adds one point three-dimensional coordinate values as the junction reference data to three-dimensional geometric data of the part model, and the assembly processing unit alters three-dimensional geometric data of the part models so as to allow three-dimensional coordinate values of the junction reference of respective part models to coincide with each other to thereby junction the part models together. The part model creation unit may add two points three-dimensional coordinate values as the junction reference data to three-dimensional geometric data of the part model, and correspondingly the assembly processing unit may alter three-dimensional geometric data of the part models so as to allow three-dimensional coordinate values of the two points junction reference of respective part models to coincide with each other to thereby junction the part models together. The part model creation unit could add to three-dimensional geometric data of the part model three points three-dimensional coordinate values as the junction reference data, and correspondingly the assembly processing unit could alter three-dimensional geometric data of the part models so as to allow three-dimensional coordinate values of the three points junction reference of respective part models to coincide with each other to thereby junction the part models together.

In these cases, the part model creation unit can provide the junction reference data on the surface or in the interior or outside of each of the three-dimensional part models as needed. That is, since the junction reference data can be provided independently of the three-dimensional geometric data of the part models, they may be disposed not only on the surfaces of the part models but also in the interior of the models so as to allow the associated part models to align with each other in a superposed manner, or instead may be disposed outside of the part models so as to allow the associated part models to align with each other in a separate manner. The part model creation unit provides a specific ID on each of the part models and correspondingly the assembly processing unit uses the ID of the part model to create an ID table defining the relationship of junction of the part models, and selects and junctions the part models defined by the ID table to thereby automatically assemble a three-dimensional object model.

The part model creation unit adds three or more three-dimensional coordinate values as the junction reference data to three-dimensional geometric data of the part model, the part model creation unit further adding thereto the order information determining the rotational direction of the plurality of junction reference data. In this case, the assembly processing unit junctions the part models in such a manner as to allow three-dimensional coordinate values and the rotational direction order information in the plurality of junction reference data of respective part models to coincide with each other. The part model creation unit adds regular polygon data as the junction reference data to three-dimensional geometric data of the part model, and in this case the assembly processing unit alters three-dimensional geometric data of the part models so as to allow regular polygon data of respective part models to coincide with each other, to thereby junction the part models. The assembly processing unit could position the part models with an angular offset in the rotational direction determined by the number of apexes of the regular polygon data, to thereby junction the part models together.

The part model creation unit adds junction surface data as the junction reference data to three-dimensional geometric data of the part model, and in this case the assembling processing unit alters three-dimensional geometric data of the part models so as to allow the junction surface data of respective part models to coincide with each other, to thereby junction the part models. That is, the part model creation unit uses as the junction surface data polygon surface information designated by three-dimensional data, and the assembly processing unit alters three-dimensional geometric data of the part models so as to allow apex coordinate values of the junction surface of respective part models to coincide with each other, to thereby junction the part models. Use of the junction surface data (polygonal surface information) of the part models as the junction reference data in this manner would contribute to a simplification due to no need to newly create the junction reference data. The part model creation unit adds, besides the junction surface data, information on a junction angular offset upon the junction with the other part models, and the assembly processing unit sets a junction angle between associated part models on the basis of the junction angular offset information upon the junction of the part models. The part model creation unit adds, besides the junction surface data, junction direction information indicative of the direction of junction upon the junction with other part models, and the assembly processing unit junctions associated part models on the basis of the junction direction information upon the junction with the part models.

With at least two part models to be assembled together being arranged in the work coordinate space, the assembly processing unit moves either one of the at least two part models to junction associated part models together through the alignment of the reference junction points. The part creation unit sets on junction reference data basis a junction allowable domain allowing an automatic junction with the other part model, and in this case with at least two part models being arranged in the work coordinate space, the assembly processing unit moves either one of the at least two part models and when it reaches the junction allowable domain of the other part model, junctions the part models together.

A variation of the three-dimensional object model creation apparatus in accordance with the present invention comprises a part model storage unit and an assembly processing unit to the exclusion of the part model creation unit. The part models stored within the part storage unit each have junction reference data for the junction with the other part models, of which details are substantially the same as the case of the provision of the part model creation unit.

The present invention also provides a three-dimensional object model assembly method which comprises a part creation step for creating as a part model necessary for the assembly of a three-dimensional object model a three-dimensional part model having junction reference data for the junction with the other part models, to store it in a part storage unit; and an assembly processing step for selecting at least two models from the part storage unit for the arrangement in the work coordinate space, to junction the part models together on the basis of the junction reference data to assemble the three-dimensional object model.

A variant of the three-dimensional object model assembly method of the present invention comprises the steps of selecting at least two part models, as part models necessary for the assembly of a three-dimensional object model, from a part storage unit storing therein three-dimensional part models each having junction reference data for the junction with the other part models; arranging selected part models in a work coordinate space; and junctioning associated part models on the basis of the junction reference data to assemble the three-dimensional model.

The present invention further provides a computer readable record medium on which is recorded a three-dimensional object model creation program, comprising a part creation module for creating as part models necessary for the assembly of a three-dimensional object model three-dimensional part models each having junction reference data for the junction with the other part models, to store it into a part storage unit; and an assembly processing module for selecting at least two part models from the part storage unit for the arrangement in a work coordinate space, to junction the part models on the basis of the junction reference data for the assembly of the three-dimensional object model.

In a variant of the record medium on which is recorded a three-dimensional object model creation program, at least two part models are selected from a part storage unit in which are stored, as part models necessary for the assembly of a three-dimensional object model, three-dimensional part models having junction reference data for the junction with the other part models, the at least two part models being arranged in a work coordinate space, the part models being joined together on the basis of the junction reference data to consequently assemble the three-dimensional object model.

The above and other objects, features, and advantages of the present invention will become more apparent from the following detailed description with reference to the drawings.

BRIEF DESCRIPTION OF THE DRAWINGS

FIG. 1 is a functional block diagram of a configuration of an apparatus in accordance with the present invention;

FIG. 5 is an explanatory diagram of another part model having one point junction reference data;

FIG. 7 is an explanatory diagram in which the part model of FIGS. 4 and 5 are arranged in a world coordinate space for the work;

FIG. 9 is an explanatory diagram of assembling processing of the part model on the basis of junction reference data;

FIG. 14 is an explanatory diagram of a data structure of the part model having the junction angle offset information;

FIG. 17 is an explanatory diagram of a data structure of the part model having the junction allowable domain;

FIG. 25 is an explanatory diagram of a part model having three points junction reference data;

FIG. 29 is an explanatory diagram of assembling processing of the part model having three points junction reference data;

FIG. 30 is an explanatory diagram of a part model having an ID;

FIG. 31 is an explanatory diagram of a management table for use in automatic assembling of the part model of FIG. 30;

FIG. 32 is an explanatory diagram of a data structure of the part model having ID;

FIG. 38 is an explanatory diagram of wrong assembling processing of the part models in case of having neglected the rotational direction order information of the junction reference data;

FIG. 42 is an explanatory diagram of a data structure of the part model having regular polygonal junction reference data;

FIG. 43 is an explanatory diagram of assembling processing and offset rotation of the part model having regular polygonal junction reference data;

FIG. 44 is an explanatory diagram of a part model having polygonal surface information as the junction reference data;

FIG. 45 is an explanatory diagram of another part model having polygonal surface information as the junction reference data;

FIG. 47 is an explanatory diagram of a pre-assembling part model having polygonal surface information as the junction reference data;

FIG. 50 is an explanatory diagram of part models for use on the work screen of FIG. 49;

DETAILED DESCRIPTION OF THE PREFERRED EMBODIMENTS

Basic Configuration

Figure 2:
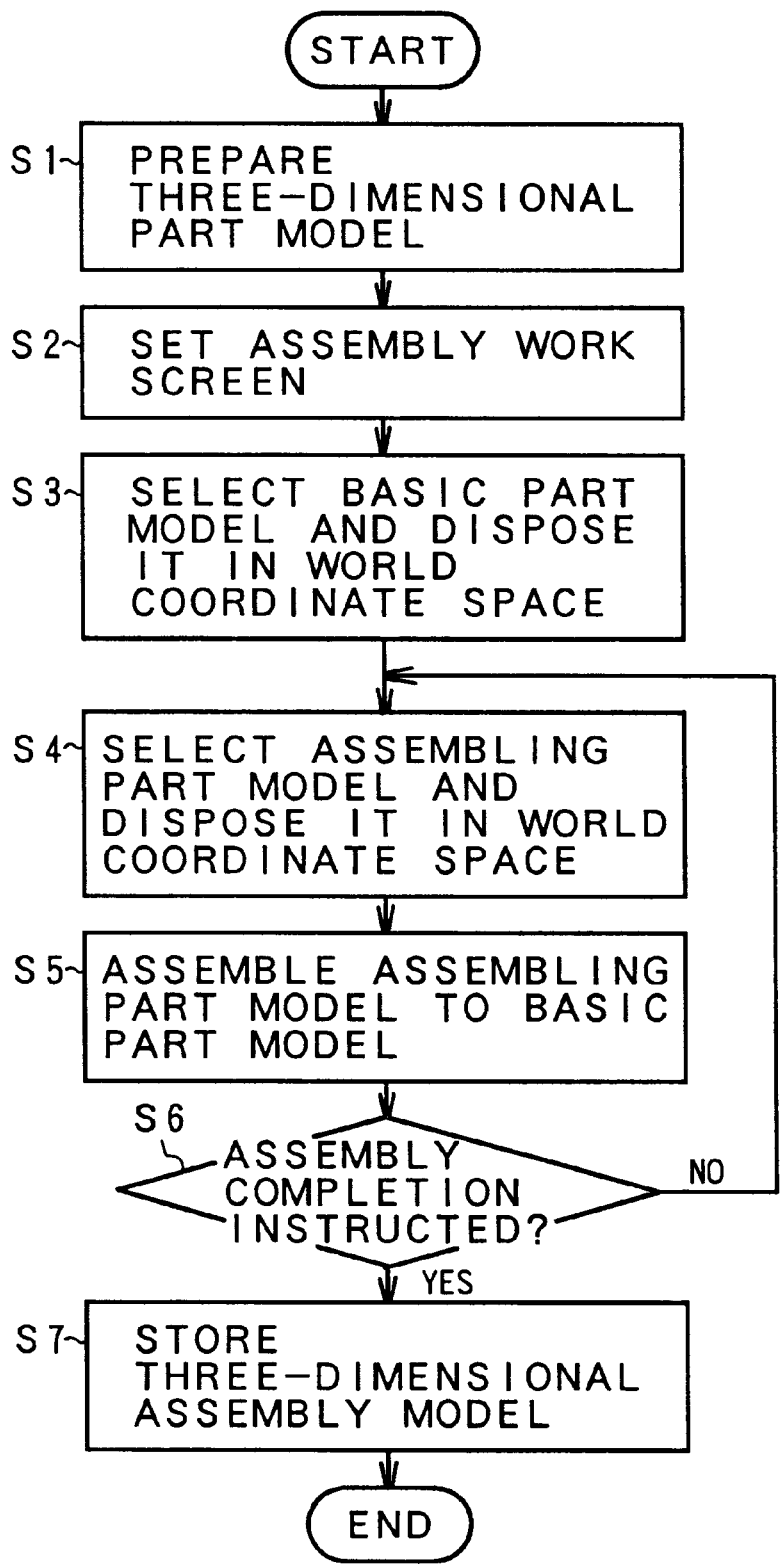
FIG. 2 is a flowchart of three-dimensional object model creation processing in accordance with the present invention.

Referring to FIG. 1, a three-dimensional object model creating apparatus in accordance with the present invention comprises a part model creation unit 10, a part storage unit 14 for storing therein a group of part models 16, an assembly processing unit 18, and an assembly model storage unit 22 for storing therein an assembly model 24 in the course of assembly or which has already been assembled. The part model creation unit 10 creates part models necessary for the assembly of a desired three-dimensional object model and stores them as the group of part models 16 into the part storage unit 14. Upon the creation of part models by means of the part model creation unit 10, three-dimensional geometric data are created in a part coordinate space using a work screen 12, the geometric data capable of being displayed by computer graphics in accordance with a technique known as CAD. In the creation of the part models, the present invention allows each part model to have junction reference data for joining it to the other part models. As will become apparent from the subsequent description, the junction reference data to be imparted to each part model can include for instance one point, two points, three points, more than three points, a regular polygon or a junction surface. Furthermore, the junction reference data to be imparted to a part model are set separately from and independently of the three-dimensional geometric data of the part model. For this reason, the junction of part models can be set arbitrarily, as needed, not only on the surfaces of the part models but also at desired positions within the interior of the part models or at positions in the exterior of the part models. The assembly processing unit 18 is activated when all part models necessary for the assembly of a three-dimensional object model have been stored as the group of part models 16 into the part storage unit 14. The assembly processing unit 18 then selects some parts to be assembled from among the group of part models 16 and arranges them on a work screen 20, thereby allowing execution of assembling processing based on the junction reference data which each part model possesses. This work screen 20 makes use of a world coordinate space serving as a common coordinate space for the assembly of the part models, which space is different from the part coordinate space used upon the creation of the part models on the work screen 12 of the part model creation unit 10. Thus, in cases where the assembly processing unit 18 have selected some part models from the part storage unit 14 and arranged them in the world coordinate space on the work screen 20, three-dimensional geometric data of the part models having values in the part coordinate space are converted into three-dimensional geometric data in the world coordinate space. When the assembly processing unit 18 completes a three-dimensional object model through the assembly of the part models using the work screen 20 displaying the world coordinate space, the three-dimensional object model can be stored as an assembly model 24 into the assembly model storage unit 22. Naturally, some assembly models in the process of assembly may also temporarily be stored in the assembly model storage unit 24 and thereafter invoked again onto the work screen 20 by means of the assembly processing unit 18 so as to allow the assembly of the remaining part modes to be continued. The assembly processing unit 18 is also able to perform disassembly processing for disassembling some part models from the assembly model 24 being arranged on the work screen 20. The disassembly processing includes a procedure reverse to that of the assembly processing. It is natural that the disassembled part models need not be returned to the group of part models 16 within the part storage unit 14. In this manner, the part model creation unit 10, the part storage unit 14, the assembly processing unit 18 and the assembly model storage unit 22 constitute the basic configuration of the three-dimensional object model creating apparatus of the present invention. Since in this case the three-dimensional assembly model 24 thus created and stored in the assembly model storage unit 22 is normally utilized by the user as a material for the computer graphics, an assembly model utilization unit 26 is associated with the assembly model storage unit 22. The assembly model utilization unit 26 uses the assembled assembly model 24 stored in the assembly model storage unit 22, to perform display processing on a utilization screen 28 through an application using the computer graphics.

In the three-dimensional object model creation apparatus of the present invention, the part storage unit 14 for storing therein the group of part models 16, the assembly processing unit 18 and the assembly model storage unit 22 are units provided to the user, whereas the part model creation unit 10 is a unit used by the application provider in its software factory. That is, the provider of the three-dimensional object model creating apparatus uses the part model creation unit 10 to create a group of part models 16 having junction reference data necessary for the creation of a three-dimensional object model to store them into the part storage unit 14, and provides to the user an application having functions of the part storage unit 14 in which the created group of part models 16 are stored, as well as of the assembly processing unit 18. Thus, without the need for the part model creating work based on profound knowledge of the computer graphics by means of the part model creation unit 10, the user is able to create a three-dimensional object model having as high a quality as obtained when created by the normal computer graphics technique, through the part model assembling work on the work screen 20 by the assembly processing unit 18, using the group of part models 16 provided by the application.

FIG. 2 is a flowchart of the three-dimensional object model creation processing of FIG. 1. First, in step S1 the three-dimensional part models are created by the part model creation unit 10 and stored in the part storage unit 14, to complete preparation processing. This three-dimensional object model preparation processing is usually performed by the application provider and is provided to the user. Then, in step S2 the assembly processing unit 18 is activated to set the work screen 20 for assembly, and in step S3 a basic part model constituting the basic structure of the assembly is selected from among the group of part models 16 and is disposed in the world coordinate space on the work screen 20. Then, in step S4 an assembling part model to be assembled to the basic part model is selected from among the group of part models 16 and is disposed in the world coordinate space on the work screen 20. After the arrangement of the two part models in the world coordinate space on the work screen 20 in this manner, in step S5 a previously prepared assembling processing execution command is operated to perform assembling processing in which the assembling part model is assembled to the basic part model on the basis of junction reference data possessed by the part models. After the completion of the assembling, in step S6 a check is made to see if an assembly completion instruction has been issued, and the assembling processing in steps S4 and S5 is repeated until the assembly completion instruction is issued. If the assembly completion instruction has been issued, in step S7 a three-dimensional assembly model which has been assembled or is in the process of the assembly is stored in the assembly model storage unit 22 to complete a series of processing.

Figure 3:
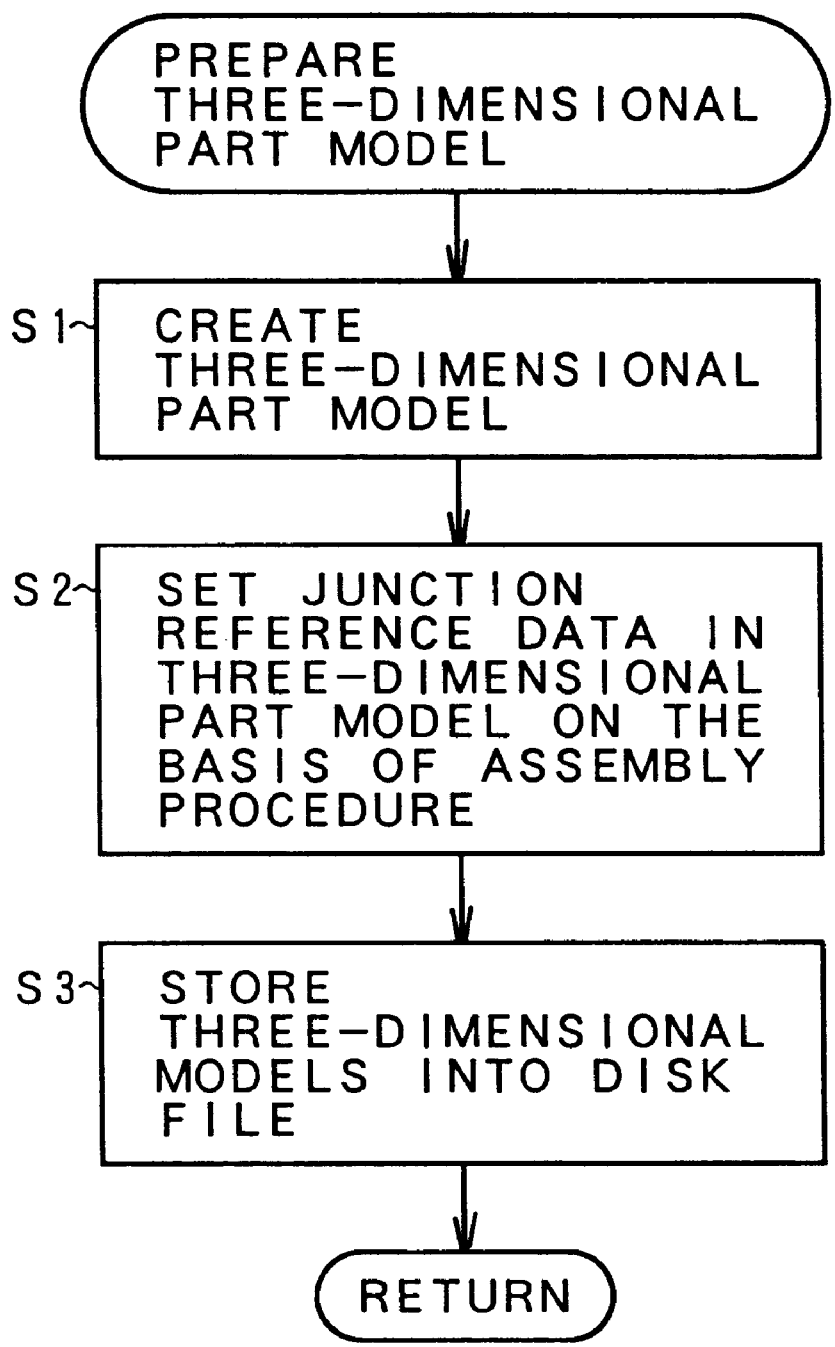
FIG. 3 is a flowchart of three-dimensional part model preparation processing of FIG. 2.

FIG. 3 is a flowchart of the three-dimensional part model preparation processing executed by the part model creation unit 10 in step S1 of FIG. 2. First, in step S1 a three-dimensional part model necessary for the assembly of a three-dimensional object model is created by utilizing, e.g., a three-dimensional object creating technique in CAD. Then, in step S2 junction reference data are set to the thus created three-dimensional part model in conformity with an assembly procedure which has been prepared in advance. After the completion of the setting of the junction reference data, in step S3 the group of three-dimensional part models are stored in the part storage unit 14 such as a disk file.

One Point Junction

Figure 4:
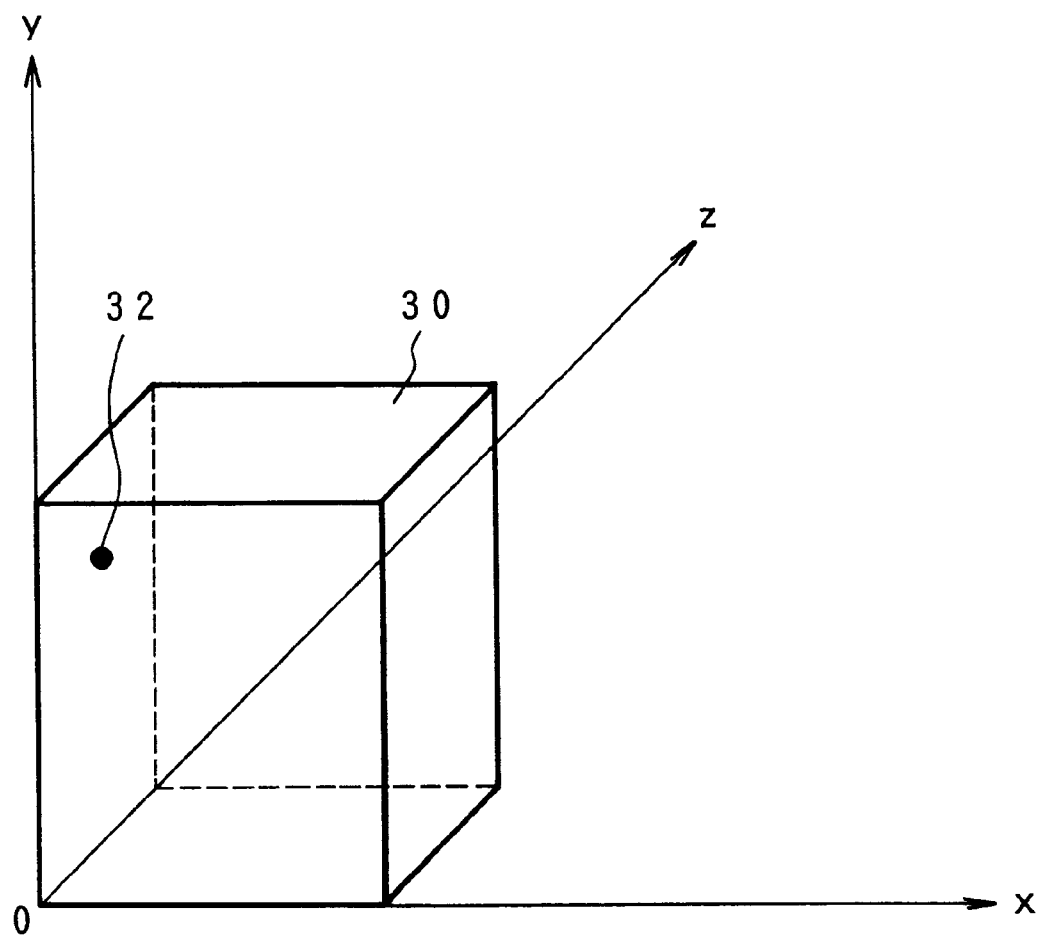
FIG. 4 is an explanatory diagram of a part model having one point junction reference data.

FIG. 4 is an explanatory diagram of a part model having junction reference data as one point. The part model 30 has a three-dimensional geometry in the shape of a rectangular parallelepiped for instance and is created as three-dimensional geometric data in the three-dimensional part coordinate space by the part model creation unit 10 of FIG. 1. This part model 30 has one point junction reference data 32 set on the model surface.

FIG. 5 illustrates a part model 46 on the reference side (fixed side) to which the part model 30 of FIG. 4 is assembled. The part model 46 is also displayed on the basis of three-dimensional geometric data created in the three-dimensional part coordinate space by the part model creation unit 10 of FIG. 1, and it has on its model surface a single junction reference point 48.

Figure 6:
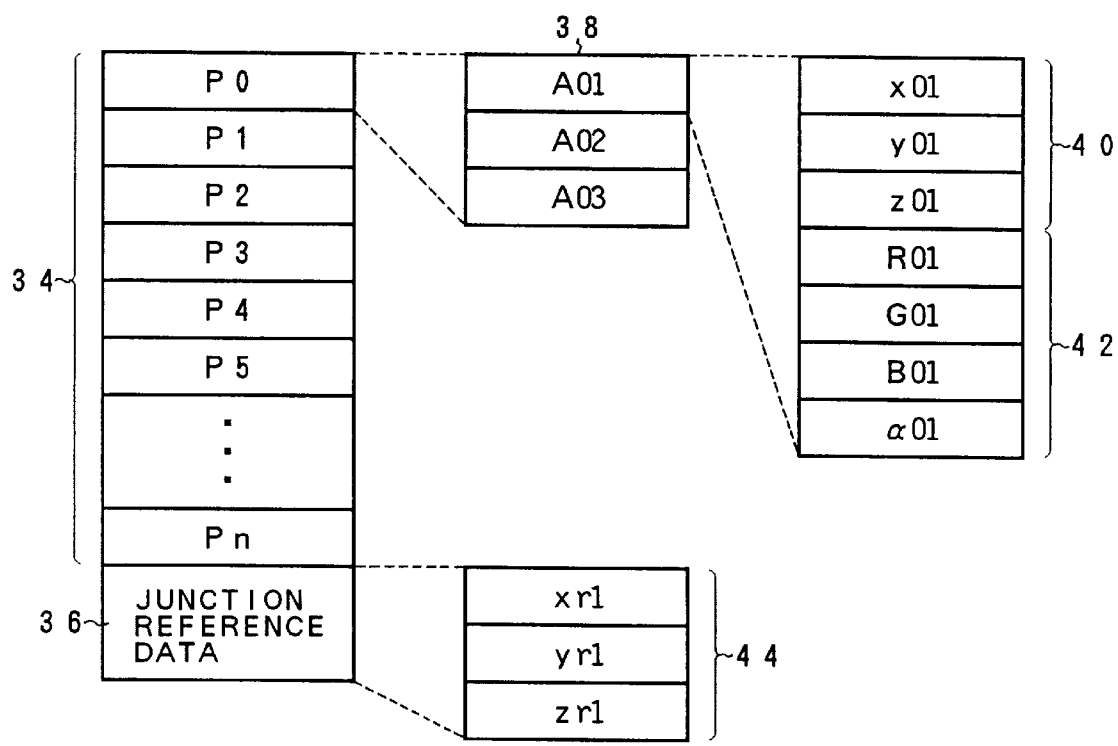
FIG. 6 is an explanatory diagram of a data structure of a three-dimensional part model of FIGS. 4 and 5.

FIG. 6 illustrates a data structure of the three-dimensional geometric data for displaying on the work screen the part model 30 of FIG. 4 or the part model 46 of FIG. 5. The three-dimensional geometric data comprise polygon data 34 consisting in this example of polygons P0 to Pn. As represented by the uppermost polygon P0, the polygons P0 to Pn each comprise apex data 38. For example, in this embodiment use is made of a triangular polygon and hence the apex data 38 consist of three apexes A01, A02 and A03. As represented by the apex A01 and shown rightward, the apexes A01 to A03 each comprise apex coordinates 40 and color information 42. The apex coordinates 40 consist of three-dimensional coordinate values (x01, y01, z01). The color information 42 consists of (R01, G01, B01) in case of an RGB color space for instance, as well as gloss information. (α01). In the present invention, such three-dimensional geometric data allowing the representation of a three-dimensional object model by the computer graphics further include junction reference data 36 in addition to the polygon data 34. Since the part model 30 of FIG. 4 and the part model 46 of FIG. 5 have single junction reference points 32 and 48, respectively, as the junction reference data 36, the content of the junction reference data 36 is junction reference point coordinate values 44, as shown taken out rightward, which include coordinate values (xr1, yr2, zr3). These junction reference point coordinate values 44 are set separately from or independently of the apex coordinate values 40 associated with the polygon data 34.

FIG. 7 illustrates a pre-assembling state in which the part model 30 of FIG. 4 and the part model 46 of FIG. 5 are selectively arranged in the world coordinate space on the work screen 20 by means of the assembly processing unit 18 of FIG. 1. In cases where the part models 30 and 46 having part coordinate spaces are arranged in this three-dimensional world coordinate space, the part coordinate spaces of the part models 30 and 46 are coordinate transformed for the arrangement into the three-dimensional world coordinate space on the work screen.

Figure 8A:
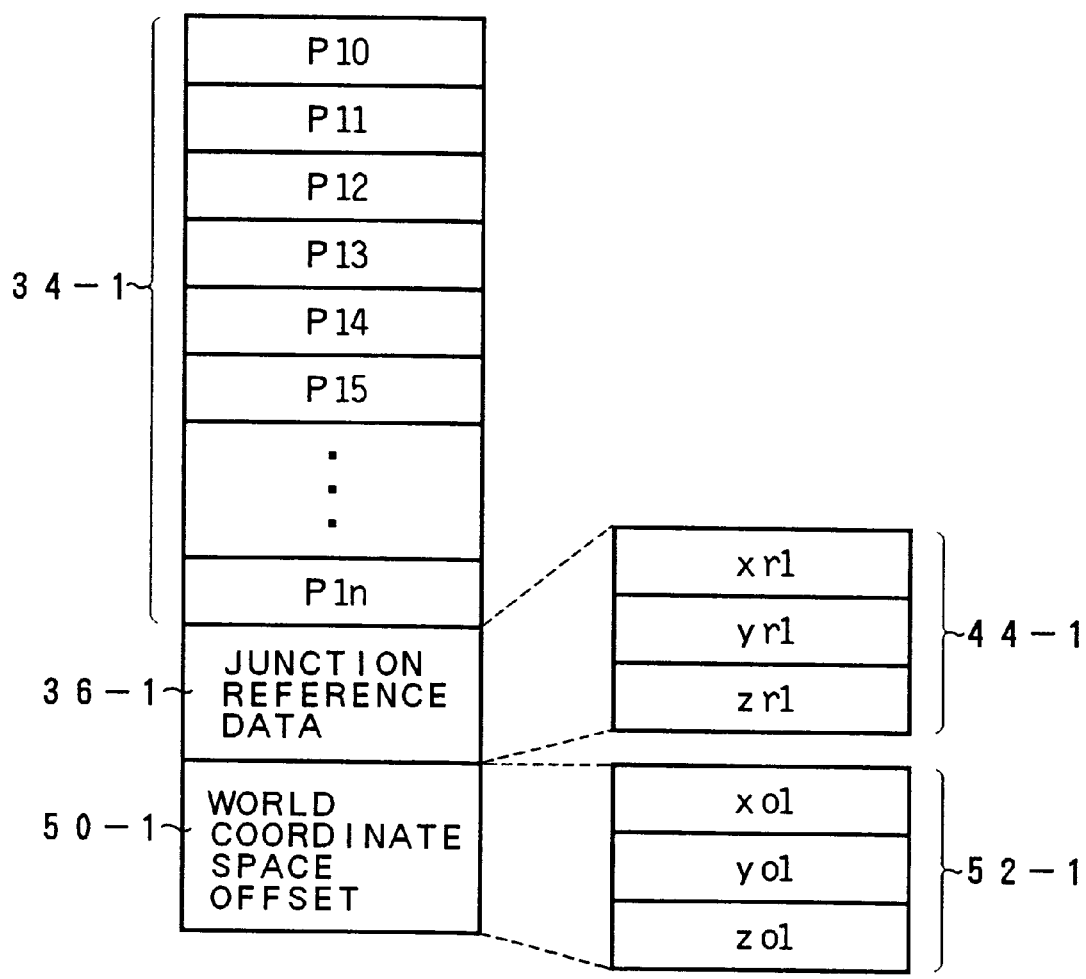
FIGS. 8A and 8B are explanatory diagrams of a data structure of the part model arranged in the world coordinate space of FIG. 7.
Figure 8B:
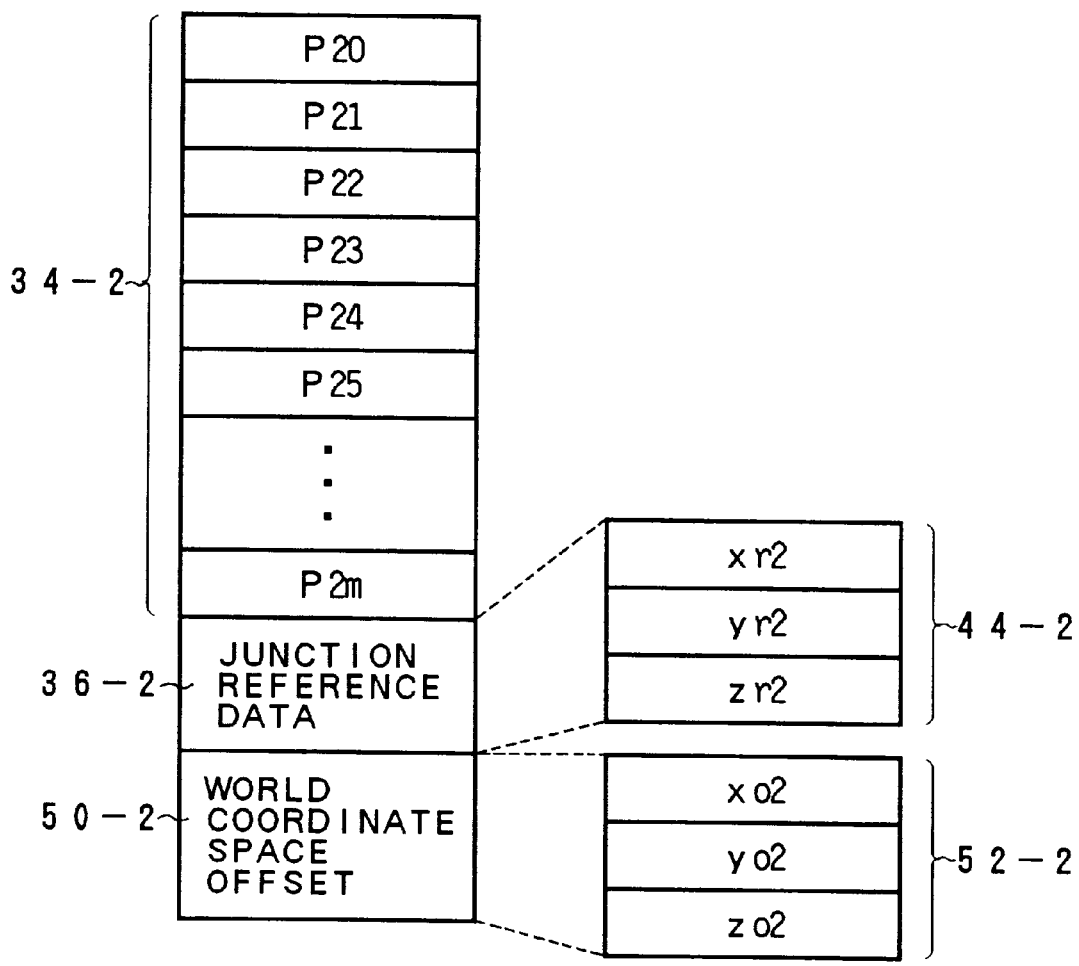

FIGS. 8A and 8B illustrate a data structure of three-dimensional geometric data of the part models when the part models 30 and 46 are arranged in the three-dimensional coordinate space as shown in FIG. 7.\_@ FIG. 8A shows three-dimensional geometric data of the part model 46 on the reference side (fixed side) which newly include a world coordinate space offset 50-1 in addition to the polygon data 34-1 and the junction reference data 36-1. The world coordinate space offset 50-1 consists of three-dimensional coordinate values which are differences in coordinate values between the origin O in the three-dimensional world coordinate space of FIG. 7 and the origin in the part coordinate space of the part model 46, with offset coordinate values 52-1 including (xo1, yo1, zo1) as shown taken out rightward for instance. Respective apex coordinate values of polygons P10 to P1n in the polygon data 34-1 are transformed into coordinate values in the world coordinate space by use of the offset values (xo1, yo1, zo1) of the offset coordinate values 52-1 given by the world coordinate space offset 50-1. More specifically, there is performed transformation processing which results in (coordinate values in part coordinate space)+(offset coordinate values)

FIG. 8B shows a data structure of three-dimensional geometric data in the world coordinate space of the part model 30 to be assembled of FIG. 7. In the same manner as the case of the part model 46 of FIG. 8A, it comprises polygon data 34-2, junction reference data 36-2 and a world coordinate space offset 50-2 consisting of offset coordinate values 52-2 (xo2, yo2, zo2) for instance.

FIG. 9 illustrates the state of junction when assembling processing has been executed by the assembly processing unit 18 of FIG. 1 with the part model 30 and the part model 46 being arranged on the work screen in the three-dimensional world coordinate space as in FIG. 7. In this case, the part model 30 is assembled to the part model 46 on the reference side (fixed side). For the assembling of the part model 30 to the part model 46, the part model 30 to be assembled is so rearranged that the junction reference point 32 possessed by the part model 30 is aligned with the junction reference point 48 possessed by the part model 46 in FIG. 7. More specifically, the three-dimensional difference between the junction reference point 32 of the part model 30 and the junction reference point 48 of the part model 46 in the state of arrangement of FIG. 7 is calculated from junction reference point coordinate values 44-1 of the junction reference data 36-1 of FIG. 8A and junction reference point coordinate values 44-2 of the junction reference data 36-2 of FIG. 8B. That is, the difference (Lx, Ly, Lz) between the two junction reference points 32 and 48 in the world coordinate space is given as $$Lx = xr2 - xr1$$

$$Ly = yr2 - yr1$$

$$Lz = zr2 - zr1$$

Then, the coordinate values are so modified that the coordinate values of the three-dimensional coordinate data of the part model 30 are displaced toward the part model 46 by the thus calculated difference (Lx, Ly, Lz) between the two junction reference points 32 and 48, with the result that rearrangement can be effected with the state of assembling in which the junction reference point 32 of the part model 30 is coincident with the junction reference point 48 of the part model 46 as in FIG. 9. That is, the assembling can be effected by transforming for rearrangement the three-dimensional geometric data coordinate values of the part model 30 so that the junction reference point 32 of the part model 30 is coincident with the junction reference point 48 of the part model 46. Although in FIG. 7 the distance between the junction reference points 32 and 48 of the part models 30 and 46, respectively, is processed in the absolute coordinates from the origin in the three-dimensional world coordinate space, it may be processed in the relative coordinates in the part coordinate spaces in which the part models 30 and 46 are created, and after the rearrangement to allow the junction reference points 32 and 48 to coincide with each other, it may be transformed again into the world coordinate space as shown in FIG. 9.

Figure 10A:
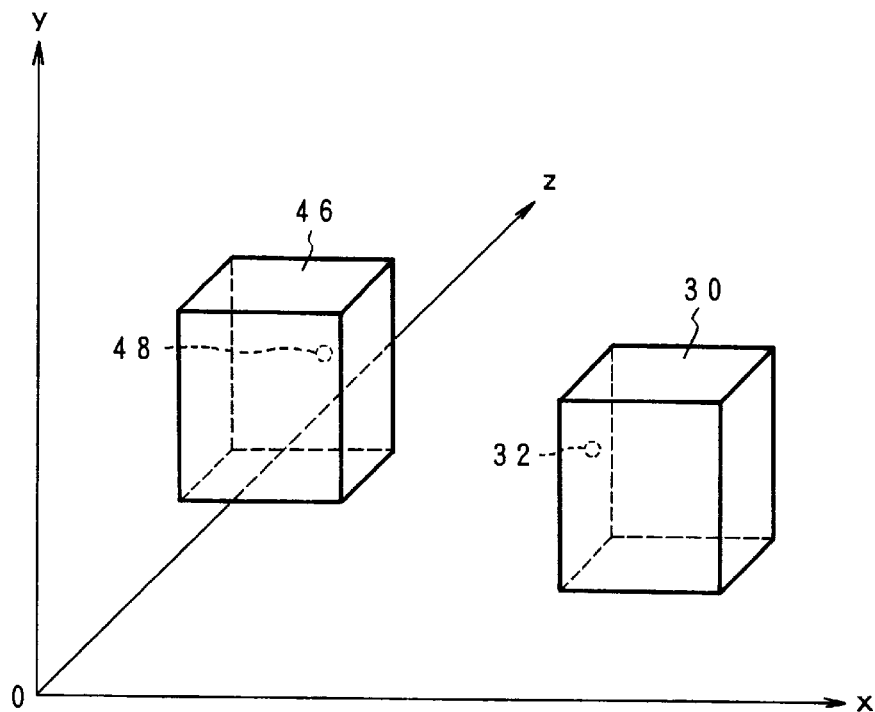
FIGS. 10A and 10B are explanatory diagrams of assembling processing of the part model in cases where the junction reference data are provided within the interior of the model.
Figure 10B:
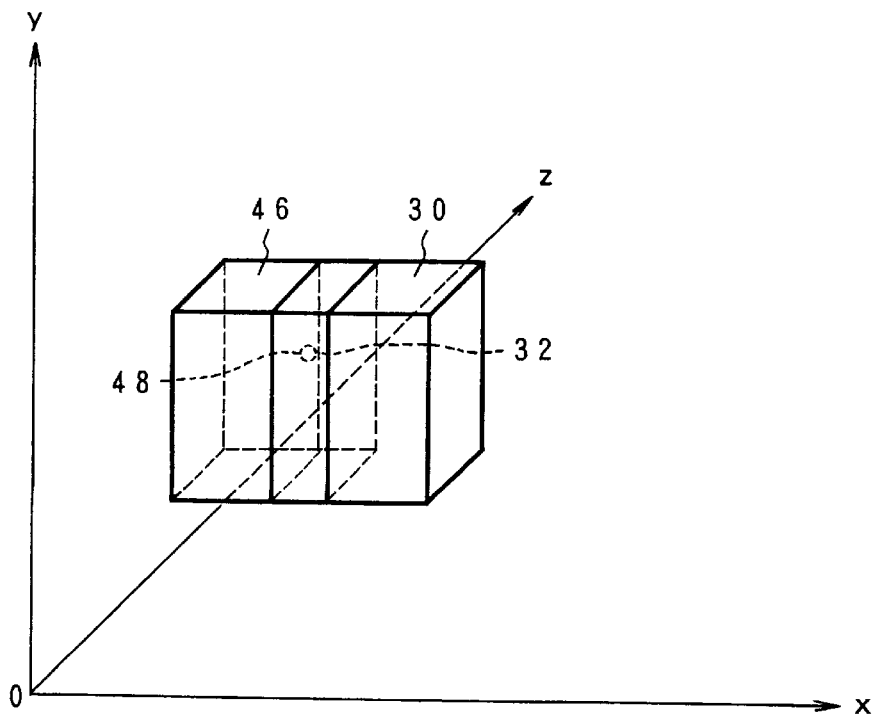

FIGS. 10A and 10B illustrate another embodiment of processing for assembling together part models having one point junction reference data. FIG. 10A shows the pre-assembling state in which the part models 30 and 46 are arranged in the world coordinate space, with the part models 30 and 46 having junction reference points 32 and 48 set in their respective intra-model units. FIG. 10B shows assembling processing in which the junction reference point 32 within the interior of the part model 30 is aligned with the junction reference point 48 within the interior of the part model 46, so that the part model 30 can be assembled to the part model 46 in an overlapping manner by the alignment of the junction reference points 32 and 48 imparted to the intra-model units.

Figure 11A:
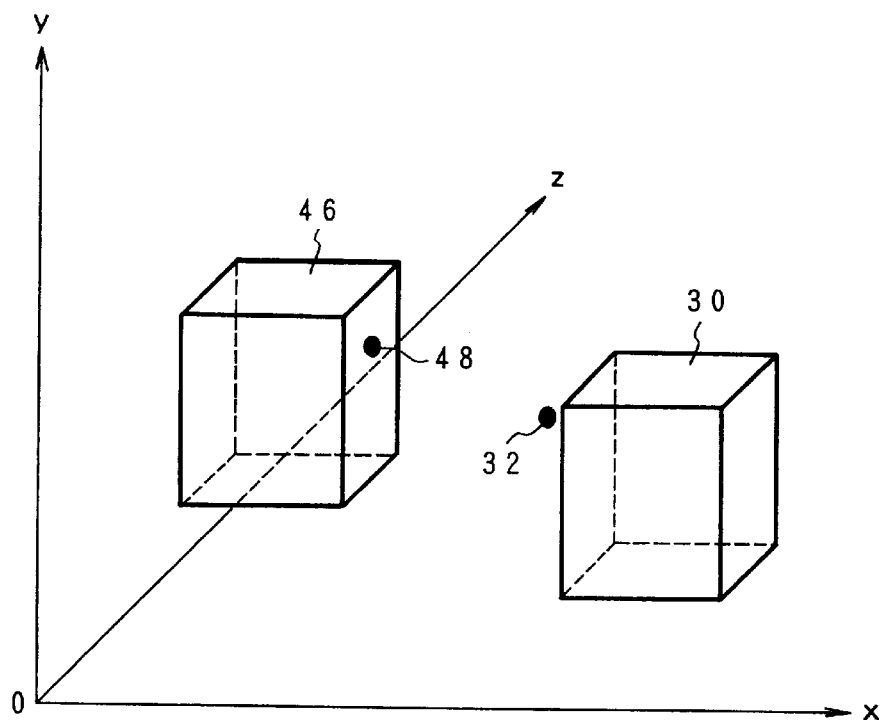
FIGS. 11A and 11B are explanatory diagrams of the assembling processing of the part model in cases where the junction reference data are provided outside the model.
Figure 11B:
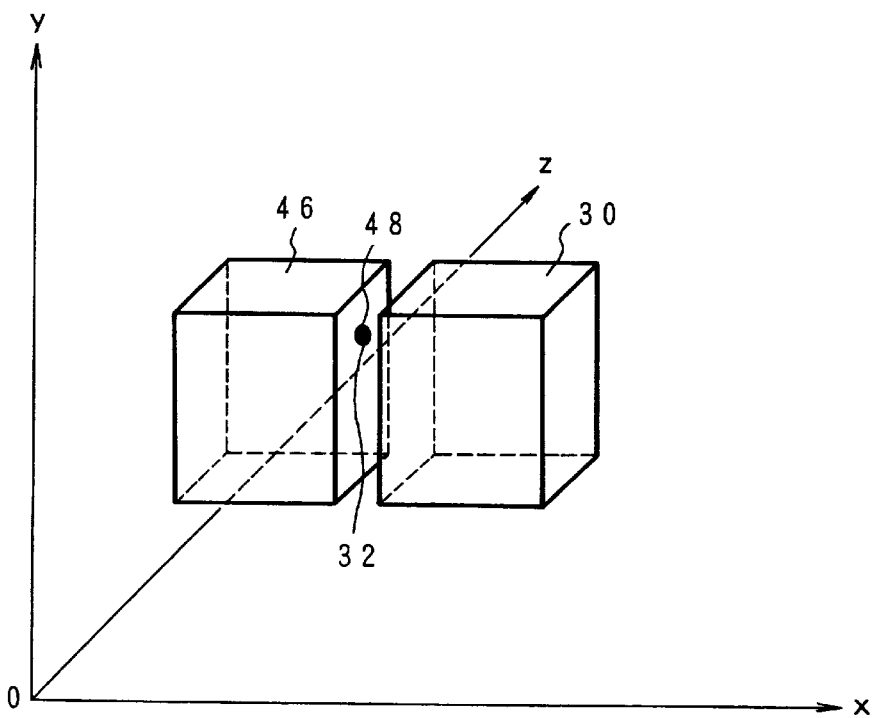

FIGS. 11A and 11B illustrate assembling processing in which the junction reference points are set outside the part models. That is, FIG. 11A shows the pre-assembling state in which the part models 30 and 46 are arranged in the world coordinate space, with the part model 46 having the junction reference point 48 set on the model front, but with the part model 30 having the junction reference point 32 set at a position in proximity to the extra-model unit. The execution of such assembling of the models 30 and 46 will result in the assembling processing as shown in FIG. 11B in which the junction reference point 32 disposed on the outside of the part model 30 is aligned with the junction reference point 48 of the part model 46, with the result that there is effected assembling allowing the part model 30 to be disposed apart a predetermined distance from the part model 46.

Figure 12:
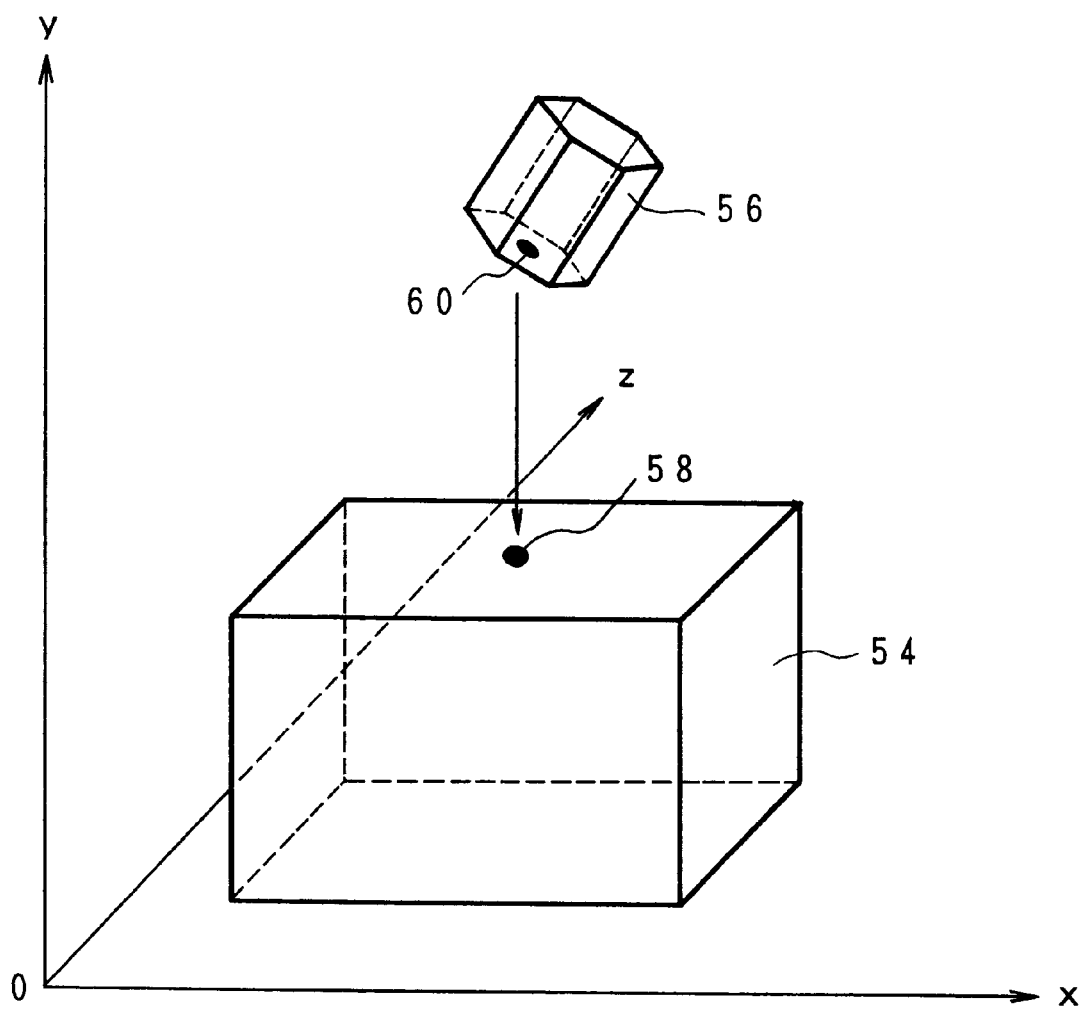
FIG. 12 is an explanatory diagram of a pre-assembling part model having junction angle offset information.
Figure 13:
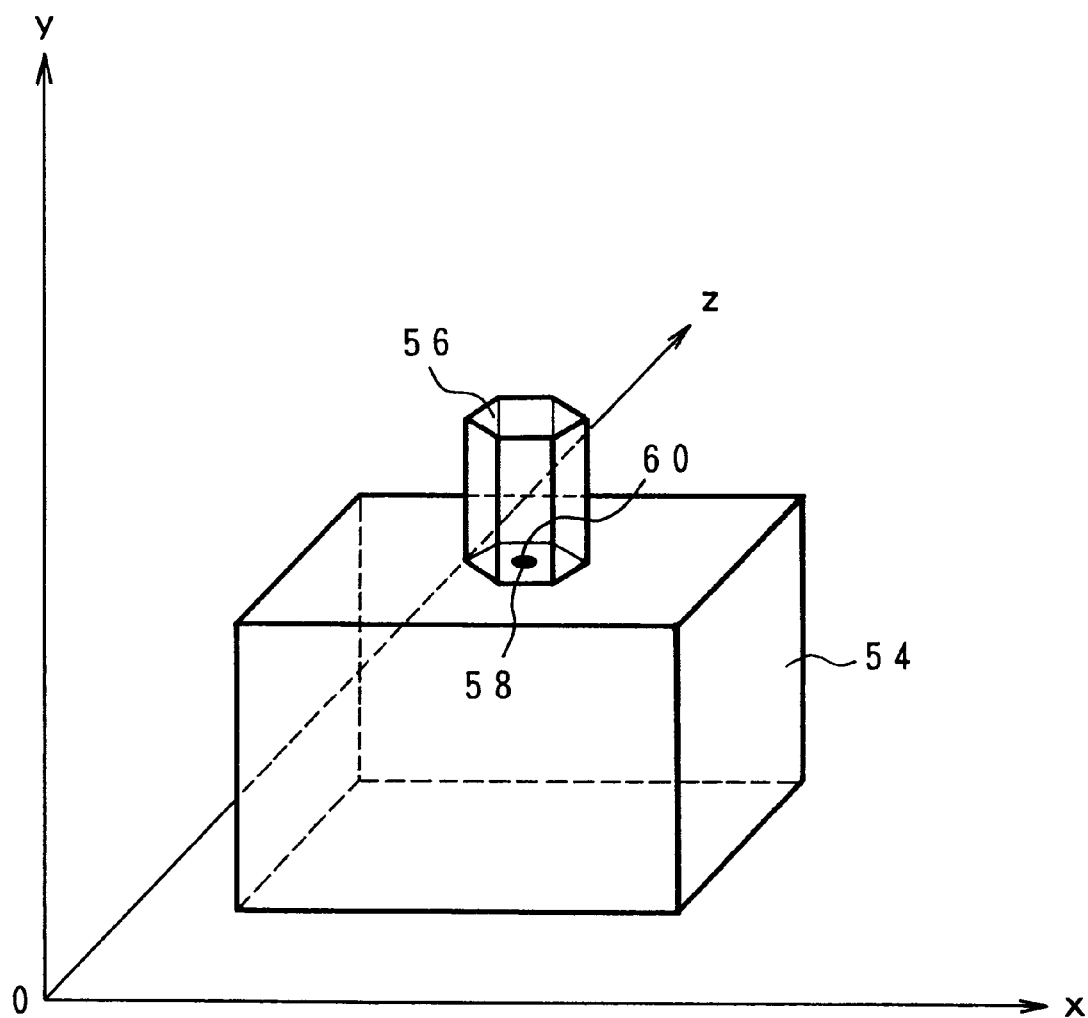
FIG. 13 is an explanatory diagram of the part model which has been assembled on the basis of the junction angle offset information.

FIG. 12 illustrates a further embodiment of the processing for assembling together the part models having one point junction reference data, with a part model 54 on the reference side (fixed side) being arranged in the three-dimensional world coordinate space and having a junction reference point 58 disposed on its top surface. Opposed to this is a part model 56 in the shape of a hexagonal prism which has been disposed and selected as the assembling side, with the part model 56 having a junction reference point 60 at its bottom surface. When assembling processing is executed with such a state of arrangement of the part models 54 and 56 relative to the world coordinate space, the assembling is performed in such a manner that the junction reference point 60 of the part model 56 is aligned with the junction reference point 58 of the part model 54. However, the bottom surface of the part model 56 having the junction reference point 60 thereon is inclined relative to the top surface of the part model 54 having the junction reference point 58, so that it is impossible to specify the inclination through only the alignment of the single junction reference points 58 and 60. Thus, offset information of a junction angle upon the junction onto the junction surface of the opposed part model is imparted to the junction reference data of the part model 56 so that the angle given by the offset information is achieved upon the junction. In cases where the junction angle offset information of the junction reference data of the part model 56 of FIG. 12 includes θ0=0° for instance, rearrangement is effected in such a manner that the offset angle formed between the junction surfaces is θ0=0° with the junction reference point 60 of the part model 56 being aligned with the junction reference point 58 of the part model 54 as shown in FIG. 13, thereby making it possible to assemble the bottom surface of the part model 56 onto the top surface of the part model 54 with the junction reference points 58 and 60 aligned.

FIG. 14 illustrates three-dimensional geometric data of the part model 56 of FIG. 12, in which the junction reference data 36 following the polygon data includes, as shown taken out rightward, junction angle offset information 62 having angle information θ0 in addition to the junction reference coordinate values 44. Such inclusion of the junction angle offset information 62 within the junction reference data 36 allows the part junction angle to be arbitrarily determined upon the execution of assembling processing. On the contrary, in cases where the junction reference data 36 do not include the junction angle offset information 62 unlike FIG. 14, the part models after the alignment of the models at the junction reference points are allowed to have three-dimensional degree of freedom around the aligned junction reference points. That is, depending on the mechanical relationship between the part models to be assembled together, it is possible to arbitrarily set whether the junction is to be made at a predefined junction angle upon the junction or the junction is to have a degree of freedom.

Figure 15:
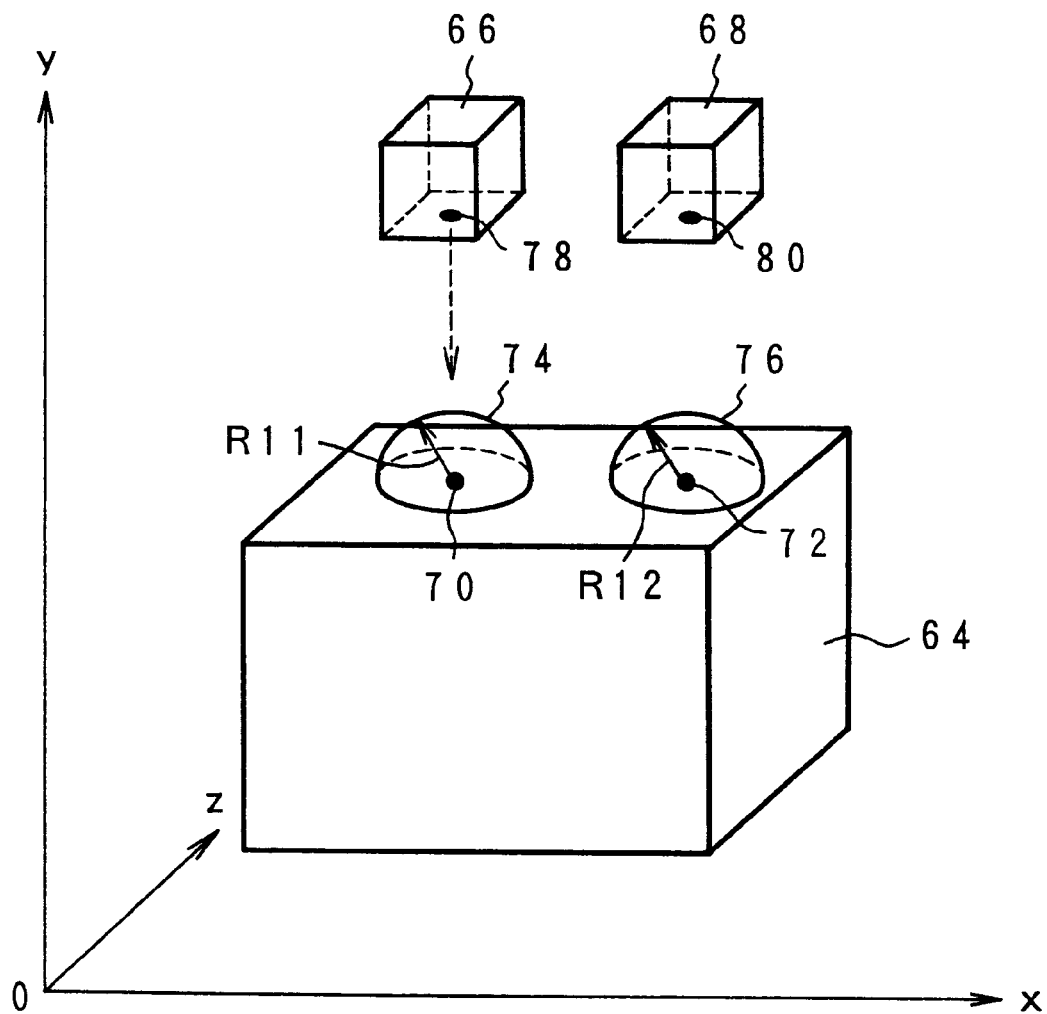
FIG. 15 is an explanatory diagram of a pre-assembling part model having a junction allowable domain for a junction reference point.

FIG. 15 illustrates still another embodiment of the assembling processing in which at least two part models are arranged and assembled in the world coordinate space on the work screen 20 of the assembly processing unit 18 of FIG. 1. In the case of the assembling processing of two part models in the world coordinate space which has previously been described, an assembling command is executed with the two part models being arranged in the world coordinate space, whereby assembling processing is performed for rearranging the part model 46 and the part model 30 in such a manner that their respective junction reference points 48 and 32 are aligned with each other as shown in FIG. 9 for instance. In contrast with this, the embodiment of FIG. 15 allows assembling processing in which assembling part models are moved and assembled to a basic part model fixedly arranged in the world coordinate space.

Figure 16:
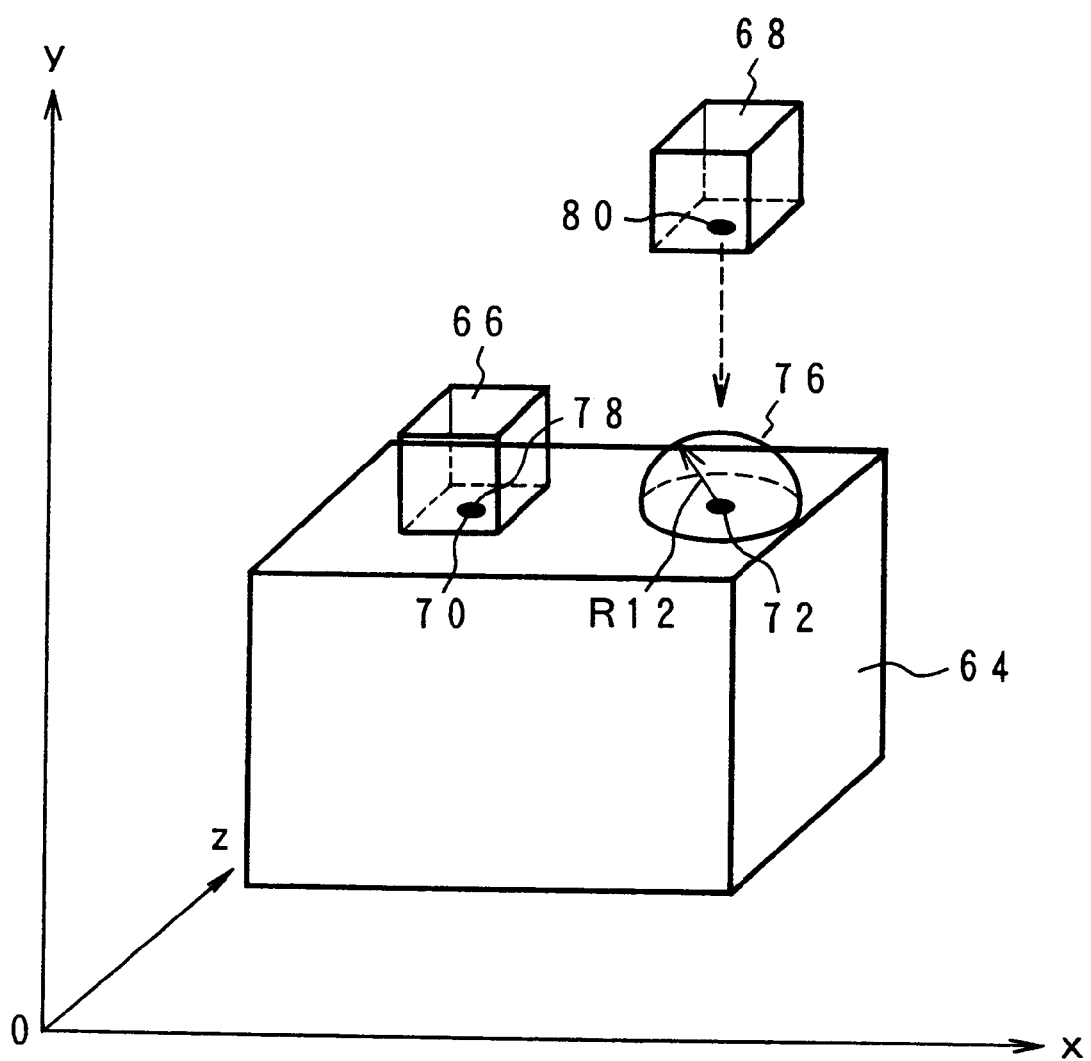
FIG. 16 is an explanatory diagram of the assembling processing of the part model having a junction allowable domain for a junction reference point.

Referring to FIG. 15, a part model 64 on the reference side (fixed side) is disposed in the world coordinate space and has on its top surface two junction reference points 70 and 72, to which two part models 66 and 68 having junction reference points 78 and 80, respectively, are intended to be assembled. The junction reference joints 70 and 72 of the part model 64 which is the assembling object are provided with respective spherical assembling allowable domains 74 and 76 having radii R11 and R12, respectively, around the junction reference points 70 and 72. Once the junction reference points of the other part models are positioned within the assembling allowable domains 74 and 76, there is automatically executed assembling processing for the alignment with the junction reference points 70 and 72. For instance, when the part model 66 approaches the part model 64 as indicated by a dotted line and the junction reference point 78 of the part model 66 enters the spherical assembling allowable domain 74 provided around the junction reference point 70, assembling is performed through the rearrangement of the part model 66 so as to align the junction reference point 78 with the junction reference point 70. That is, as shown in FIG. 16, assembling of the part model 66 is achieved in such a manner that the junction reference point 78 aligns with the junction reference point 70 of the part model 64. In the same manner, when the part model 68 approaches the part model 64 and the junction reference point 80 of the part model 68 enters the assembling allowable domain 76 provided around the junction reference point 72, assembling of the model 68 is effected for aligning with the junction reference point 72. Thus, by providing the junction reference points 70 and 72 of the part model 64 which is the assembling object with the assembling allowable domains 64 and 76 allowing the automatic assembling of the other part models, the assembling operation will be facilitated for assembling a plurality of part models in motion onto the specific part model. That is, when a part model is brought in motion closer to an assembling position of the part model which is the assembling object, the alignment of the associated junction reference points is automatically achieved upon the approach to a certain extent, thereby performing the automatic assembling.

FIG. 17 illustrates three-dimensional geometric data of the part model 64 having the assembling allowable domains shown in FIGS. 15 and 16, the data including in addition to the polygon data 34 junction reference data 36-1 and 36-2 corresponding to the junction reference points 70 and 72, respectively. The junction reference data 36-1 and 36-2 contain, as shown taken out rightward, junction reference point coordinate values 44-1 and 44-2 as well as values R11 and R12 indicative of assembling allowable radii 82-1 and 82-2, respectively, for providing the spherical assembling allowable domains of FIG. 15.

Figure 18:
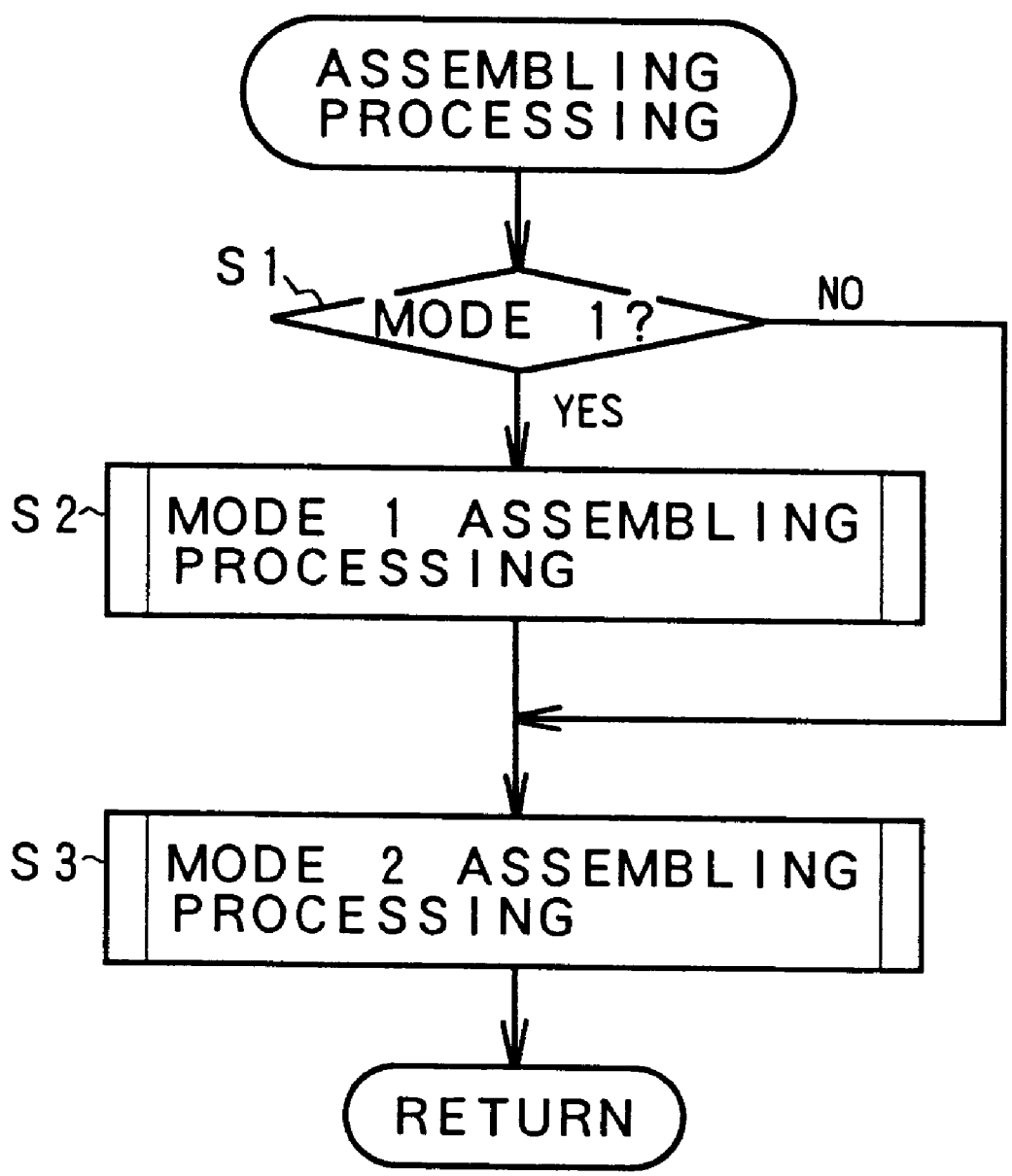
FIG. 18 is a schematic flowchart of the part model assembling processing of FIG. 2.

FIG. 18 is a schematic flowchart of the assembling processing by means of the assembly processing unit 18 of FIG. 1. The assembling processing of the present invention includes mode 1 assembling processing in which the assembling command is executed to align in a jumping manner the junction reference point of the part model on one hand with the junction reference point of the part model on the other, and mode 2 assembling processing in which as shown in FIGS. 15 and 16 the junction reference point of the object is provided with the assembling allowable domain to allow the assembling of the part model to be assembled in motion. Thus, in the assembling processing of FIG. 18, it is judged in step S1 from the command operation on the work screen whether it is mode 1 or not, and if yes, then the procedure goes to step S2 to perform the mode 1 assembling processing. If mode 2, the procedure goes to step S3 to perform the mode 2 assembling processing.

Figure 19:
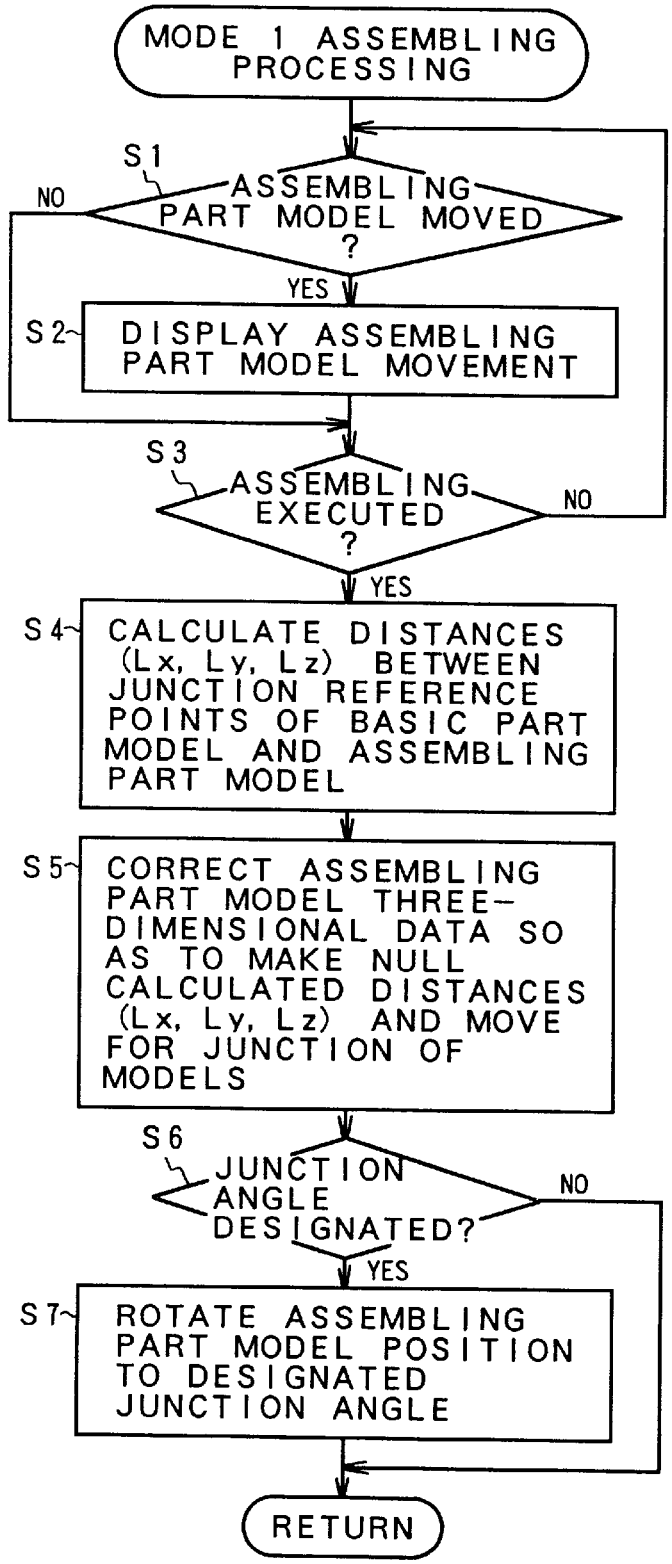
FIG. 19 is a flowchart of the mode 1 assembling processing of FIG. 18.

FIG. 19 illustrates the detail of the mode 1 assembling processing executed in step S2 of FIG. 18. In the mode 1 assembling processing, as shown in FIG. 12 for instance, the two part models 54 and 56 are arranged in the world coordinate space serving as a work screen, and if the part model on one hand moves, then it is judged in step S1 that the part model has moved, and in step S2 the part model movement is displayed. On the contrary, if the mode 1 assembling processing command is executed, then it is judged in step S3 that the assembling has been executed and in step S4 a distance (Lx, Ly, Lz) is calculated between the junction reference point 58 of the basic part model 54 which is the assembling object and the junction reference point 60 of the part model 56 to be assembled. Then, in step S5 three-dimensional geometric data of the part model 56 to be assembled are so modified as to make null the calculated distance (Lx, Ly, Lz), to thereby move and rearrange the two models for junction as shown in FIG. 13. Then, in step S6 a check is made to see if the junction angle is designated, and if there is any designation of the junction angle based on the junction angle offset information 62 as in the three-dimensional geometric data of FIG. 14, the procedure goes to step S7 in which the orientation of the part model 56 assembled at the designated angle is turned to obtain the assembling state of FIG. 13.

Figure 20:
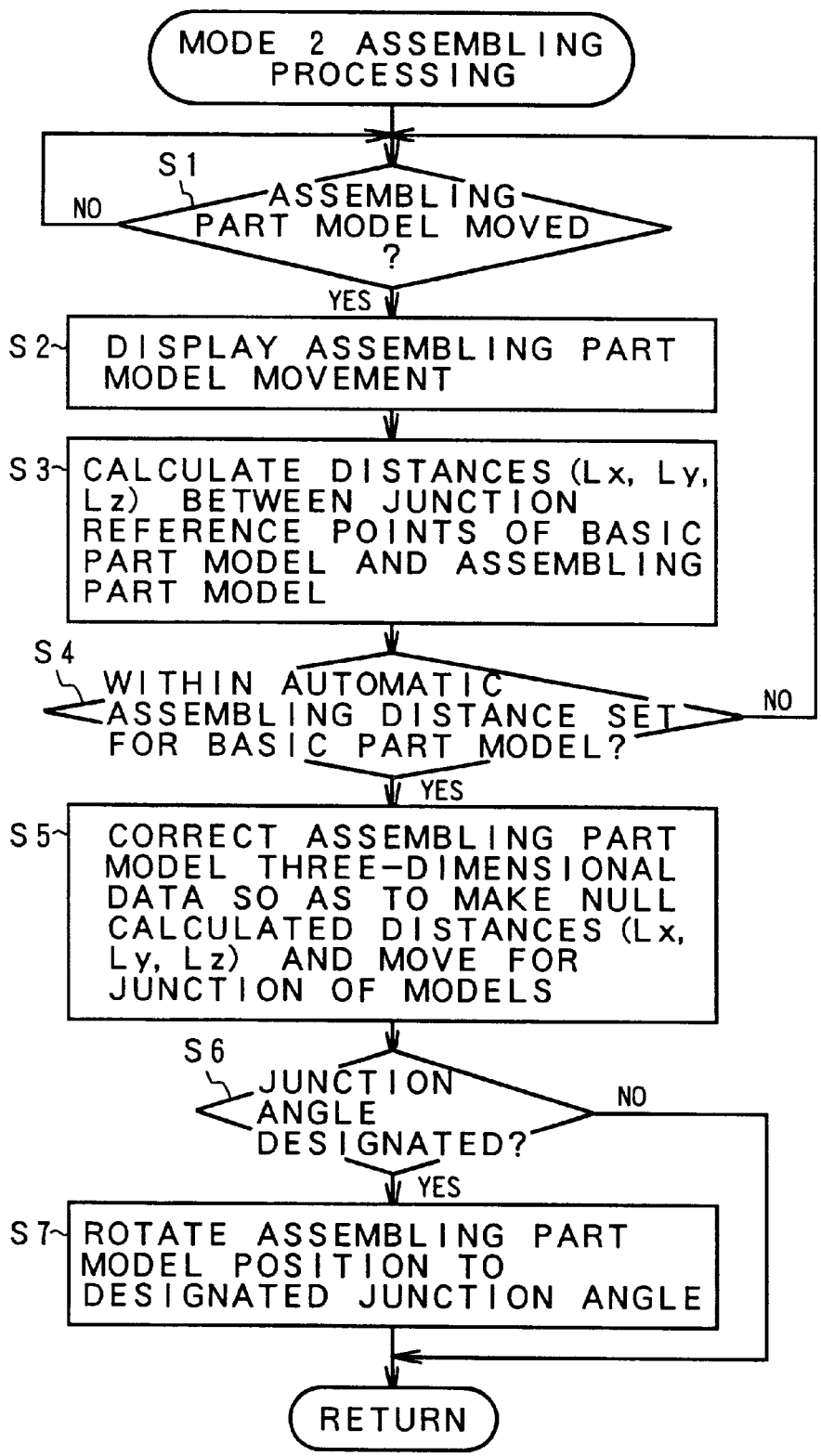
FIG. 20 is a flowchart of the mode 2 assembling processing of FIG. 18.

FIG. 20 illustrates the detail of the mode 2 assembling processing executed in step S3 of FIG. 8. In case of the mode 2 assembling processing, as in FIG. 15 for instance, the movements of the assembling part models are checked in the state where the basic part model 64 which is the assembling object and the part models 66 and 68 to be assembled are arranged in the world coordinate space. If one of the assembling part models has moved, then in step S2 the assembling part model movement is displayed. The movement of the assembling part model leads to step S3 in which there is calculated at every movement position a distance (Lx, Ly, Lz) between the two junction reference points 70 and 72 of the basic part model 64 and the junction reference point 78 of the assembling part model 66 in motion. Then, in step S4 a check is made to see if it lies within the assembling allowable distance R11, R12, in other words, within the assembling allowable domain 74, 76, provided for the automatic assembly around the junction reference points 70 and 72 of the basic part model 64. When in FIG. 15 the part model 66 approaches the part model 64 and the junction reference point 78 comes within the assembling allowable radius R11 of the assembling allowable domain 74 provided around the junction reference point 70, the procedure advances to step S5. In the step S5, coordinate values are modified of the three-dimensional geometric data of the assembling part model 66 so as to make null the distance (Lx, Ly, Lz) calculated at that time, to thereby move the model 66 for the junction with the model 64 in such a manner that as shown in FIG. 16 the junction reference point 78 of the part model 66 is aligned with the junction reference point 70 of the part model 64. In this case also, a check is made in step S6 to see if a junction angle is designated, and if there is any designation of the junction angle, then in step S7 the orientation of the assembling part model 66 is turned to the junction angle designated in step S7.

Plural Points Junction

Figure 21:
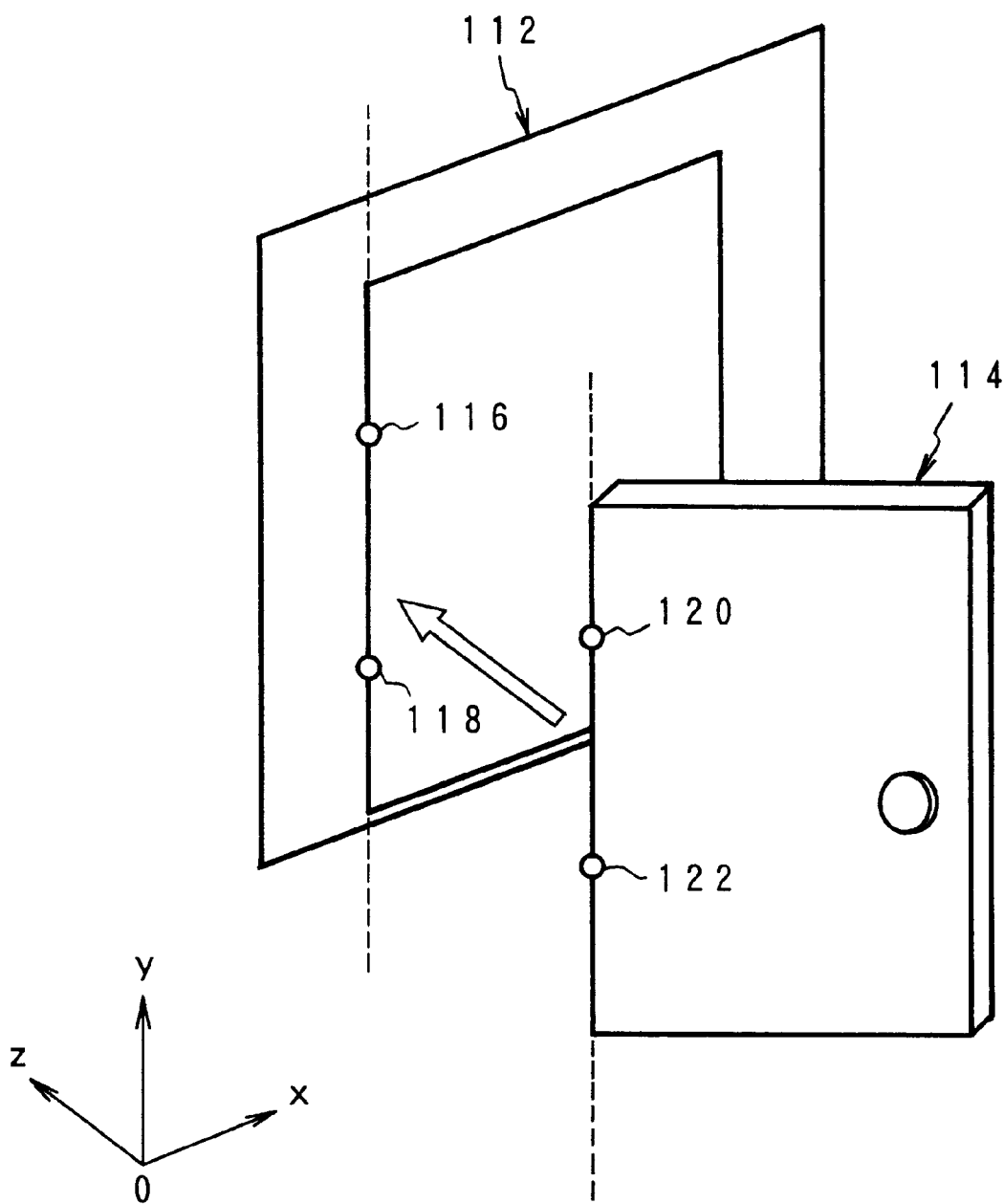
FIG. 21 is an explanatory diagram of a pre-assembling part model having two points junction reference data.
Figure 22:
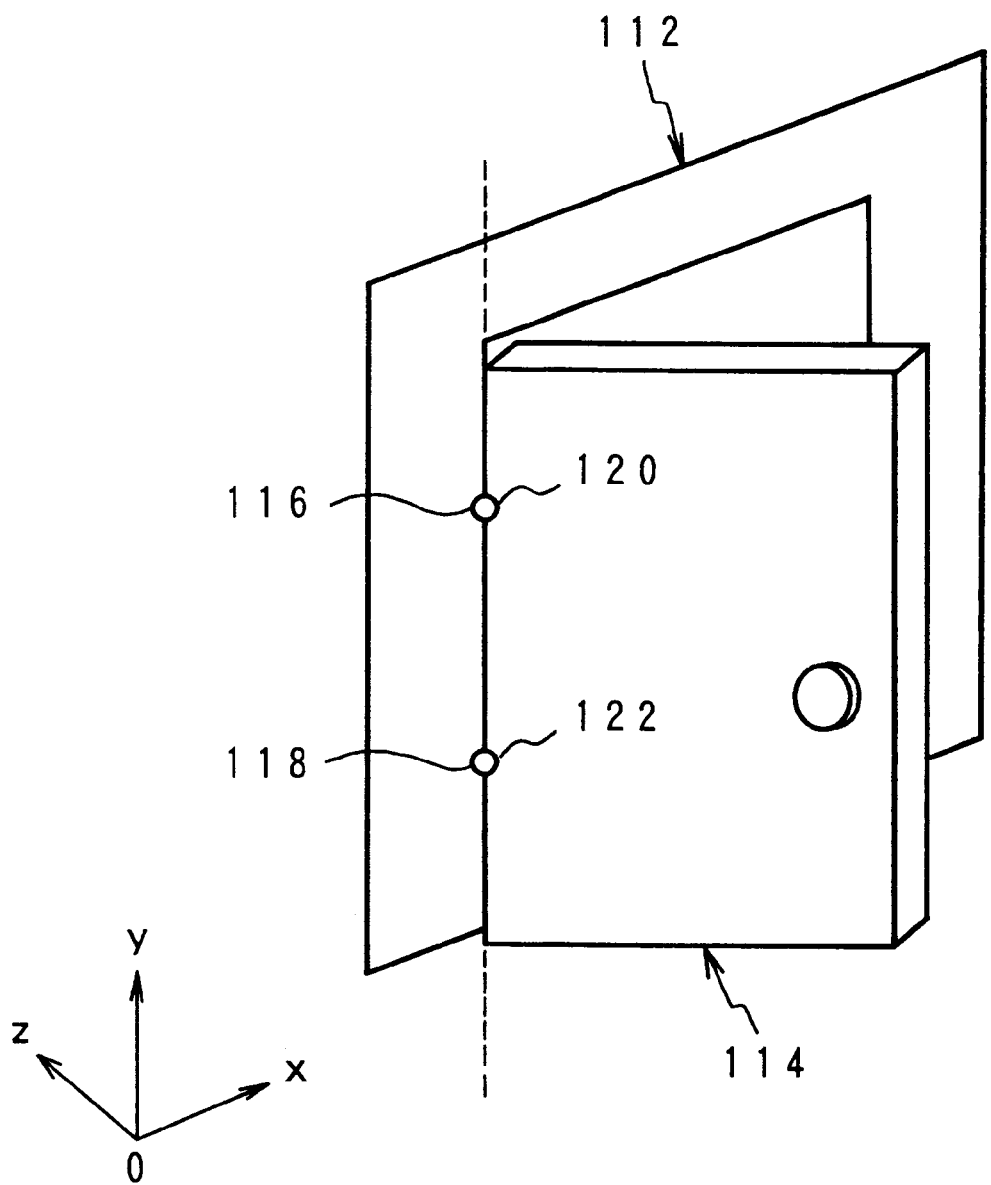
FIG. 22 is an explanatory diagram of assembling processing of the part model having two points junction reference data.

FIG. 21 illustrates assembling processing in cases where a part model is provided with two-points junction reference data. In the world coordinate space there are arranged for instance a part model 112 of a door frame and a part model 114 of a door. A hinge unit of the door frame part model 112 is provided with two junction reference points 116 and 118, and correspondingly two junction reference points 120 and 122 are assigned to the door part model 114. The execution of the assembling processing of such part models 112 and 114 would result in a rearrangement in which as shown in FIG. 22 the junction reference points 116 and 120 are aligned with each other while simultaneously the junction reference point 122 is aligned with the junction reference point 118.

Figure 23:
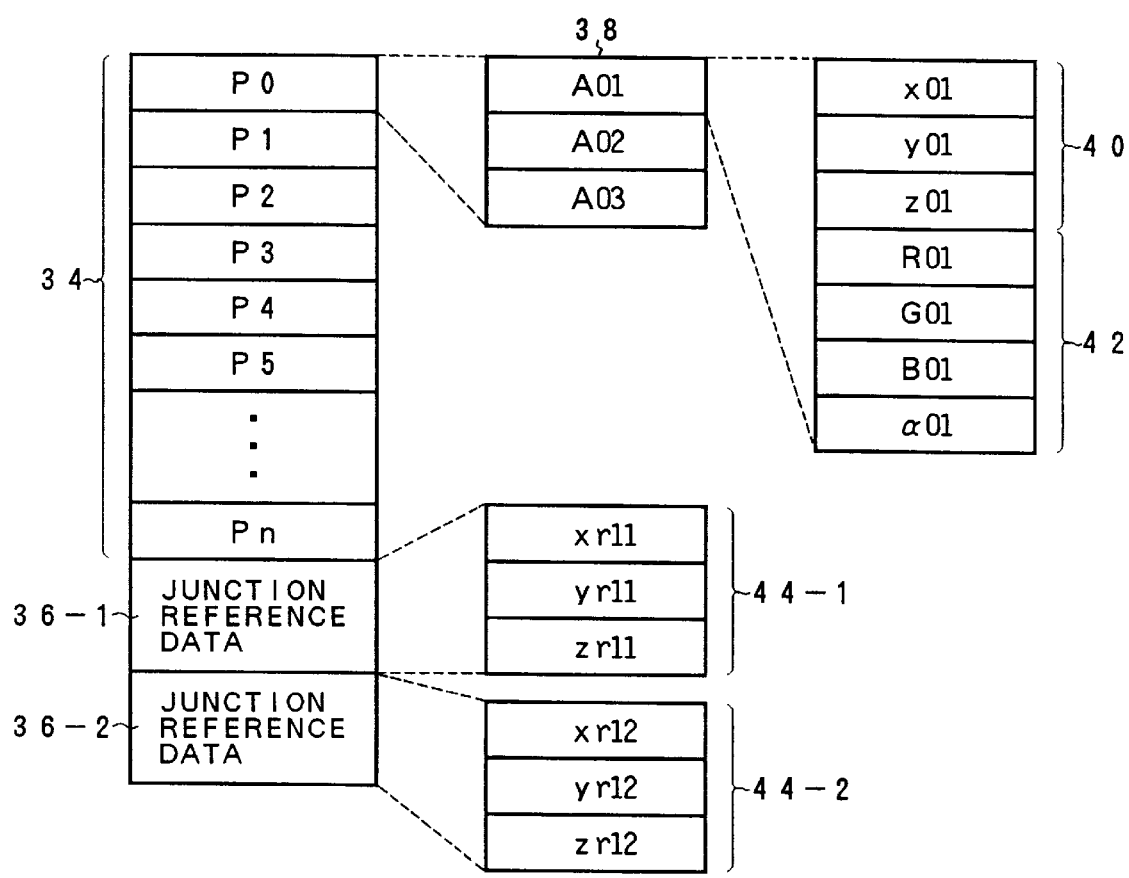
FIG. 23 is an explanatory diagram of a data structure of the part model having two points junction reference data.

FIG. 23 illustrates geometric data of the part model having two junction reference points of FIG. 21, the data including, posterior to the polygon data 34, junction reference data 36-1 and 36-2 which correspond to the two junction reference points and contain, as shown taken out rightward, junction reference coordinate values 44-1 and 44-2, respectively.

Figure 24:
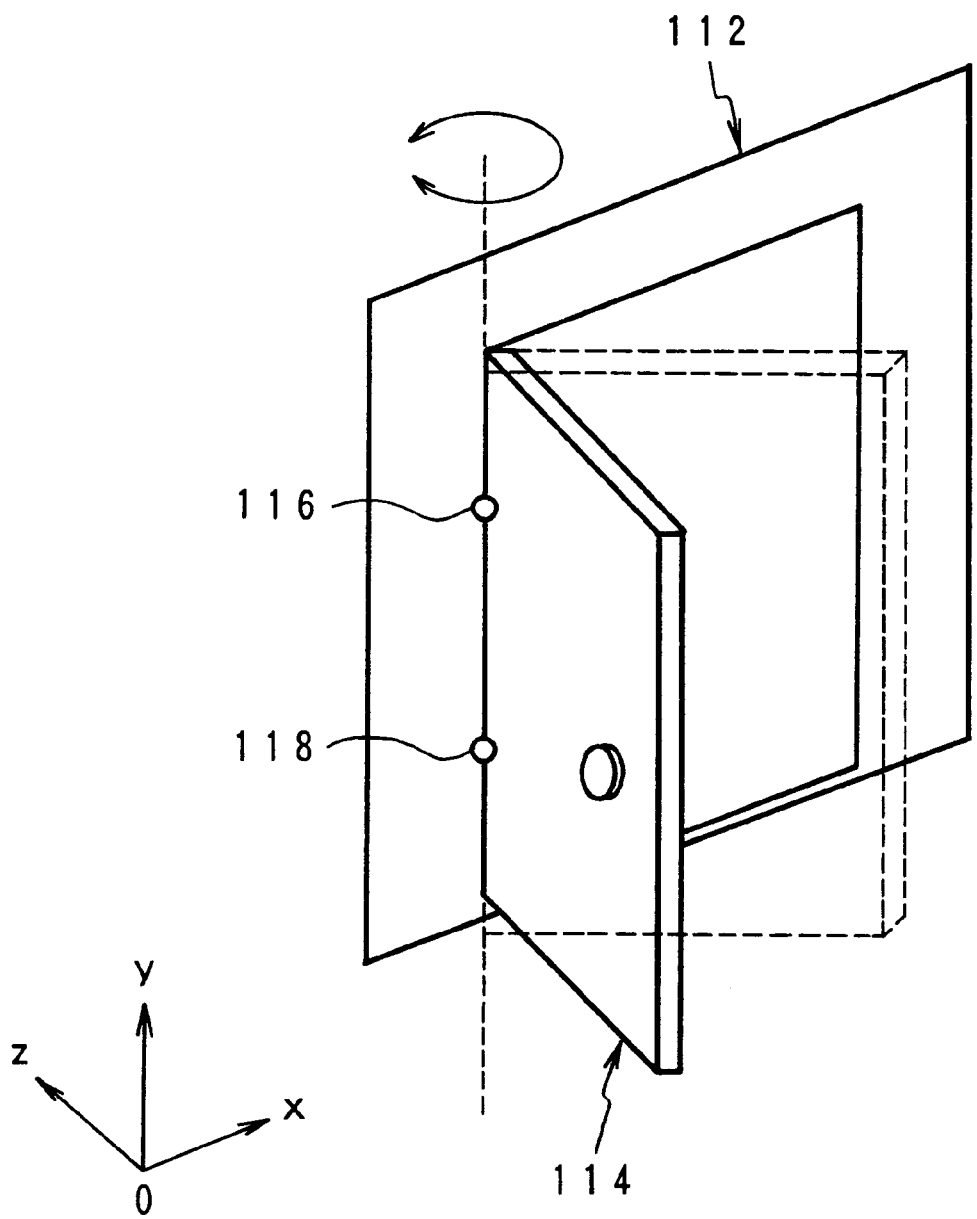
FIG. 24 is an explanatory diagram of the degree of freedom between assembling part models having two points junction reference data.

FIG. 24 illustrates an assembly model appearing after attaching the door part model 114 to the door frame part model 112 at the two junction reference points. By virtue of the junction based on the two points consisting of the junction reference points 116 and 118, there will not be restricted any rotation around an axis which is a line joining the two points 116 and 118. This will enable a door hinge or the like to be represented, achieving such display processing as to allow the door part model 114 to turn for opening or closing around the axis which is the line joining the two junction reference points 116 and 118.

FIG. 25 illustrates a case where a part model has junction reference data of three points. In the part coordinate space of FIG. 25 there is arranged a part model 124 in the shape of a rectangular parallelepiped for instance, with one surface thereof being provided with three junction reference points 126, 128 and 130.

Figure 26:
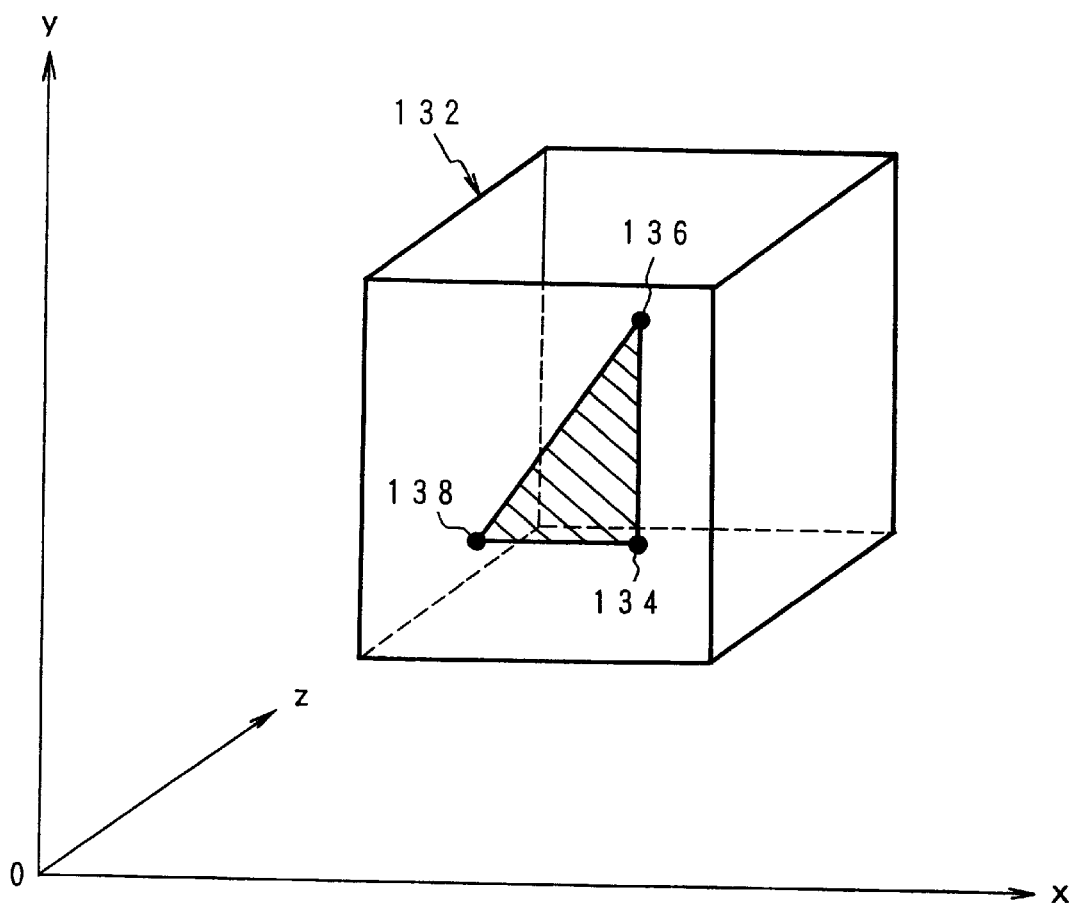
FIG. 26 is an explanatory diagram of another part model having three points junction reference data.

FIG. 26 illustrates another part model 132 to be assembled to the part model 124 of FIG. 25, with its assembling unit being provided with three junction reference points 134, 136 and 138. In this case, triangles formed by the three junction reference points 126, 128 and 130 of FIG. 25 and the junction reference points 134, 136 and 138 of FIG. 26 are right triangles for instance.

Figure 27:
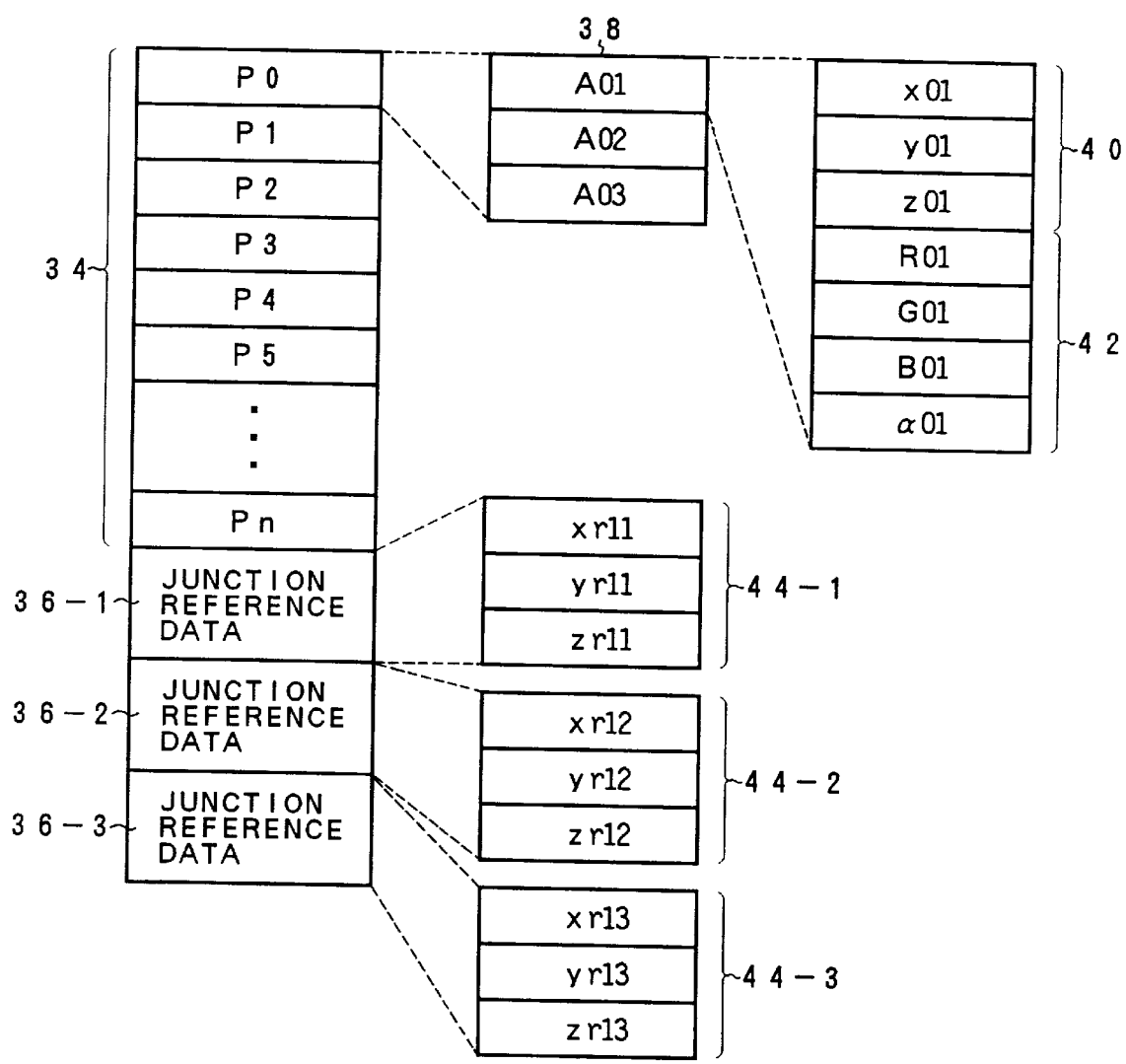
FIG. 27 is an explanatory diagram of a data structure of the part model having three points junction reference data.

FIG. 27 illustrates three-dimensional geometric data of a part model having three-points junction reference data of FIG. 25 or FIG. 26. The three-dimensional geometric data include, in addition to the polygon data 34, junction reference data 36-1, 36-2 and 36-3 corresponding to three junction reference points and containing junction reference point coordinate values 44-1, 44-2 and 44-3, respectively.

Figure 28:
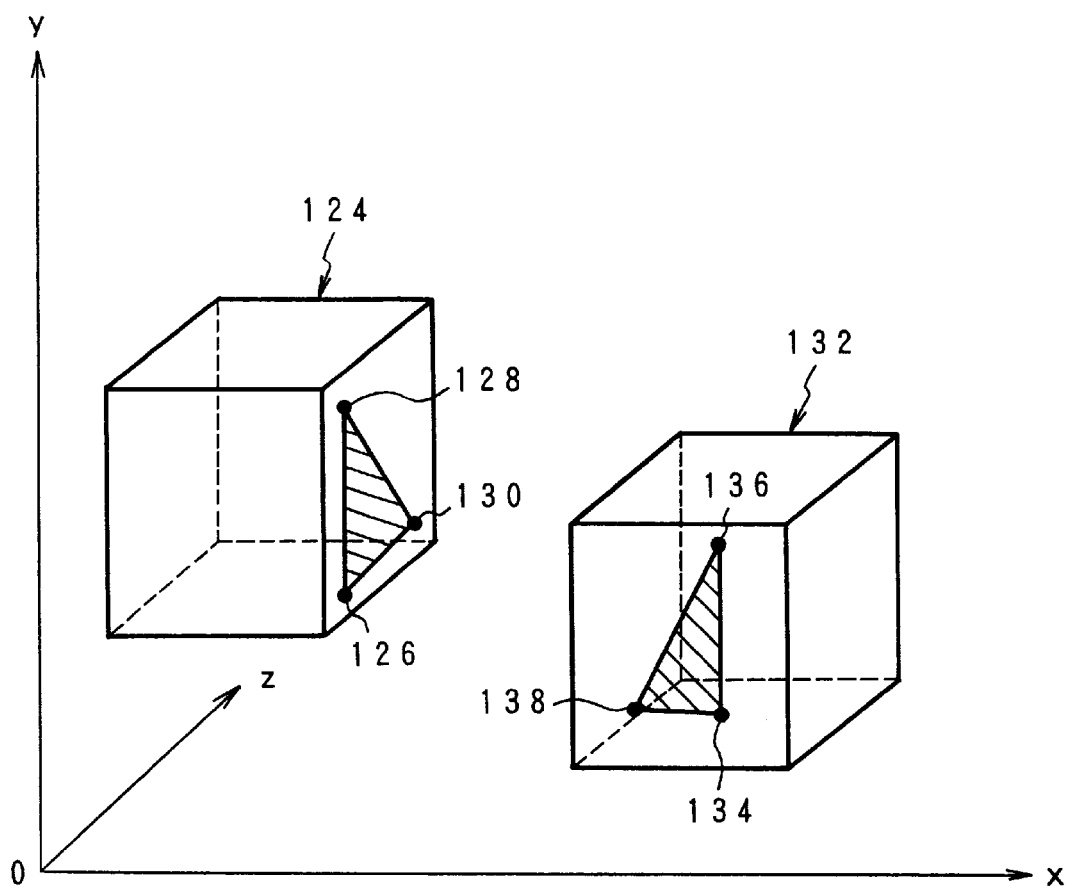
FIG. 28 is an explanatory diagram of a pre-assembling part model having three points junction reference data.

FIG. 28 illustrates a state in which the part model 124 of FIG. 25 and the part model 132 of FIG. 26 are arranged for assembling in the world coordinate space. The execution of assembling processing in this state will result in a rearrangement through the movement of the part model 132 in such a manner that the junction reference points 134, 136 and 138 are aligned with the junction reference points 126, 128 and 130, respectively, thus achieving the results of junction as shown in FIG. 29. Providing that in this case the shape of a triangle joining the three junction reference points is other than a regular triangle and an isosceles triangle, the manner of aligning the three junction reference points is limited to only one way, so that it is possible to realize the alignment ensuring accurate locations and orientations of the two part models.

A further embodiment will now be described in which junction reference data of a part model are provided with ID information to effect the automatic assembly. FIG. 30 illustrates a group of unit part models 16 stored in the part storage unit 14 of FIG. 1, with the group 16 including part models 140, 142, 144, 146, 148 and 150 having different three-dimensional geometries. These part models 140 to 150 are provided with respective inherent ID information consisting for instance of numerical values ID=1, 2, 3, 4, 5, 6, etc., or of code information.

FIG. 31 illustrates a management table 152 defining the automatic assembly of the part model having the inherent ID information of FIG. 30. The management table 152 defines in advance the part models subjected to assembling operation for instance.

FIG. 32 illustrates three-dimensional geometric data of the part models shown in FIG. 30, the data including in addition to the polygon data 34 the junction reference data 36 which contain, as shown taken out rightward, junction reference point coordinate values 44 as well as ID information 154.

Figure 33:
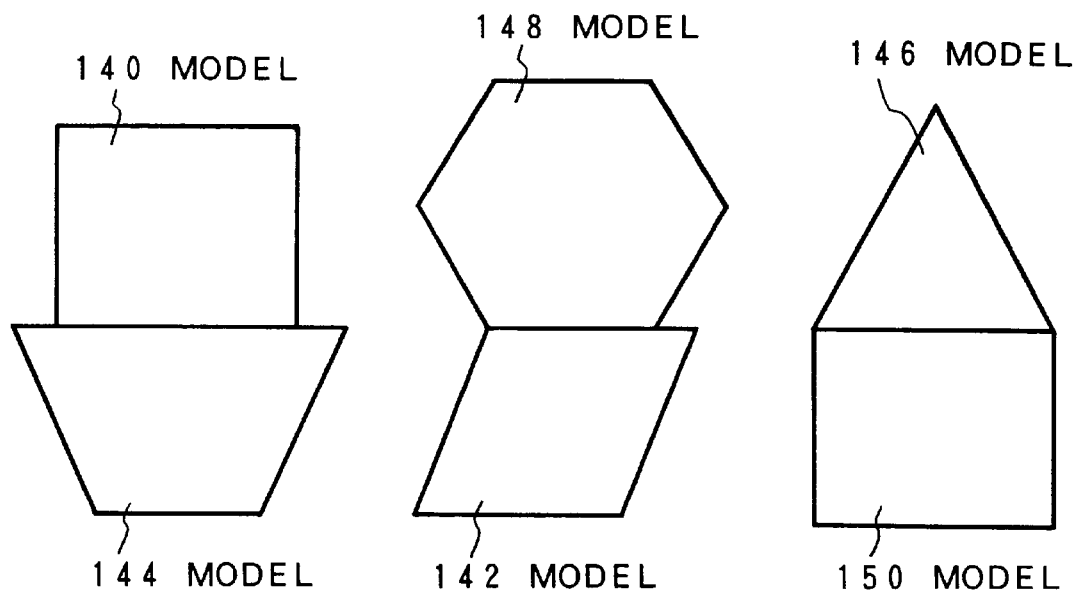
FIG. 33 is an explanatory diagram in which the part model of FIG. 30 has been automatically assembled on the basis of the management table of FIG. 31.

FIG. 33 illustrates the result of automatic assembling effected in conformity with the management table 152 of FIG. 31. When ID1=ID3 is designated, the part model 140 and the part model 144 are assembled together, with their respective junction reference points coincident with one another. The designation of ID2=ID5 results in the assembling of the part model 148 and the part model 142 with their respective junction reference points coincident with one another. Furthermore, the designation of ID4=ID6 results in the assembling of the part model 146 and the part model 150 with their respective junction reference points coincident with one another.

Figure 34:
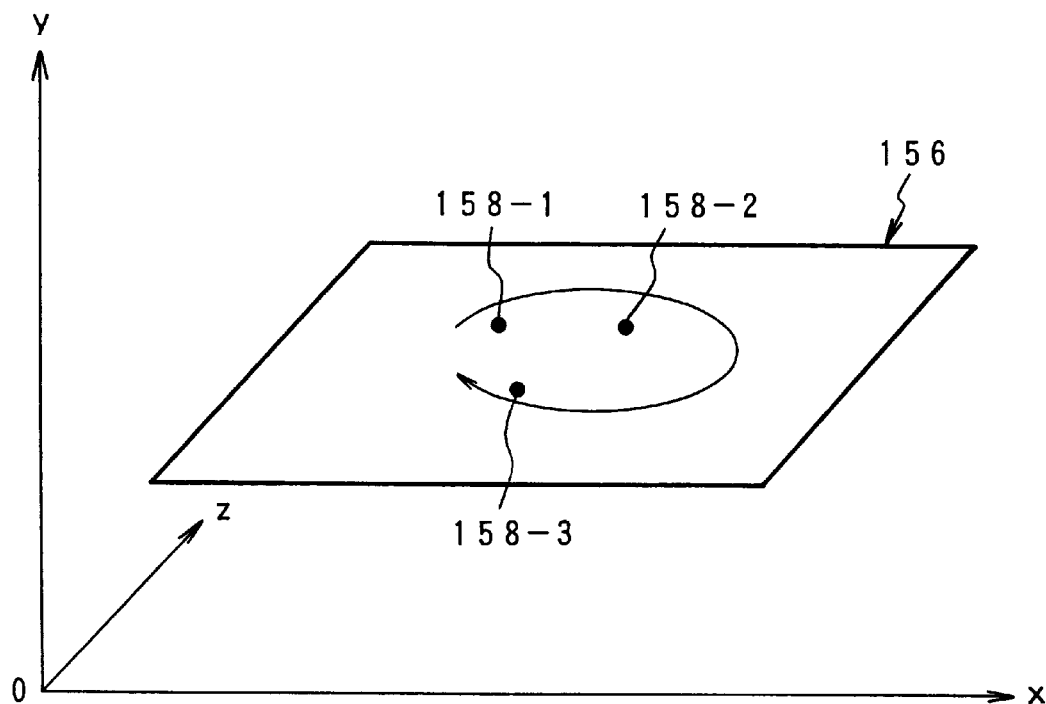
FIG. 34 is an explanatory diagram of a part model having three points junction reference data which contain information on the order in the rotational direction.

FIG. 34 illustrates a still further embodiment in which a part model has three or more junction reference data and in which three or more junction reference points are provided with information indicative of clockwise or counterclockwise orders. In FIG. 34, a thin plate part model 156 having substantially no thickness is created in the part coordinate space and carries thereon three junction reference points 158-1, 158-2 and 158-3.

Figure 35:
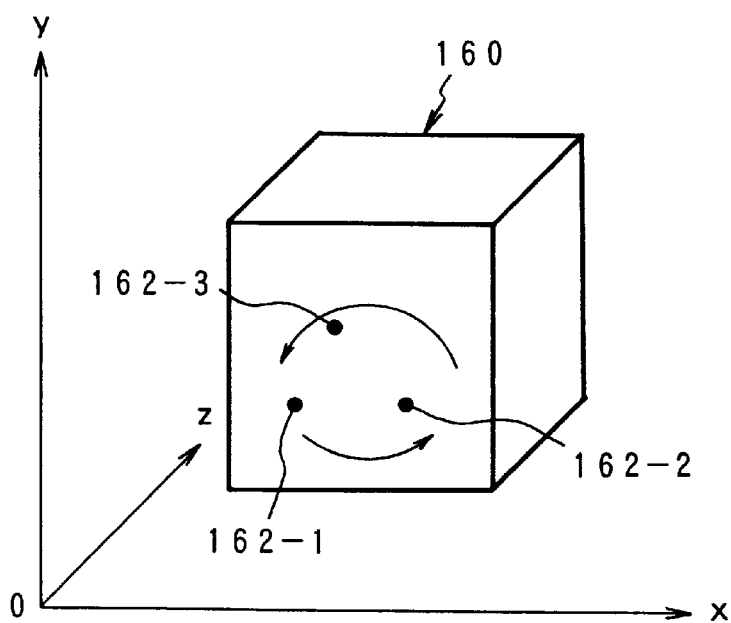
FIG. 35 is an explanatory diagram of another part model having three points junction reference data which contain information on the order in the rotational direction.

FIG. 35 illustrates another part model 160 to be assembled to the part model 156 of FIG. 34, the model 160 being also provided in the part coordinate space and carrying on its junction plane three junction reference points 162-1, 162-2 and 162-3.

Figure 36:
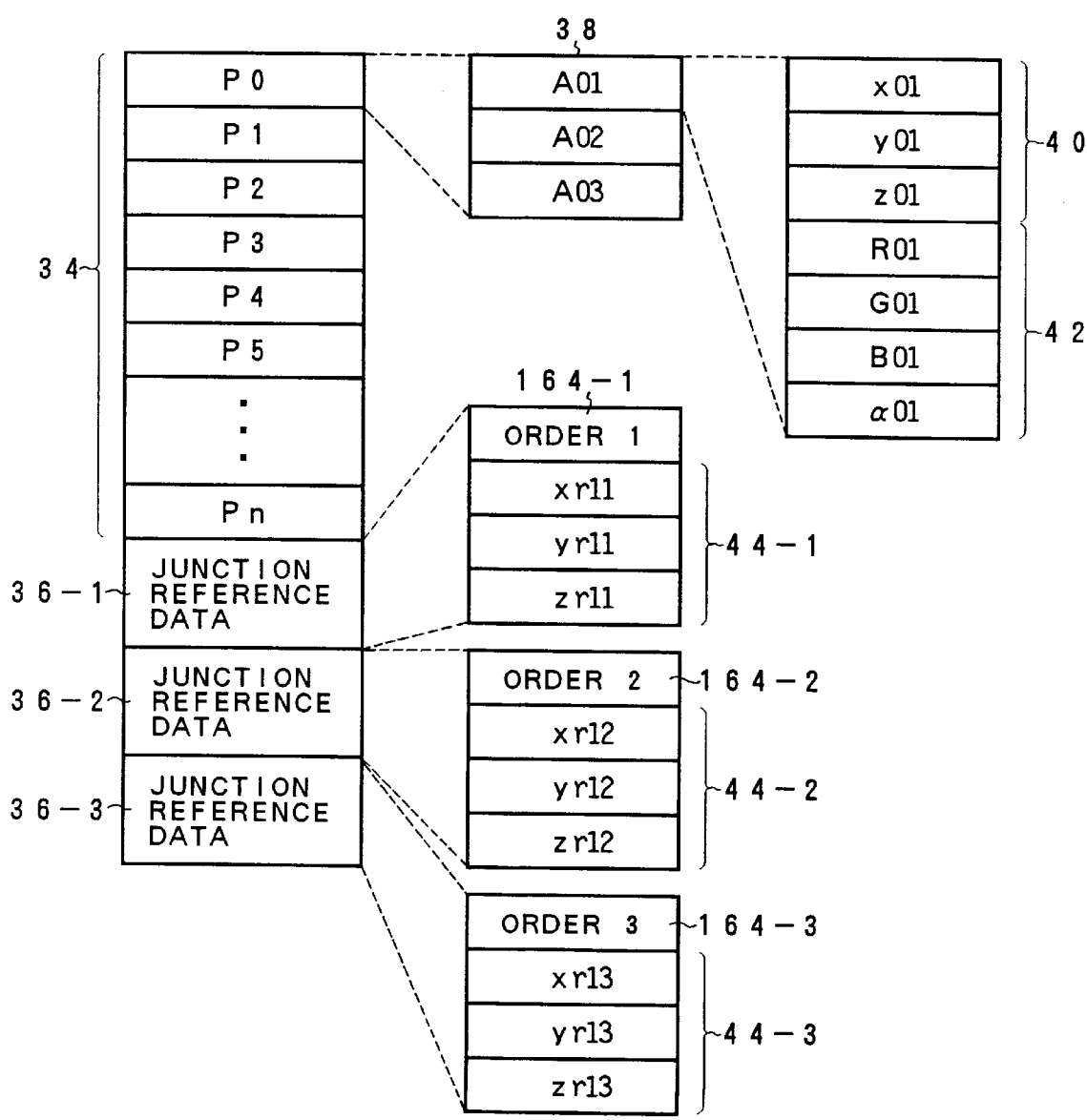
FIG. 36 is an explanatory diagram of a data structure of the part model having three points junction reference data which contain information on the order in the rotational direction.

FIG. 36 illustrates three-dimensional geometric data for use in the part models 156 and 160 of FIGS. 34 and 35, respectively, the data including posterior to the polygon data 34 junction reference data 36-1, 36-2 and 36-3 corresponding to the three junction reference points. As shown taken out rightward, the junction reference data 36-1 to 36-3 contain, in addition to junction reference point coordinate values 44-1, 44-2 and 44-3, respectively, order information 164-1, 164-2 and 164-3 indicating the order of the respective junction reference points. Due to such order information within the junction reference data, the part model 156 of FIG. 34 has for instance the three junction reference points 158-1 to 158-3 arranged clockwise (right-handed) in plan view. The part model 160 of FIG. 35 has the three junction reference points 162-1 to 162-3 arranged counterclockwise (left-handed) when viewed from the front. In the case of assembling together the part models each having three or more junction reference points with order information through the alignments of the three or more junction reference points, the assembling is effected in such a manner as to allow the rotational directions of the three or more junction reference points which are determined by the order information to coincide with each other.

Figure 37:
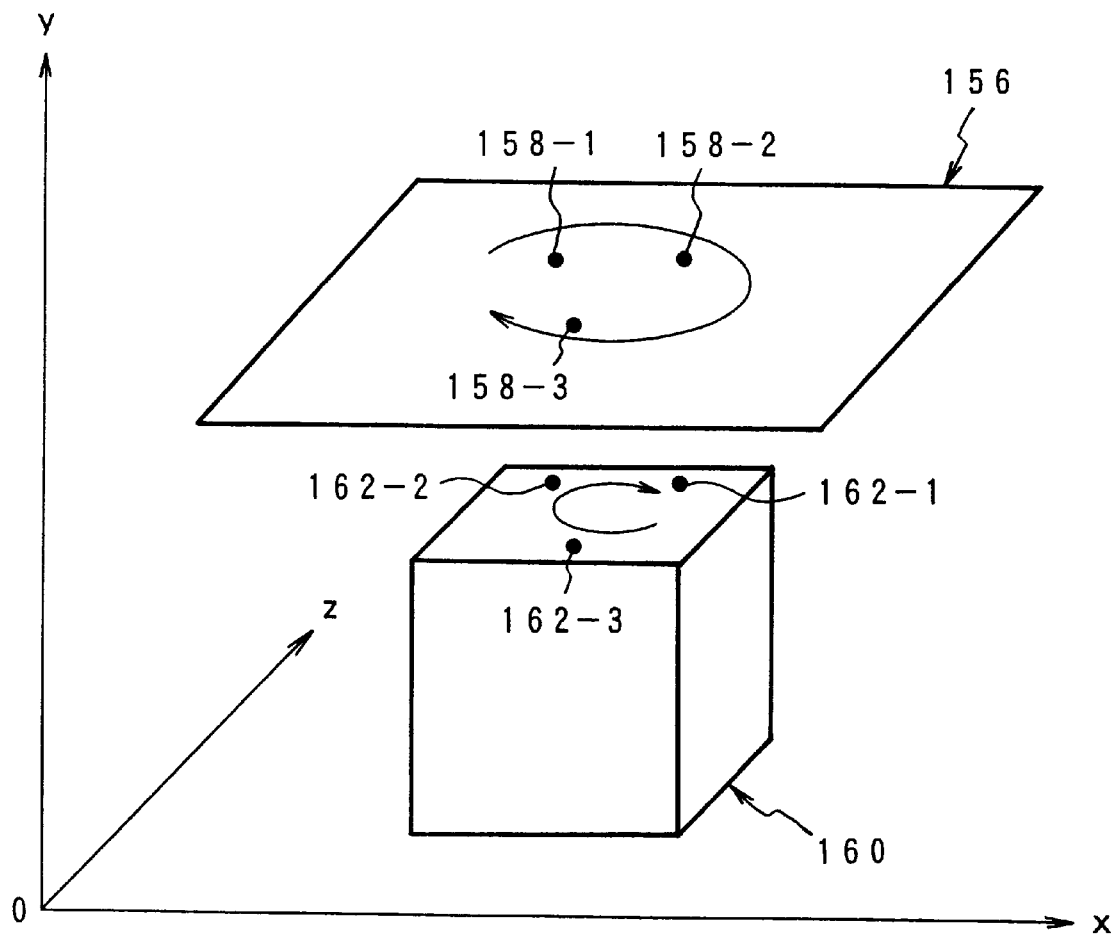
FIG. 37 is an explanatory diagram of a pre-assembling part model having junction reference data which contain information on the order in the rotational direction.
Figure 39:
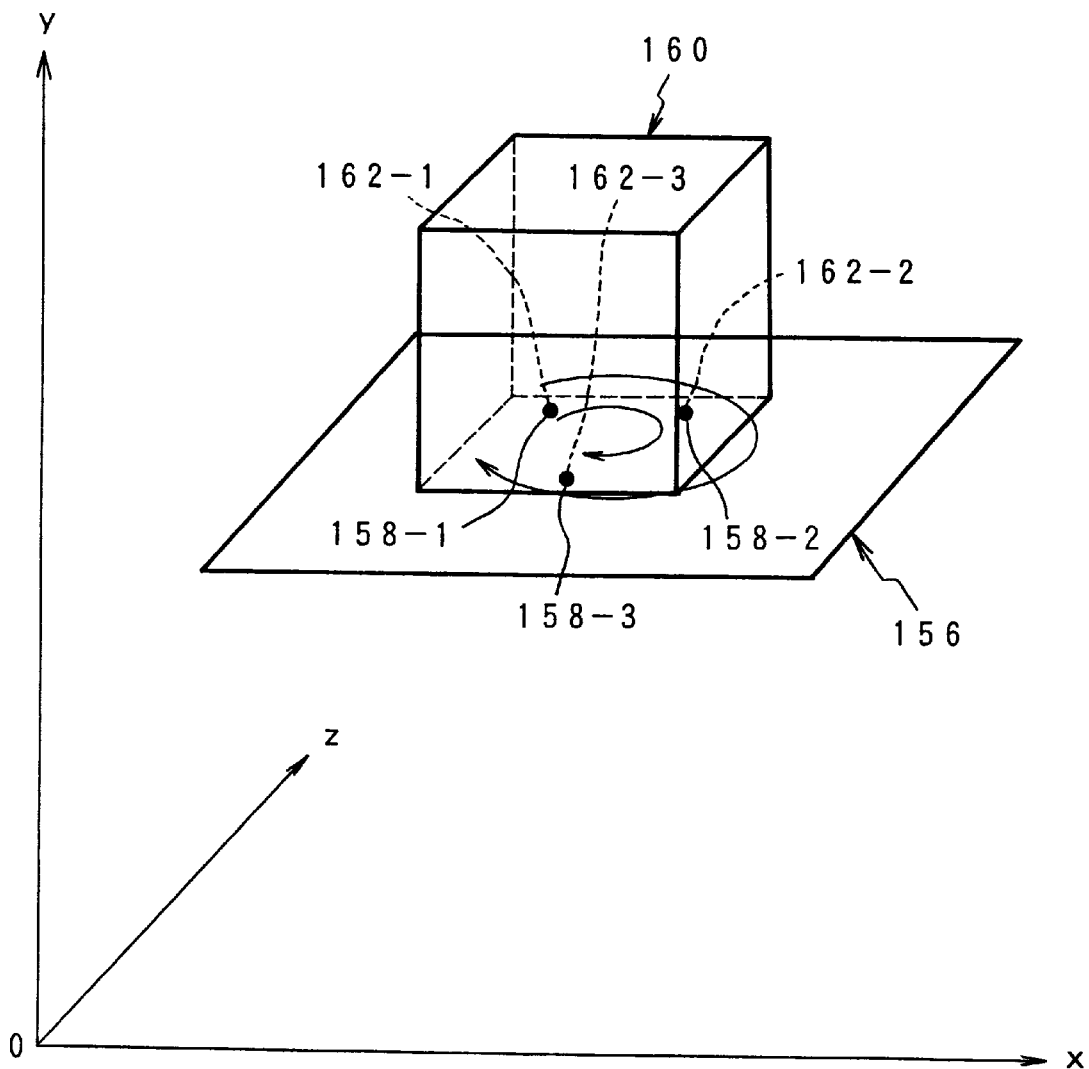
FIG. 39 is an explanatory diagram of correct assembling processing of the part models in conformity with the rotational direction order information of the junction reference data.

FIG. 37 illustrates a case where the part models 156 and 160 of FIGS. 34 and 35, respectively, are arranged in the world coordinate space and assembled together therein with the order information neglected. In this case, the part model 156 has the right-handed order information of the three junction reference points 158-1 to 158-3, whereas when the part model 160 is disposed thereunder the three junction reference points 162-1 to 162-3 have opposite left-handed order information. However, since the order information is neglected upon the assembling of the part models 156 and 160, the part model 160 may be assembled to the underside of the part model 156 as shown in FIG. 38. This state of assembling is wrong when judged from the order information determining the proper rotational direction of the three junction reference points. On the contrary, FIG. 39 illustrates a state in which the assembling has been performed in conformity with the order information determining the rotational direction of the three junction reference points. The three junction reference points 158-1 to 158-3 of the part model 156 of FIG. 39 has right-handed order information. In order to assemble the part model 160 so as to conform to this right-handed rotation, the surface carrying the three junction reference points 162-1 to 162-3 must face downward for assembling. To this end, order information is imparted to the three or more junction reference points to determine the rotational direction and the assembling is performed in such a manner as to allow the rotational directions of the parts to coincide with each other, whereby the designation of the assembling relationship is realized upon the assembling of the other part model to the specific surface of the part model such as a thin plate for instance.

Figure 40:
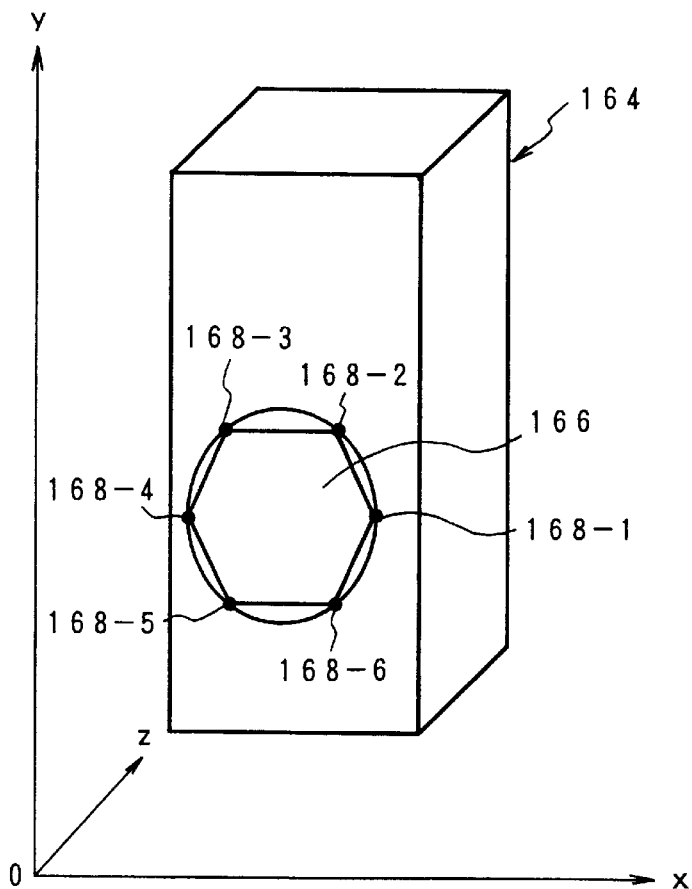
FIG. 40 is an explanatory diagram of a part model having regular polygonal junction reference data.

FIG. 40 illustrates a still further embodiment in which a part model is provided with regular polygonal junction reference data. The part model 164 has for instance a regular hexagonal junction reference surface 166 as the regular polygonal junction reference surface. The regular hexagonal junction reference surface 166 can be defined by three-dimensional coordinate values of six apexes 168-1 to 168-6.

Figure 41:
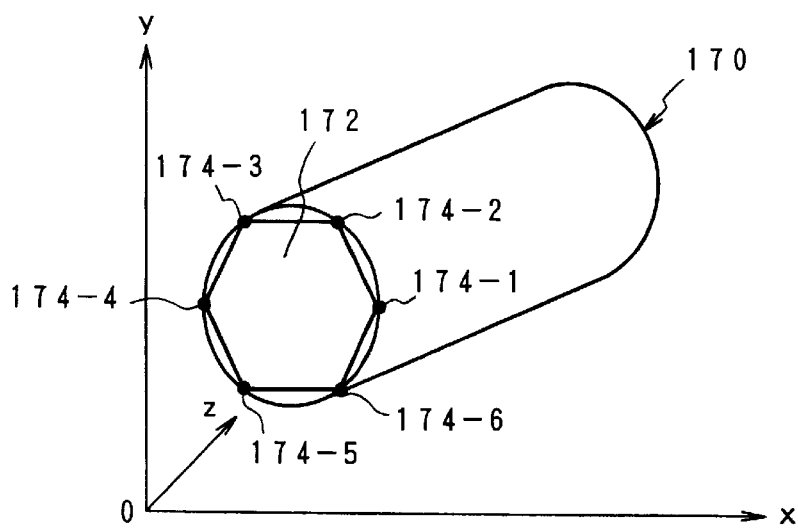
FIG. 41 is an explanatory diagram of another part model having regular polygonal junction reference data.

FIG. 41 illustrates another part model 170 to be assembled to the part model 164 of FIG. 40, the model 170 being in the shape of a cylinder constituting a rotary shaft for instance. The part model 170 has an end surface provided with a regular polygonal junction reference surface 172 corresponding to the regular polygonal junction reference surface 166 of the part model 164 of FIG. 40. The regular polygonal junction reference surface 172 can also be defined by three-dimensional coordinate values of six apexes 174-1 to 174-6.

FIG. 42 illustrates three-dimensional geometric data representative of the part models shown in FIGS. 40 and 41, with the data including posterior to the polygon data 34 regular polygonal junction reference data 176 which contain as shown taken out rightward six apex coordinate values 178-1 to 178-6 in this embodiment.

FIG. 43 illustrates a state in which the part model 164 of FIG. 40 and the part model 170 of FIG. 41 are arranged in the world coordinate space and are assembled together through the alignment of the respective regular hexagonal junction reference surfaces 166 and 172. In the case of such assembling of the part model 164 and the part model 170 through the alignment of the regular hexagonal junction reference surfaces 166 and 172, the respective six apexes are aligned with each other so that the rotational position of the part model 164 relative to the part model 170 for instance could be switched at intervals of 60 degrees which are angles formed between lines joining the center of the regular hexagon and the respective apexes.

Although in FIGS. 40 and 41 the regular polygonal junction reference surface data are in the form of the hexagonal junction reference surface data by way of example, they could be data of any appropriate regular polygons including a regular triangle, regular quadrangle, regular pentagon, regular septangle and regular octagon.

FIG. 44 illustrates a yet further embodiment in which part models are provided with junction reference surface data for the assembling of the part models. In FIG. 44, a part model 180 in the part coordinate space is provided with junction reference data representative of a junction reference surface 182 and consisting of hatched surface or polygonal surface information. The junction reference data designating the junction reference surface 182 need not be separately prepared since the three-dimensional geometric data of the part model 180 in the shape of a cube includes data of eight apexes 184-1 to 184-8 and hence four apexes 184-2, 184-4, 18406 and 184-8 among them can be utilized as the apex coordinate values by defining the polygonal surface information of the junction reference surface 182 as the junction reference data.

FIG. 45 illustrates another part model 186 to be assembled to the part model 180 of FIG. 44, the model 186 being also in the shape of a cube having eight apexes 190-1 to 190-8. The part model 186 employs as the junction reference surface a hatched surface 188 having apexes 180-1, 190-3, 190-5 and 190-7.

Figure 46:
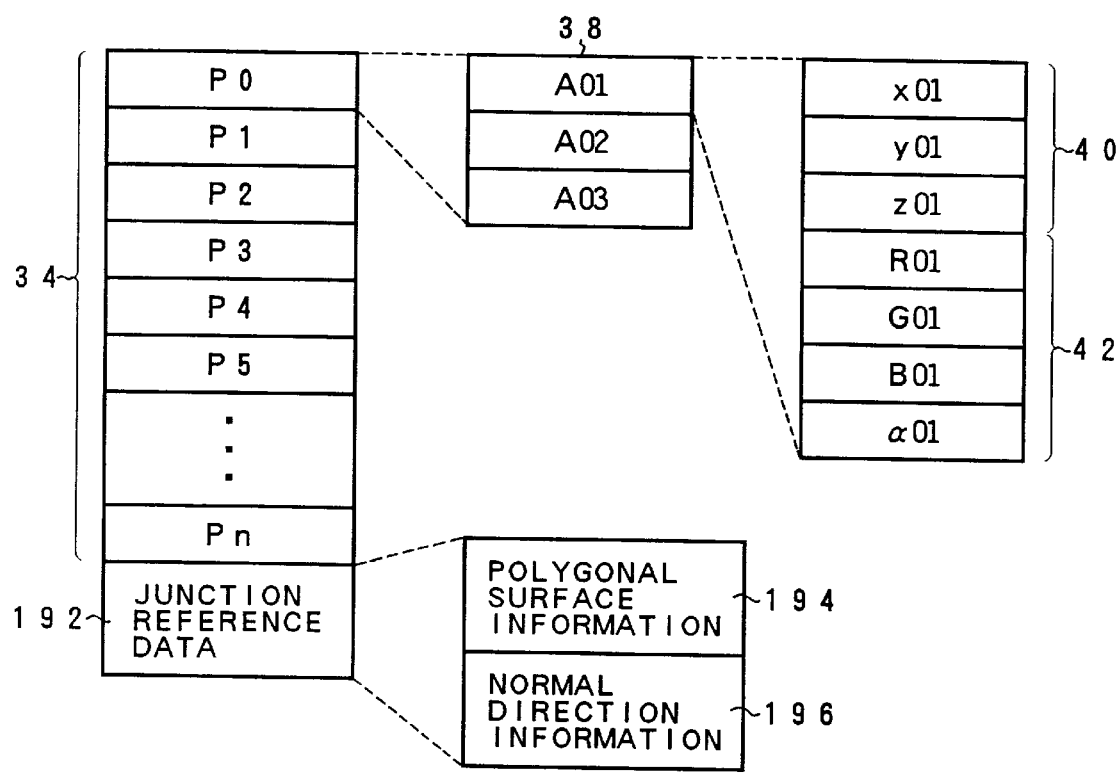
FIG. 46 is an explanatory diagram of a data structure of the part model having polygonal surface information as the junction reference data.

FIG. 46 illustrates three-dimensional geometric data of the part models having as the junction reference surface data the junction reference surfaces shown in FIGS. 44 and 45. The three-dimensional geometric data includes posterior to the polygon data 34 junction reference data 192 defining the junction reference surfaces of the part models, which data 192 contain, as shown taken out rightward, polygonal surface information 194 on the surfaces 182 and 188 in the case of the part models 180 and 186 of FIGS. 44 and 45 for instance. The junction reference data 192 further contain normal direction information 196. The normal vector direction information 196 defines whether the direction of junction of the junction surface of the other part model to the junction reference surface 182 of the part model 180 of FIG. 44 for instance is from the outside or from the inside. The setting of the normal vector direction information 196 will allow the designation of whether the other part model is to be assembled to the outside of the part model 180 or it is to be assembled to the inside of the part model 180.

Figure 48:
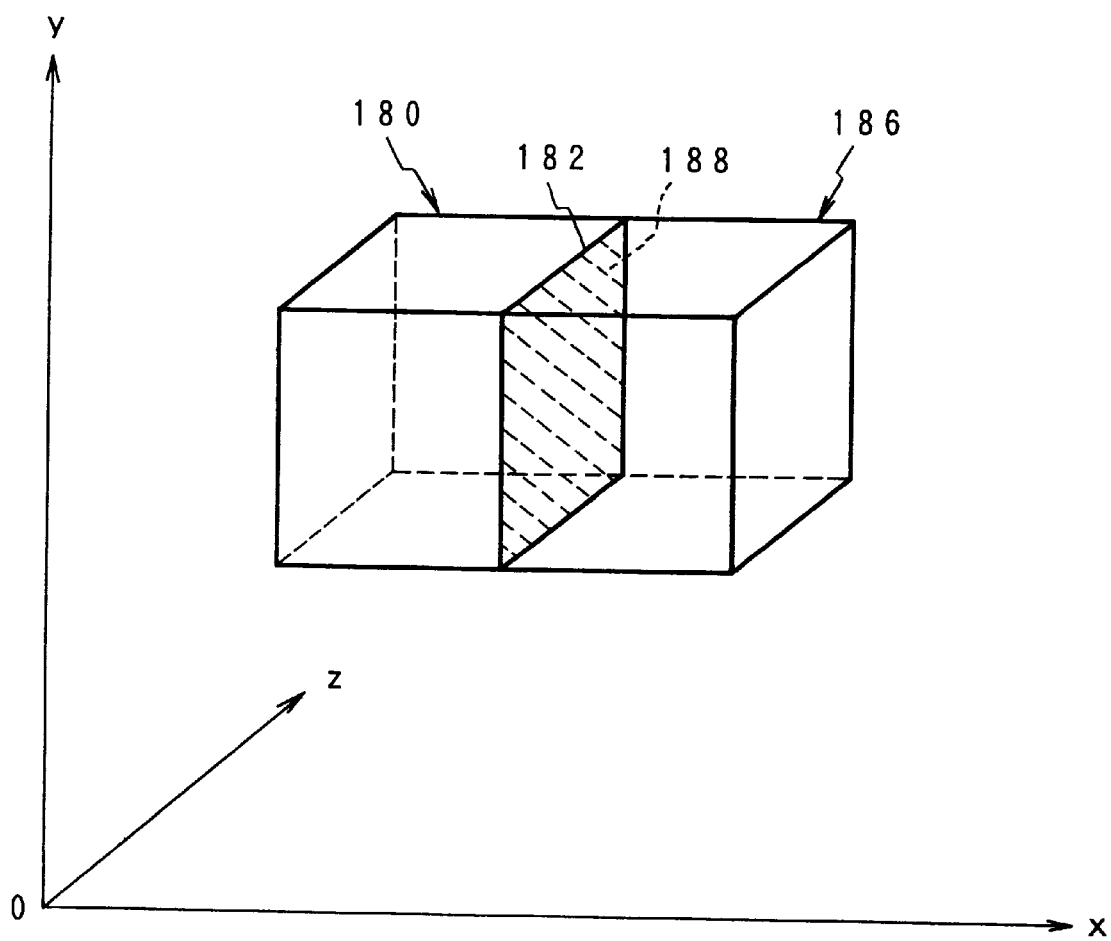
FIG. 48 is an explanatory diagram of assembling processing of the part model having polygonal surface information as the junction reference data.

FIG. 47 illustrates a state in which the part model 180 of FIG. 44 and the part model 186 of FIG. 45 are arranged in the world coordinate space, with the normal vector direction of the junction reference surface 188 of the part model 186 relative to the junction reference surface 182 of the part model 180 is designated to be from outside as indicated by an arrow 198. Thus, the execution of the assembling processing of the part model 180 and the part model 186 in FIG. 47 will lead to assembling processing in which the junction reference surface 188 of the part model 186 registers with the junction reference surface 182 of the part model 180 fixedly disposed as shown in FIG. 48.

Creation of Specific Three-dimensional Model

Figure 49:
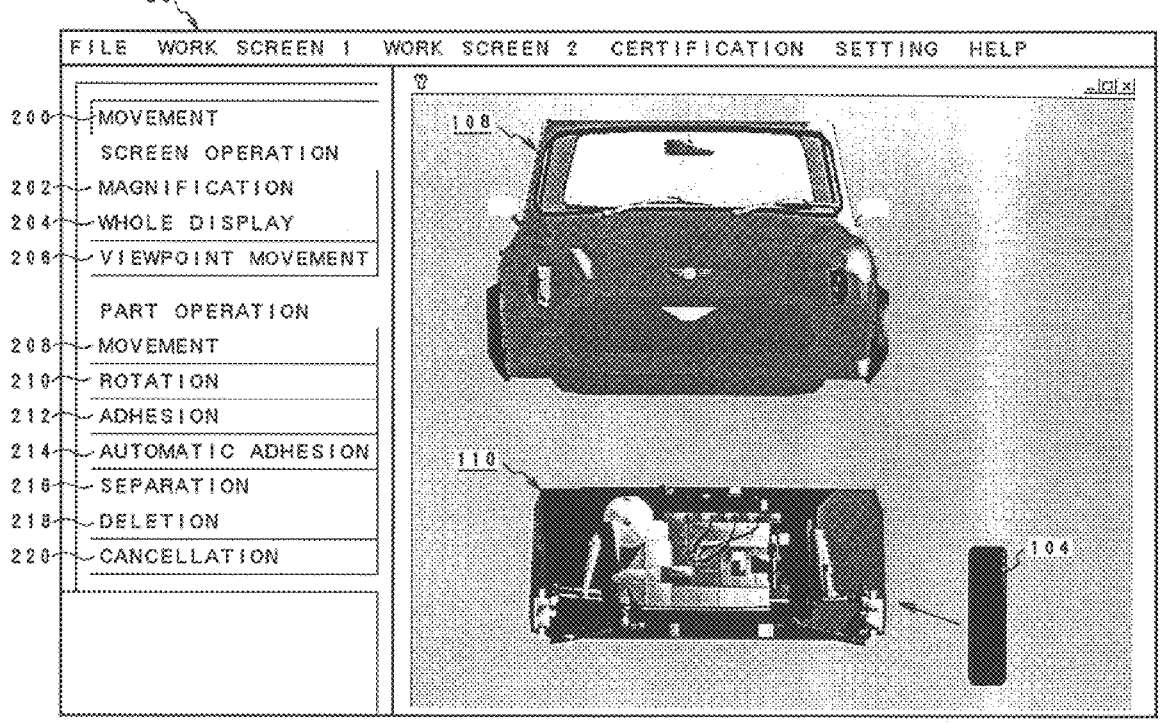
FIG. 49 is an explanatory diagram of a work screen for specific three-dimensional model creation processing in accordance with the present invention.

Description will then be made of a specific example of processing for creating a three-dimensional automobile model on the basis of the three-dimensional object model creation processing of the present invention. FIG. 49 illustrates the work screen 20 serving as the world coordinate space provided by the assembly processing unit 18 of FIG. 1. On the screen 20 there appear in the process of assembly a body-side assembly model 108 and a chassis-side assembly model 110. In this state, a tire model 104 is selected as a part model for arrangement, but it has not yet been assembled to an axle 105 of the chassis model 110. The part models to be arranged and assembled on the work screen 20 of FIG. 49 are stored in the form of three-dimensional geometric data on the part models of FIG. 50 for instance within the part storage unit 14 shown in FIG. 1. FIG. 50 illustrates major part models to be used on the work screen of FIG. 49, including for instance a part model 84, a motor model 86, a headlight model 88, a chassis model 90, a windshield model 92, a side glass model 94, a rear glass model 96, a steering wheel model 98, a front seat model 100, a rear seat model 102 and tire models 104 and 106.

Within the leftmost column on the work screen 20 of FIG. 49 are arranged various command keys required for the assembling processing. The command keys include for the operation of the screen a magnification key 202, a whole display key 204 and a viewpoint movement key 206. Further provided for the operation of the parts are a movement key 208, a rotation key 210, an adhesion key 212 for the assembling processing, an automatic adhesion key 214 for effecting the automatic adhesion utilizing the ID information, a separation key 216 for separating the assembling part models, a deletion key 216 for deleting a part model, and a cancellation key 220 for canceling a selected part. In FIG. 49, the movement key 208 is now selected and operated, correspondingly allowing a display of "movement" on an operation display unit 200 arranged at the upper left corner.

Figure 51:
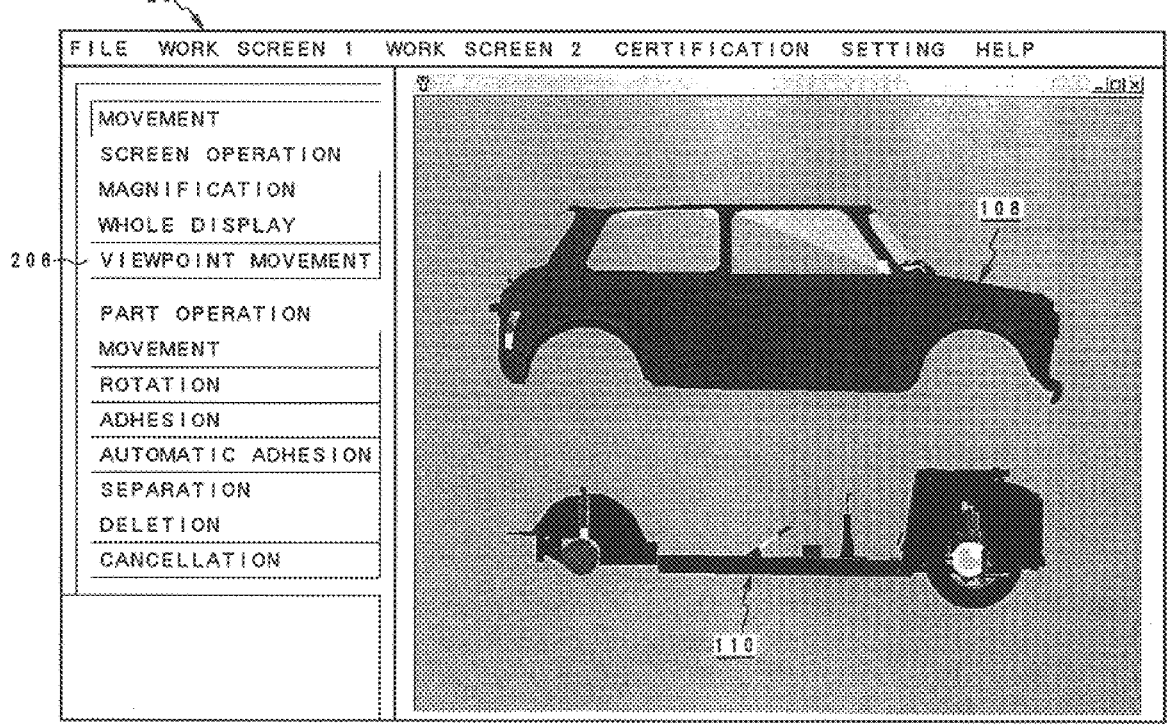
FIG. 51 is an explanatory diagram of a work screen on which the assembly model of FIG. 49 is viewed from side through the movement of viewpoint.
Figure 52:
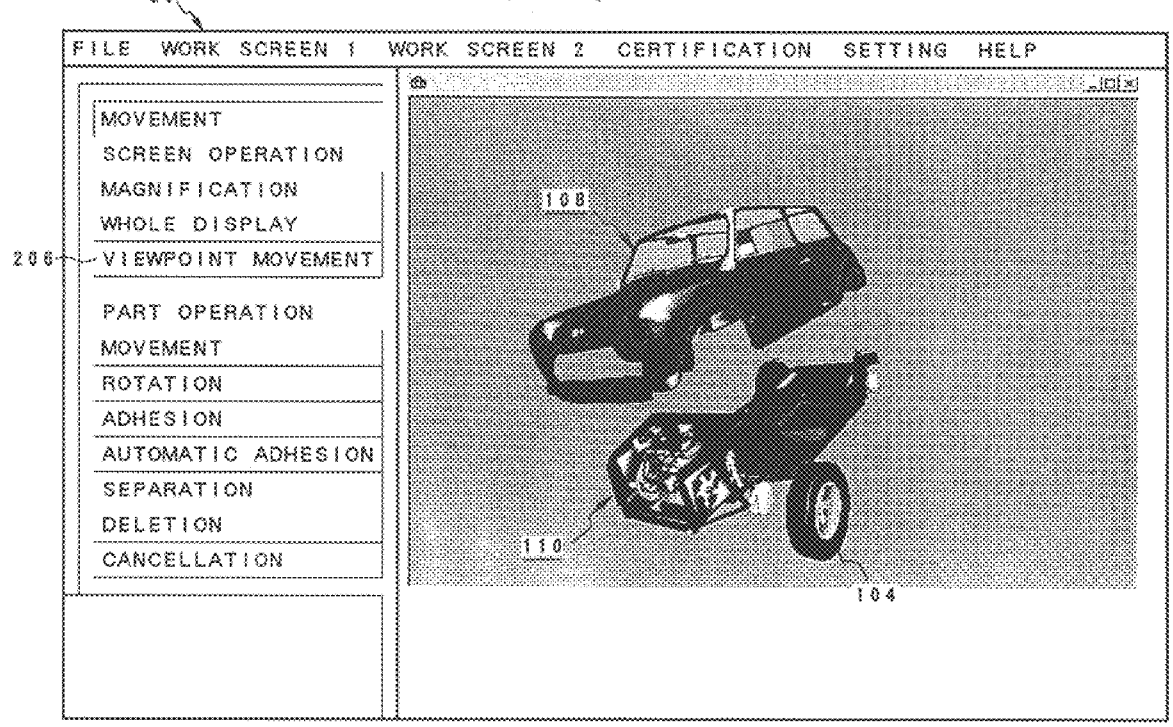
FIG. 52 is an explanatory diagram of another work screen on which the assembly model of FIG. 49 is viewed from diagonally above through the movement of viewpoint.

FIG. 51 illustrates the assembling models 108 and 110 viewed from a different viewpoint position through the operation of the viewpoint movement key 206 on the work screen 20 of FIG. 49. Furthermore, FIG. 52 illustrates a picture display which has been switched by the viewpoint movement key 206 so as to view the motor vehicle from diagonally upper direction. In cases where for instance the tire model 104 is assembled to the axle 105 of the assembly model 110 on the work screen 20 of FIG. 49, the tire model 104 is selected with a cursor and is brought close to the axle 105 using the movement key 208, and when it reaches the previously defined assembling allowable range, the tire model 104 is rearranged for assembling with the junction reference point of the tire model 104 registering with the junction reference point of the axle 105. Then, the operation of the automatic adhesion key 214 will lead to the display of a message to designate an object of assembling and a part to be assembled, whereupon by designating the axle 105 and the tire model 104 as the object of assembling and the part to be assembled, respectively, automatic assembling is achieved in which the tire model 104 is automatically assembled to the axle 105 on th basis of their respective junction reference data. In this manner, desired part models are selected from among the part models of FIG. 50 for instance and are arranged on the work screen 20, after which the part models are moved and assembled together through the automatic adhesion, thus finally creating a three-dimensional automobile model.

Figure 53:
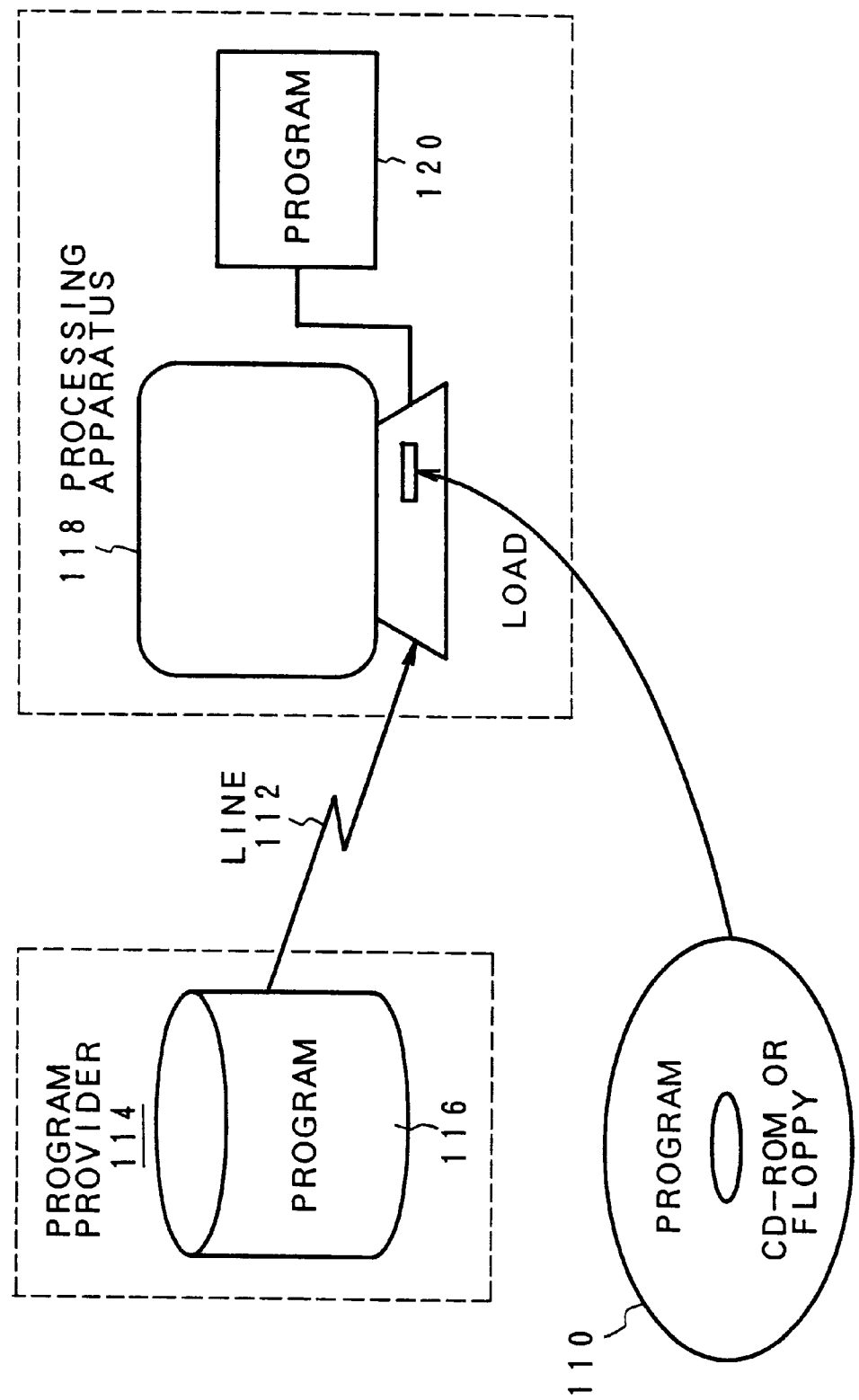
FIG. 53 is an explanatory diagram of an embodiment of a computer readable record medium on which is recorded a three-dimensional model assembly program of the present invention.

FIG. 53 illustrates an embodiment of a computer readable record medium on which is recorded a three-dimensional object model creation program. This record medium includes a removable or portable record medium 110 such as a CD-ROM or a floppy disk, a storage device 116 of a program provider 114 that provides a program through a line 112, and a storage device such as an RAM or a hard disk for use in a processing unit in which the program is installed. The program provided by the record medium is loaded into the processing unit and executed on its main storage.

According to the present invention as hereinabove described, part models are in advance prepared as parts and thereafter assembled together to complete a final three-dimensional object model, so that the creation of the parts and the assembly of the parts are entirely separated from each other. Thus, the creation of the parts may be made by the maker while the assembly of the parts may be made by the user, whereby the user can create simply and easily a three-dimensional object model by use of high-quality computer graphics without having profound knowledge and experience of the computer graphics. That is, the maker may provide to the user an application package of a three-dimensional object model vehicle of the present invention, in which are packaged part models required for the creation of the three-dimensional object model, so that the user can create simply and easily the three-dimensional object model by use of high-quality computer graphics.

Furthermore, in the present invention, prepared part models are provided with not only three-dimensional geometric data but also with junction reference data defining junction positions upon the assembly of the parts. As a result, the attachment processing may be effected with at least two part models being arranged in the coordinate space for the work so that accurate assembling of the part models can be extremely easily achieved on the basis of the junction reference data possessed by the part models.

Thus, the user can suffer from less burden in the three-dimensional object model creation work through the assembly of the part models, and therefore the user can enjoy the assembling work to create a three-dimensional object model even though it is a significantly complicated three-dimensional object model having a large number of parts.

Although the above embodiments employ by way of example the polygon data creatable by the CAD as the part model three-dimensional geometric data, they are not limited to the polygon data, and any appropriate three-dimensional geometric data for use in the computer graphics could be utilized to newly add the junction reference data thereto in accordance with the present invention, thereby creating the three-dimensional object model through the assembling of the part models. It is to be appreciated that the present invention is not intended to be limited to the numerical values shown in the above embodiments. Furthermore, the present invention is possible to modify appropriately without departing from the object thereof.

What is claimed is:

1. An apparatus for creating a three-dimensional object model comprising:
   a part model creation unit for creating a three-dimensional part model having junction reference data for the junction with other part models;
   a part storage unit in which are stored a plurality of said part models necessary for the assembly of a three-dimensional object model; and an assembly processing unit for selecting at least two part models from said part storage unit for the arrangement in a work coordinate space to junction said part models on the basis of said junction reference data, to thereby assemble said three-dimensional object model.

2. An apparatus according to claim 1, wherein said part model creation unit adds to three-dimensional geometric data of said part model one point three-dimensional coordinate values as said junction reference data; and wherein said assembly processing unit alters three-dimensional geometric data of said part models so as to allow three-dimensional coordinate values of the junction reference of respective part models to coincide with each other to thereby junction said part models together.

3. An apparatus according to claim 1, wherein said part model creation unit adds to three-dimensional geometric data of said part model two points three-dimensional coordinate values as said junction reference data, and wherein said assembly processing unit alters three-dimensional geometric data of said part models so as to allow three-dimensional coordinate values of the two points junction reference of respective part models to coincide with each other to thereby junction said part models together.

4. An apparatus according to claim 1, wherein said part model creation unit adds to three-dimensional geometric data of said part model three points three-dimensional coordinate values as said junction reference data; and wherein said assembly processing unit alters three-dimensional geometric data of said part models so as to allow three-dimensional coordinate values of the three points junction reference of respective part models to coincide with each other to thereby junction said part models together.

5. An apparatus according to claim 1, wherein said part model creation unit provides said junction reference data on the surface or in the interior or outside of each of said three-dimensional part models.

6. An apparatus according to claim 1, wherein said part model creation unit provides a specific ID on each of said part models; and wherein said assembly processing unit uses said ID of said part model to create an ID table defining the relationship of junction of said part models, and selects and junctions said part models defined by said ID table to thereby automatically assemble a three-dimensional object model.

7. An apparatus according to claim 1, wherein said part model creation unit adds to three-dimensional geometric data of said part model three or more three-dimensional coordinate values as said junction reference data, said part model creation unit further adding thereto order information determining the rotational direction of said plurality of junction reference data; and wherein said assembly processing unit junctions said part models in such a manner as to allow three-dimensional coordinate values and the rotational direction order information in the plurality of junction reference data of respective part models to coincide with each other.

8. An apparatus according to claim 1, wherein said part model creation unit adds regular polygon data as said junction reference data to three-dimensional geometric data of said part model; and wherein said assembly processing unit alters three-dimensional geometric data of said part models so as to allow regular polygon data of respective part models to coincide with each other, to thereby junction said part models.

9. An apparatus according to claim 8, wherein said assembly processing unit positions said part models with an angular offset in the rotational direction determined by the number of apexes of said regular polygon data, to thereby junction said part models together.

10. An apparatus according to claim 1, wherein said part model creation unit adds junction surface data as said junction reference data to three-dimensional geometric data of said part model; and wherein said assembling processing unit alters three-dimensional geometric data of said part models so as to allow said junction surface data of respective part models to coincide with each other, to thereby junction said part models.

11. An apparatus according to claim 10, wherein said part model creation unit uses as said junction surface data polygon surface information designated by three-dimensional data; and wherein said assembly processing unit alters three-dimensional geometric data of said part models so as to allow apex coordinate values of said junction surface of respective part models to coincide with each other, to thereby junction said part models.

12. An apparatus according to claim 10, wherein said part model creation unit adds, besides said junction surface data, information on a junction angular offset upon the junction with the other part models; and wherein said assembly processing unit sets a junction angle between associated part models on the basis of said junction angular offset information upon the junction of said part models.

13. An apparatus according to claim 1, wherein said part model creation unit adds, besides said junction surface data, junction direction information indicative of the direction of junction upon the junction with other part models; and wherein said assembly processing unit junctions associated part models on the basis of said junction direction information upon the junction with said part models.

14. An apparatus according to claim 1, wherein with at least two part models to be assembled together being arranged in said work coordinate space, said assembly processing unit moves either one of said at least two part models to junction associated part models together through the alignment of said reference junction points.

15. An apparatus according to claim 1, wherein said part creation unit sets on junction reference data basis a junction allowable domain allowing an automatic junction with the other part model; and wherein with at least two part models being arranged in said work coordinate space, said assembly processing unit moves either one of said at least two part models and when it reaches said junction allowable domain of the other part model, junctions the part models together.

16. An apparatus for creating a three-dimensional object model comprising:

a part storage unit in which are stored as part models necessary for the assembly of a three-dimensional object model, a plurality of three-dimensional part models having junction reference data for the junction with other part models; and an assembly processing unit for selecting at least two part models from said part storage unit for the arrangement in a work coordinate space to junction said part models on the basis of said junction reference data, to thereby assemble said three-dimensional object model.

17. An apparatus according to claim 16, wherein said part models within said part storage unit each have one point three-dimensional coordinate values as said junction reference data in addition to said three-dimensional geometric data of said part models; and wherein said assembly processing unit alters three-dimensional geometric data of said part models so as to allow three-dimensional coordinate values of the junction reference of respective part models to coincide with each other to thereby junction said part models together.

18. An apparatus according to claim 16, wherein said part models within said part storage unit each have two points three-dimensional coordinate values as said junction reference data in addition to said three-dimensional geometric data of said part model; and wherein said assembly processing unit alters three-dimensional geometric data of said part models so as to allow three-dimensional coordinate values of the two points junction reference of respective part models to coincide with each other to thereby junction said part models together.

19. An apparatus according to claim 16, wherein said part models within said part storage unit each have three points three-dimensional coordinate values as said junction reference data in addition to said three-dimensional geometric data of said part models; and wherein said assembly processing unit alters three-dimensional geometric data of said part models so as to allow three-dimensional coordinate values of the three points junction reference of respective part models to coincide with each other to thereby junction said part models together.

20. An apparatus according to claim 16, wherein said part model creation unit provides said junction reference data on the surface or in the interior or outside of each of said three-dimensional part models.

21. An apparatus according to claim 16, wherein said part models within said part storage unit are each provided with a specific ID; and wherein said assembly processing unit uses said ID of said part model to create an ID table defining the relationship of junction of said part models, and selects and junctions said part models defined by said ID table to thereby automatically assemble a three-dimensional object model.

22. An apparatus according to claim 16, wherein said part models within said part storage unit are each provided, added to said three-dimensional geometric data of said part model, with three or more points three-dimensional coordinate values as said junction reference data, and with the order information determining the rotational direction of said plurality of junction reference data; and wherein said assembly processing unit junctions said part models in such a manner as to allow three-dimensional coordinate values and the rotational direction order information in the plurality of junction reference data of respective part models.

23. An apparatus according to claim 16, wherein said part models within said part storage unit are each provided with regular polygon data as said junction reference data, added to said three-dimensional geometric data of said part model; and wherein said assembly processing unit alters three-dimensional geometric data of said part models so as to allow regular polygon data of respective part models to coincide with each other, to thereby junction said part models.

24. An apparatus according to claim 23, wherein said assembly processing unit positions said part models with an angular offset in the rotational direction determined by the number of apexes of said regular polygon data, to thereby junction said part models together.

25. An apparatus according to claim 16, wherein said part models within said part storage unit are each provided with junction surface data as said junction reference data, added to said three-dimensional geometric data of said part models; and wherein said assembling processing unit alters three-dimensional geometric data of said part models so as to allow said junction surface data of respective part models to coincide with each other, to thereby junction said part models.

26. An apparatus according to claim 25, wherein said part models within said part storage unit are each further provided with polygonal surface information designated by said three-dimensional geometric data as said junction surface data; and wherein said assembly processing unit alters three-dimensional geometric data of said part models so as to allow apex coordinate values of said junction surface of respective part models to coincide with each other, to thereby junction said part models.

27. An apparatus according to claim 16, wherein said part models within said part storage unit are each provided with, in addition to said junction surface data, information on a junction angular offset upon the junction with the other part model; and wherein said assembly processing unit sets a junction angle between associated part models on the basis of said junction angular offset information upon the junction of said part models.

28. An apparatus according-to-claim 16, wherein said part models within said part storage unit are each provided with, in addition to said junction surface information, junction direction information indicative of the direction of junction upon the junction with the other part model; and wherein said assembly processing unit junctions associated part models on the basis of said junction direction information upon the junction with said part models.

29. An apparatus according to claim 16, wherein with at least two part models to be assembled together being arranged in said work coordinate space, said assembly processing unit moves either one of said at least two part models to junction associated part models together through the alignment of said reference junction points.

30. An apparatus according to claim 16, wherein said part models within said part storage unit set on junction reference data basis a junction allowable domain allowing the automatic junction with the other part models; and wherein with at least two part models being arranged in said work coordinate space, said assembly processing unit moves either one of said at least two part models and when it reaches said junction allowable domain of the other part model, junctions the part models together.

31. A method of creating a three-dimensional model, comprising:

a part creation step for creating as a part model necessary for the assembly of a three-dimensional object model a three-dimensional part model having junction reference data for the junction with the other part models, to store it in a part storage unit; and an assembly processing step for selecting at least two models from said part storage unit for the arrangement in the work coordinate space, to junction said part models together on the basis of said junction reference data to assemble said three-dimensional object model.

32. A three-dimensional object model creation method comprising the steps of:

selecting at least two part models, as part models necessary for the assembly of a three-dimensional object model, from a part storage unit storing therein three-dimensional part models each having junction reference data for the junction with the other part models;

arranging selected part models in a work coordinate space; and junctioning associated part models on the basis of said junction reference data to assemble said three-dimensional model.

33. A computer readable record medium on which is recorded a three-dimensional object model creation program, comprising:

a part creation module for creating as part models necessary for the assembly of a three-dimensional object model three-dimensional part models each having junction reference data for the junction with the other part models, to store it into a part storage unit; and an assembly processing module for selecting at least two part models from said part storage unit for the arrangement in a work coordinate space, to junction said part models on the basis of said junction reference data for the assembly of said three-dimensional object model.

34. A computer readable record medium on which is recorded a three-dimensional object model creation program, wherein at least two part models are selected from a part storage unit in which are stored, as part models necessary for the assembly of a three-dimensional object model, three-dimensional part models having junction reference data for the junction with the other part models, said at least two part models being arranged in a work coordinate space, said part models being joined together on the basis of said junction reference data to thereby assemble said three-dimensional object model.

* * * * *